US 8,224,938 B2
Jul. 17, 2012

(12) United States Patent
Sauermann

(10) Patent No.: US 8,224,938 B2
(45) Date of Patent: Jul. 17, 2012

(54) DATA PROCESSING SYSTEM AND METHOD FOR ITERATIVELY RE-DISTRIBUTING OBJECTS ACROSS ALL OR A MINIMUM NUMBER OF PROCESSING UNITS

(75) Inventor: Volker Sauermann, Dossenheim (DE)

(73) Assignee: SAP AG, Walldorf (DE)

( * ) Notice: Subject to any disclaimer, the term of this patent is extended or adjusted under 35 U.S.C. 154(b) by 949 days.

(21) Appl. No.: 11/176,268

(22) Filed: Jul. 8, 2005

(65) Prior Publication Data

US 2006/0020767 A1  Jan. 26, 2006

(30) Foreign Application Priority Data

Jul. 10, 2004  (EP) .................................. 04016304

(51) Int. Cl.
*G06F 9/46* (2006.01)
*G06F 15/173* (2006.01)
(52) U.S. Cl. ......... 709/223; 709/226; 718/102; 718/105
(58) Field of Classification Search .................. 709/226, 709/223; 718/102, 105
See application file for complete search history.

(56) References Cited

U.S. PATENT DOCUMENTS

| | | | | |
|---|---|---|---|---|
| 5,031,089 A * | 7/1991 | Liu et al. ....................... 709/226 |
| 5,283,897 A * | 2/1994 | Georgiadis et al. ........... 718/105 |
| 5,630,129 A * | 5/1997 | Wheat ........................... 718/105 |
| 5,701,482 A * | 12/1997 | Harrison et al. .............. 718/105 |
| 5,970,495 A * | 10/1999 | Baru et al. .................... 707/102 |
| 6,031,984 A * | 2/2000 | Walser ............................. 703/2 |
| 6,067,545 A * | 5/2000 | Wolff .............................. 707/10 |
| 6,101,508 A * | 8/2000 | Wolff ............................ 709/223 |
| 6,128,279 A * | 10/2000 | O'Neil et al. ................. 370/229 |
| 6,185,601 B1 * | 2/2001 | Wolff ............................ 709/203 |
| 6,374,297 B1 * | 4/2002 | Wolf et al. .................... 709/226 |
| 6,529,906 B1 * | 3/2003 | Chan ................................. 707/8 |
| 6,944,607 B1 * | 9/2005 | Zhang et al. ..................... 707/2 |
| 6,944,862 B2 * | 9/2005 | Caggese et al. ............... 718/102 |
| 6,970,425 B1 * | 11/2005 | Bakshi .......................... 370/235 |
| 6,993,763 B2 * | 1/2006 | Hayes, Jr. ..................... 718/102 |
| 7,130,874 B2 * | 10/2006 | Makansi et al. .............. 707/204 |
| 7,246,120 B2 * | 7/2007 | Chan et al. ....................... 707/8 |
| 7,260,696 B2 * | 8/2007 | Arakawa et al. .............. 711/165 |
| 7,265,860 B2 * | 9/2007 | Ferlitsch ...................... 358/1.15 |
| 7,302,450 B2 * | 11/2007 | Benedetti et al. .................. 1/1 |
| 7,389,293 B2 * | 6/2008 | Chan et al. ....................... 707/8 |
| 7,523,454 B2 * | 4/2009 | Romero et al. ............... 718/105 |
| 7,533,384 B2 * | 5/2009 | Chan et al. .................... 718/102 |
| 7,593,987 B2 * | 9/2009 | Salesky et al. ............... 709/204 |
| 7,636,820 B2 * | 12/2009 | Fujibayashi .................. 711/161 |
| 7,685,577 B2 * | 3/2010 | Pace et al. .................... 717/136 |
| 7,757,236 B1 * | 7/2010 | Singh ............................ 718/105 |
| 2002/0046316 A1 * | 4/2002 | Borowsky et al. ............... 711/1 |
| 2002/0107914 A1 * | 8/2002 | Charisius et al. ............. 709/203 |
| 2002/0194015 A1 * | 12/2002 | Gordon et al. .................... 705/1 |
| 2002/0198923 A1 * | 12/2002 | Hayes, Jr. ..................... 709/102 |
| 2003/0105903 A1 * | 6/2003 | Garnett et al. ................ 710/300 |

(Continued)

*Primary Examiner* — Tonia L. M. Dollinger
*Assistant Examiner* — Daniel C Murray
(74) *Attorney, Agent, or Firm* — Finnegan, Henderson, Farabow, Garrett & Dunner, LLP

(57) ABSTRACT

A data processing system has a program module for determining a re-distribution of objects, such as database tables, over processing units of a cluster of processing units, such as in a blade computing environment. An estimate of the required duration for applying the re-distribution is calculated in order to facilitate an administrator's decision when to initiate the re-distribution procedure.

12 Claims, 56 Drawing Sheets

U.S. PATENT DOCUMENTS

| | | | |
|---|---|---|---|
| 2003/0158941 A1* | 8/2003 | Frank et al. | 709/226 |
| 2004/0243578 A1* | 12/2004 | Chan et al. | 707/8 |
| 2005/0138170 A1* | 6/2005 | Cherkasova et al. | 709/225 |
| 2005/0149540 A1* | 7/2005 | Chan et al. | 707/100 |
| 2005/0163045 A1* | 7/2005 | Randriamasy | 370/229 |
| 2005/0243723 A1* | 11/2005 | Randriamasy | 370/235 |
| 2006/0089935 A1* | 4/2006 | Clifford et al. | 707/10 |
| 2006/0143178 A1* | 6/2006 | Chan et al. | 707/9 |
| 2006/0167966 A1* | 7/2006 | Kumar et al. | 709/201 |
| 2007/0073817 A1* | 3/2007 | Gorty | 709/206 |
| 2007/0073884 A1* | 3/2007 | Clarke | 709/226 |
| 2008/0313274 A1* | 12/2008 | Murray et al. | 709/203 |
| 2009/0106387 A1* | 4/2009 | Anbalagan | 709/217 |
| 2009/0109230 A1* | 4/2009 | Miller et al. | 345/506 |
| 2009/0136206 A1* | 5/2009 | Aisu et al. | 386/83 |
| 2009/0144404 A1* | 6/2009 | Wolman et al. | 709/223 |
| 2010/0121941 A1* | 5/2010 | Harrang et al. | 709/219 |
| 2010/0131895 A1* | 5/2010 | Wohlert | 715/811 |

* cited by examiner

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 13, 14
Blade 2: Tables 15, 2
Blade 3: Tables 1, 6
Blade 4: Tables 5, 3
Blade 5: Tables 4, 18
Blade 6: Tables 16, 8
Blade 7: Tables 10, 17
Blade 8: Tables 9, 19, 7, 11, 12

Blade 1: Tables 20, 6
Blade 2: Tables 15, 2, 13, 14
Blade 3: Tables 1, 12
Blade 4: Tables 5, 7
Blade 5: Tables 4, 18
Blade 6: Tables 16, 9
Blade 7: Tables 10, 17
Blade 8: Tables 8, 19, 3, 11

Blade 1: Tables 20, 6
Blade 2: Tables 15, 2, 13, 14
Blade 3: Tables 1, 12
Blade 4: Tables 5, 7
Blade 5: Tables 4, 18
Blade 6: Tables 16, 9
Blade 7: Tables 10, 17
Blade 8: Tables 8, 19, 3, 11

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 18, 3
Blade 8: Tables 8, 11, 10

Blade 1: Tables 20, 12
Blade 2: Tables 15, 6, 2, 13, 14
Blade 3: Tables 1, 7
Blade 4: Tables 5, 19
Blade 5: Tables 4
Blade 6: Tables 16, 9
Blade 7: Tables 18, 3, 17
Blade 8: Tables 8, 11, 10

Blade 1: Tables 20, 12
Blade 2: Tables 15, 6, 2, 13, 14
Blade 3: Tables 1, 7
Blade 4: Tables 5, 19
Blade 5: Tables 4
Blade 6: Tables 16, 9
Blade 7: Tables 18, 3, 17
Blade 8: Tables 8, 11, 10

Blade 1: Tables 20, 12
Blade 2: Tables 15, 6, 2, 13, 14
Blade 3: Tables 1, 7
Blade 4: Tables 5, 19
Blade 5: Tables 4, 18
Blade 6: Tables 16, 9
Blade 7: Tables 3, 17
Blade 8: Tables 8, 11, 10

Blade 1: Tables 20, 12
Blade 2: Tables 15, 6, 2, 13, 14
Blade 3: Tables 1, 7
Blade 4: Tables 5, 19
Blade 5: Tables 4, 18
Blade 6: Tables 16, 9
Blade 7: Tables 3, 17, 8
Blade 8: Tables 11, 10

Blade 1: Tables 20, 12
Blade 2: Tables 15, 6, 2, 13, 14
Blade 3: Tables 1, 7
Blade 4: Tables 5
Blade 5: Tables 4, 18
Blade 6: Tables 16, 9
Blade 7: Tables 3, 17, 8
Blade 8: Tables 11, 10, 19

Blade 1: Tables 20, 12
Blade 2: Tables 15, 6, 2, 13, 14
Blade 3: Tables 1
Blade 4: Tables 5, 7
Blade 5: Tables 4, 18
Blade 6: Tables 16, 9
Blade 7: Tables 3, 17, 8
Blade 8: Tables 11, 10, 19

Blade 1: Tables 20
Blade 2: Tables 15, 6, 2, 13, 14
Blade 3: Tables 1, 12
Blade 4: Tables 5, 7
Blade 5: Tables 4, 18
Blade 6: Tables 16, 9
Blade 7: Tables 3, 17, 8
Blade 8: Tables 11, 10, 19

Blade 1: Tables 20, 6
Blade 2: Tables 15, 2, 13, 14
Blade 3: Tables 1, 12
Blade 4: Tables 5, 7
Blade 5: Tables 4, 18
Blade 6: Tables 16, 9
Blade 7: Tables 3, 17, 8
Blade 8: Tables 11, 10, 19

Blade 1: Tables 20, 6
Blade 2: Tables 15, 13, 14
Blade 3: Tables 1, 12
Blade 4: Tables 5, 7
Blade 5: Tables 4, 18, 2
Blade 6: Tables 16, 9
Blade 7: Tables 3, 17, 8
Blade 8: Tables 11, 10, 19

Blade 1: Tables 8, 6, 13   Blade 4: Table 15   Blade 7: Tables 19, 17, 7   Blade 10: Table 16
Blade 2: Tables 20, 12    Blade 5: Tables 2, 5   Blade 8: Tables 11, 9
Blade 3: Tables 14, 1     Blade 6: Tables 3, 10  Blade 9: Tables 4, 18 ated during the re-distribution, such as a time when the usage of the cluster of processing units is low, e.g. during the night.

DATA PROCESSING SYSTEM AND METHOD FOR ITERATIVELY RE-DISTRIBUTING OBJECTS ACROSS ALL OR A MINIMUM NUMBER OF PROCESSING UNITS

TECHNICAL FIELD

The present invention relates to the field of data processing, and more particularly without limitation, to balancing the assignment of objects to processing units in a multi-computing environment.

RELATED APPLICATIONS

Priority is claimed to European Patent Application No. EP 04 016 304.0, filed Jul. 10, 2004, the content of which is incorporated herein by reference.

BACKGROUND

Various multi-computing architectures are known from the prior art where a plurality of processing units is coupled to form a cluster. Such architectures are used in parallel processing and also in the emerging field of blade computing.

Blade computing relies on blade servers, which are modular, single-board computers. An overview of blade computing is given in "Architectures and Infrastructure for Blade Computing", September 2002, Sun Microsystems and "THE NEXT WAVE: BLADE SERVER COMPUTING", Sun Microsystems.

A content load balancing blade is commercially available from Sun Microsystems ("Sun Fire™ B10n"). This blade provides traffic and content management functionalities. Content load balancing is achieved based on URLs, CGI scripts and cookies; server load balancing is achieved based on server loads, response times, and weighted round-robin algorithms. Blade servers are commercially available, for example, from Intel.

U.S. patent application No. 20030105903 shows a web edge server, which comprises a number of blade servers. A switch and an information distribution module are provided for the purpose of balancing. The information distribution module receives an information message, performs processing on the message to determine a destination, and forwards a message toward the determined destination via an internal communications network.

SUMMARY

The present invention provides a data processing system for assigning a set of objects to processing units of a cluster of processing units. The data processing system has means for determining a re-distribution of the objects over the processing units and means for calculating an expected duration required for performing the re-distribution of the objects.

The present invention is particularly advantageous as it facilitates to select an appropriate start time for performing a suggested re-distribution of the objects. Performing the re-distribution may require that some or all of the processing units or application programs running on the processing units are shut down. In this case the expected duration required for applying the re-distribution at the same time is an expected down time of the complete cluster of processing units, the sub-set of the processing units or of some or all of the application programs running on the processing units. Knowledge of the expected duration required for applying a suggested re-distribution is beneficial as it facilitates to select the start time for performing the re-distribution, such as a time when the usage of the cluster of processing units is low, e.g. during the night.

In accordance with an embodiment of the invention a sub-set of the processing units is determined. The sub-set consists of those processing units that are affected by the re-distribution. In other words, a determination is made which ones of the processing units have objects that are to be moved or that receive one or more additional objects. Next, a sub-set of the objects is determined. The sub-set contains those objects that are assigned to processing units that are affected by the re-distribution. The aggregated size of the objects contained in the sub-set is calculated. A parameter is used to estimate the expected duration based on the aggregated size of the objects.

In accordance with an embodiment of the invention the expected duration is displayed on a user interface. On this basis the user can make an informed decision regarding the start time of the re-distribution of the objects. Preferably the user's acceptance of the re-distribution and/or the initiation of the re-distribution procedure is entered by means of a single input action.

In accordance with a further embodiment the data processing system has means for selection of a first or a second mode of operation and means for determining a distribution of the set of objects over a set of the processing units. Further, the data processing system has means for determining a minimum number of the processing units that have a sufficient capacity for accommodating the set of the objects. In a first mode of operation the set of processing units to which the set of objects are to be assigned contains all the processing units of the cluster. In a second mode of operation the set of processing units contains the minimum number of the processing units.

The present invention is particularly advantageous as it provides the option to either optimise a distribution of objects over processing units using all the processing units of the cluster or only the minimum number of required processing units. Typically the first mode of operation is selected when largely sufficient hardware capacity is available. In this instance the main purpose of the re-distribution of objects to the processing unit is to establish a smooth distribution in order to evenly utilise the available hardware resources and in order to prevent swapping operations that would reduce the performance of the multi processor system and extend response times.

If hardware resources are scarce, or if some of the processing units need to be freed for special computing tasks, the second mode of operation is selected in order to densely pack the objects onto a minimum number of processing units that can handle the objects.

In accordance with a preferred embodiment of the invention first and second distribution modes can be selected in order to determine an initial distribution of the objects to the processing units or to determine a re-distribution for optimisation of the current distribution. In the first distribution mode only a single property of the objects is used in order to perform the distribution or re-distribution. For this purpose a one-dimensional distribution procedure is utilised. In the second distribution mode at least first and second properties of the objects are used for determining the distribution or re-distribution. For this purpose a distribution procedure that takes into account at least two dimensions is utilised.

In accordance with a further preferred embodiment of the invention, the single property of the objects that is used in the first distribution mode is the size or the load of the objects. For example, the size-property is the storage space that a given object requires on a processing unit. The load-property can be defined as the mean number of access operations to the object per time unit, or as another suitable statistical measure that expresses the processing load of the processing unit to which the object is assigned. For example, the property or properties that is/are selected for the first or second distribution mode are stored in the user settings.

In accordance with a further preferred embodiment of the invention both the size and load properties of the objects are used in the second distribution mode in order to determine a distribution or re-distribution of the objects over the processing units. This is in contrast to the first distribution mode where only a single property is used. The aim of the first distribution mode is to smoothen the distribution with respect to the single property that is considered. However, this can result in a rough distribution as regards another property. For example, performing a distribution using the size properties will result in a relatively smooth size distribution but the loads can be distributed quite unevenly. Using more than one property of the objects as a basis for the distribution or re-distribution procedure will optimize the distribution regarding all of the considered properties. For example, using size and load for performing the distribution will typically result in a rougher distribution of the aggregated sizes over the processing units compared to the one-dimensional distribution mode that uses the size criterion alone, but in a smoother distribution of the loads.

In accordance with a further preferred embodiment of the invention the minimum number of processing units is determined using the same object property or properties as for the distribution or re-distribution, if the second mode of operation has been selected.

A one-dimensional procedure is used for determining the minimum number of the processing units if the first distribution mode and the second mode of operation have been selected whereas at least a two-dimensional procedure for determining the minimum number of the processing unit is employed then the second distribution mode and the second mode of operation have been selected.

In accordance with a further preferred embodiment of the invention a re-distribution of the objects over the processing units is initiated automatically. For example, a user can set a timer that automatically initiates the re-distribution at pre-defined times, such as periodically, e.g. once each day. The setting of the timer is conveniently done via the user interface. Alternatively the distribution or re-distribution is started manually upon a user's corresponding input operation.

In accordance with a further preferred embodiment of the invention the current distribution and a re-distribution that has been determined for optimisation of the current distribution is visualised for a user's review. When the user approves the suggested redistribution he or she can enter a corresponding acceptance. In response to the user's entry of his or her acceptance the re-distribution procedure is, initiated.

In accordance with a further preferred embodiment of the invention the data processing system is one of the processing units to which the objects are assigned. This means that in a blade computing environment one of the blade servers takes the role of a management unit in order to perform the management task of assigning the objects to the processing units. Preferably the management unit is implemented as the management process of a search engine. Alternatively the management unit is a separate control unit that is not used as a blade server.

The present invention is particularly advantageous for search engines such as internet search engines, that require a large distributed search index. Another preferred application is the reduction of the response time of a relational database, such as an online transaction processing system. The database tables stored in the relational database system that are required for certain time-critical applications are replicated in the blade computing system of the invention in order to decrease response times for those time critical tasks.

BRIEF DESCRIPTION OF THE DRAWINGS

Referring now to the drawings, in which like numerals represent like elements throughout the several figures, aspects of the present invention and the exemplary operating environment will be described.

DETAILED DESCRIPTION

Reference will now be made in detail the present embodiments of the invention, an example of which is illustrated in the accompanying drawings. Wherever possible, the same reference numbers will be used throughout the drawings to refer to the same or like parts.

Figure 1:
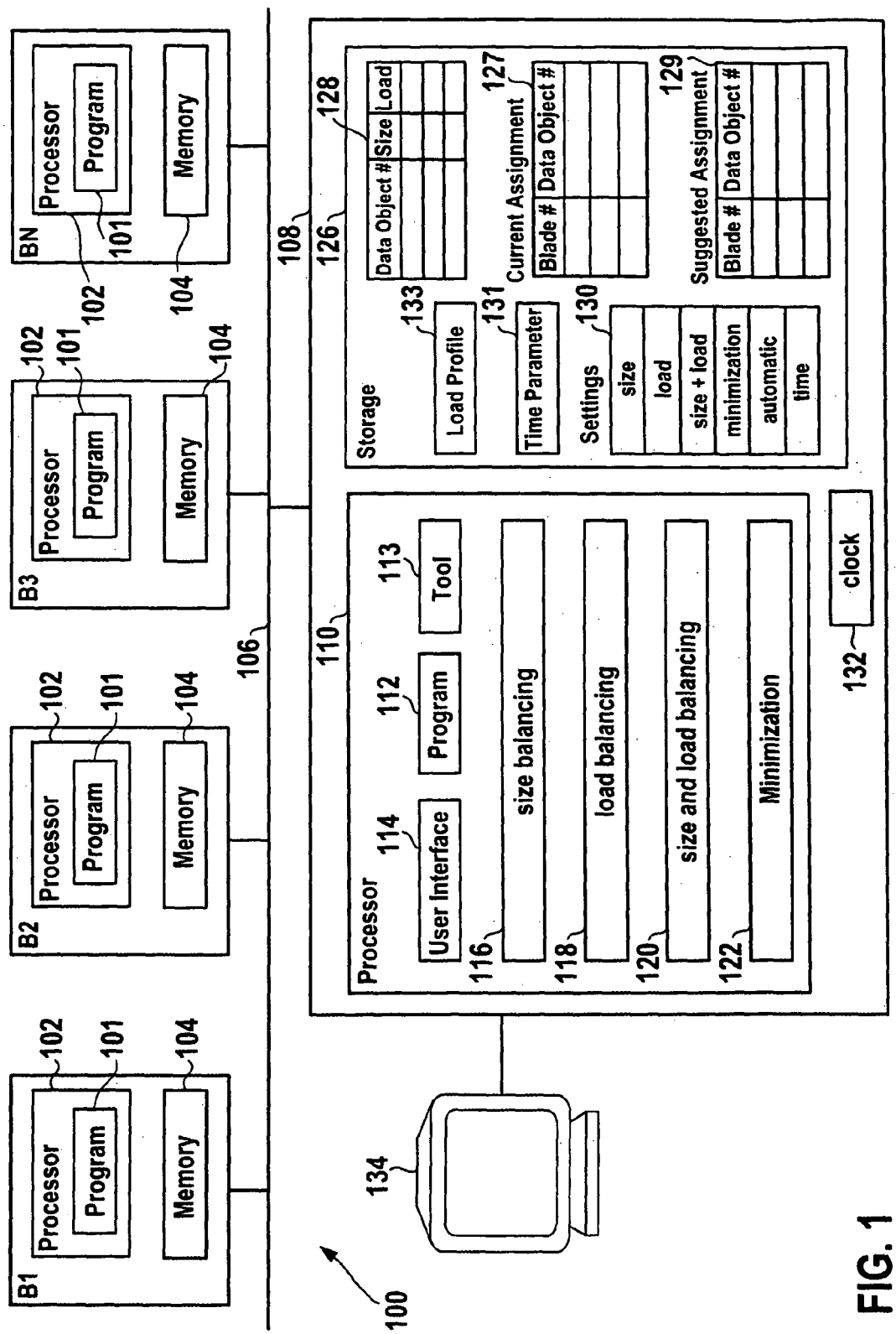
FIG. 1 is a block diagram of a preferred embodiment of the blade computing system of the invention, FIG. 2 schematically shows a window for entering of the settings into the blade computing system of FIG. 1.

FIG. 1 shows cluster 100 of blades B1, B2, B3, . . . BN. Each one of the blades has a processor 102 and a memory 104. A memory 104 is one example of a non-transitory tangible computer-readable storage medium. In the example considered here, all memories 104 have the same storage capacity and all processors 102 have the same load capacity.

For example, the load capacity of a processing unit can be indicative of the maximum number of access operations the processing unit can provide. Access operations may comprise both read accesses (select) and write accesses (update, insert, delete) to objects stored on the processing unit. In addition to hardware restrictions, the load capacity of a processing unit can be further limited by the parallel process of the distributed data processing task that is assigned to a given processing unit in terms of the maximum number of access operations the parallel process (for example of a search engine) can handle. For example the load capacity can be expressed as the maximum number of access operations per time unit the parallel process running on one of the processing units can handle.

The blades are coupled by a network 106, such as a bus system. The total number N of blades of cluster 100 needs to be chosen, such that a given number of M objects of varying sizes and load requirements can be handled.

For example, cluster 100 implements a so-called search engine. In this instance respective search processes are executed by the programs 101 running on each of the blades. The assignment of data objects, such as index tables, to blades can be stored in a dispatcher unit of cluster 100. This way data objects are assigned to blades and data processing tasks running on the blades.

In the preferred embodiment considered here a management unit 108 is coupled to the network 106. The management unit 108 provides a blade management engine and the dispatcher functionality for assigning data objects to the blades. In the embodiment considered here the management unit 108 is not itself a blade. However, in other implementations the management unit 108 can be implemented by one of the blades.

The management unit 108 has a processor 110 for execution of a program module 112 that provides a blade management-engine, including blade diagnostics and blade failure management as well as deployment management, such as dispatching of data objects to the blades for implementation of a distribution of the data objects over the blades.

Further, processor 110 has a program module 114 that provides a user interface.

Program modules 116 and 118 implement one-dimensional distribution procedures for determining a distribution of the objects over the blades. The program module 116 takes into account the sizes of the objects to be distributed in order to balance the distribution. Likewise, program module 118 takes into account the loads of the data objects in order to perform the distribution procedure. Preferably, program modules 116 and 118 are replaced by a single program module that implements a generic procedure that can be used for both the size or load one-dimensional distribution or for another one-dimensional distribution taking into account a single other parameter.

Program module 120 implements a two-dimensional distribution procedure that takes into account both size and load of the objects to be distributed.

The common aim of the distribution procedures implemented in the program modules 116, 118 and 120 is to provide a balanced distribution that at least approximates an even distribution of the objects over the processing units. The program module 120 can take into account both size and load as a balancing criterion or a single criterion such as load or size, depending on the users choice or pre-defined settings.

Program module 122 implements a procedure for determining a minimum number of the blades that are required to accommodate a given set of objects. Depending on a user's option the minimisation procedure can be one-dimensional or two-dimensional. In the one-dimensional case the minimisation procedure only takes into account size or load in order to determine the minimum number of the blades. In the two-dimensional case both size and load are taken into account in order to determine the minimum number of processing units. It is to be noted that the program module 122 does not necessarily provide the absolute minimum number of the processing units but an approximation to this minimum number of processing units. Further, it is to be noted that—depending on the implementation—a separated program module 122 might not be required but that the program modules 116, 118 and 120 provide the minimum number as a result of the distribution procedure. In addition the processor can execute program modules (not shown in the drawing) for refinement of an initial distribution. Suitable procedures will be described in greater detail below with reference to FIGS. 5 to 55.

Management unit 108 has storage system 126, that can include a main memory and one or more mass storage devices, such as disc or tape drives.

Storage system 126 serves for storage of a table 128. Each table entry consists of a data object number and the size and load parameters of the respective data object. Further, the storage system 126 serves for storage of tables 127 and 129. The table 127 serves for storage of a current distribution of data objects over the blades. Each entry into table 127 contains a blade number and the data object numbers that are assigned to that blade. Table 129 has the same structure as table 127 and serves for storage of a suggested re-distribution of the data objects over the blades. Further, the storage system 126 serves for storage of a table 130 that contains the user settings regarding the mode of operation of the management unit 108.

Clock 132 of the management unit 108 provides a time reference. A monitor 134 is coupled to the management unit 108 in order to provide a graphical user interface in conjunction with program module 114.

In operation, a list of data objects indicating the size and the load required by each of the data objects is loaded into the table 128. Initially the data objects are not assigned to the search engine processes running on the blades. In order to perform the initial assignment of data objects to blades one of the program modules 116, 118, 120 is started, depending on the settings stored in table 130. If the 'minimisation' setting has been set the program module 122 is started before the distribution of the data objects over the blades is determined. Otherwise the data objects are distributed over all available blades B1 to BN.

In addition to the initial assignment of data objects to blades the management unit 108 can also be utilised for performing a redistribution of the data objects during operation of the cluster 100. Such a re-distribution is beneficial as the size of the data objects usually changes over time and/or users of a specific application are added such that the evenness of the distribution can be improved by re-distributing the objects from time to time.

A re-distribution procedure can be initiated manually by an administrator or it can be performed at pre-programmed points of time. If the 'automatic' setting has been selected and stored in the table 130 the time reference provided by clock 132 is compared with the 'time' setting stored in the table 130. When the current system time as provided by clock 132 is identical with the 'time' setting, the re-distribution procedure is initiated automatically. Preferably this is done daily or at shorter or at longer time intervals depending on the change dynamic of the data objects.

The user interface 114 can provide a visualisation of the current distribution of the data objects over the blades as well as a visualisation of a suggested re-distribution of the data objects over the blades. This allows an administrator to review a re-distribution of data objects over the blades that has been calculated by one of the program modules 116, 118, or 120 before it is actually applied to the blades.

In order to facilitate the performance of a re-distribution the management unit 108 has program module 113. Program module 113 is executed by processor 110 and interacts with program module 112 in order to provide a tool for manually or automatically performing a re-distribution procedure. The program module 113 calculates an expected duration that is required for applying a suggested re-distribution as stored in table 129. The calculation of the expected duration can be performed using a time parameter 131 that is stored in storage system 126. The program module 113 determines the sub-set of the blades that are affected by the re-distribution by comparing the current distribution stored in table 127 and the suggested re-distribution stored in table 129. On this basis the program module 113 determines the objects that are assigned to the affected blades in the suggested re-distribution. The aggregated size of these data objects is proportional to the amount of time that is required to perform the re-distribution. This expected duration can be calculated by the program module 113 by multiplying the aggregated object size by the time parameter 131. The expected duration can be displayed on the user interface in order to facilitate a user's decision when to apply the re-distribution.

A load profile 133 can be stored in the storage system 126. The load profile 133 shows the processing load of the cluster 100 over time. Typically the processing load will vary substantially over time. For example, there are typically peak times in the morning and in the afternoon and times with minimal or no processing load during the night. The load profile 133 can be visualized on the user interface in order to facilitate a user's selection of an appropriate start time for performing the re-distribution procedure in view of its expected duration. Alternatively, the program module 113 can automatically select the start time using the load profile 133. This can be done by searching a time interval in the load profile 133 that has a minimal processing load and a sufficient length to accommodate the expected duration required for performing the re-distribution procedure.

Figure 2:
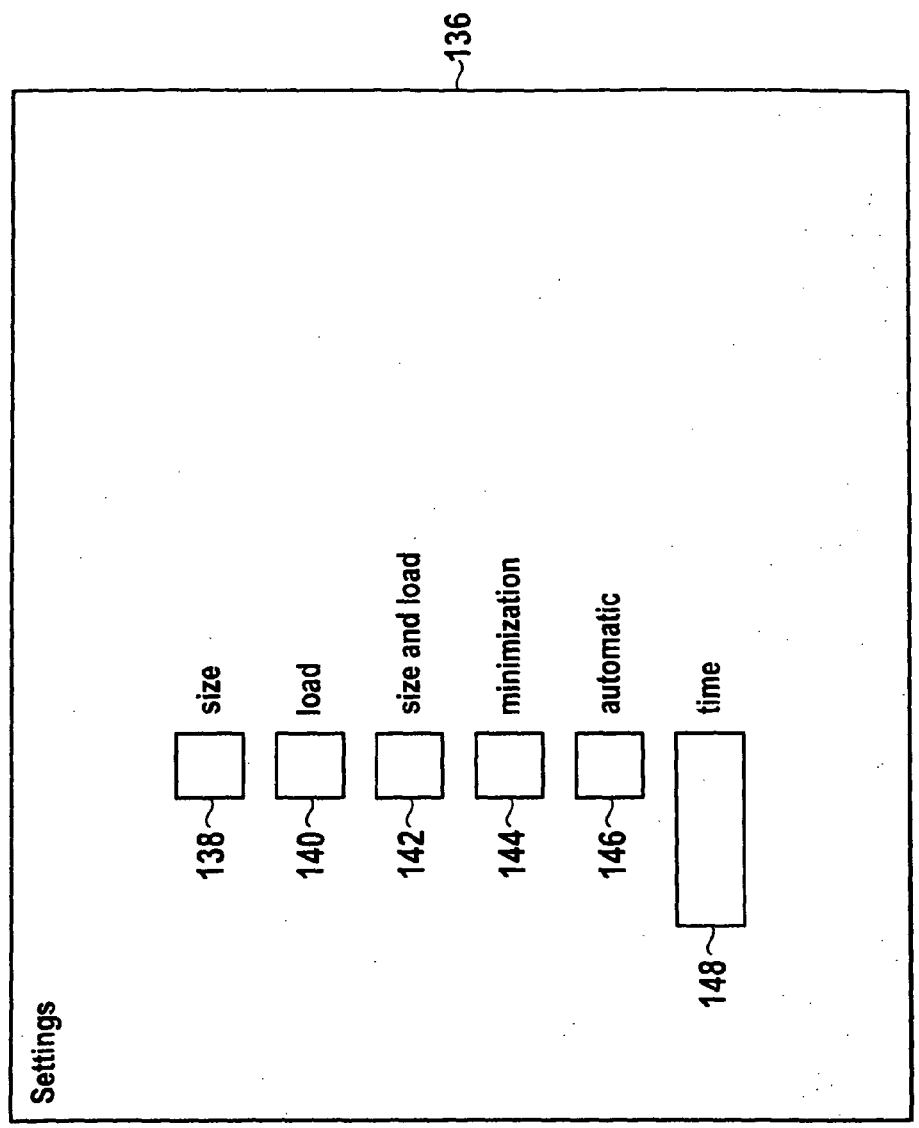

FIG. 2 shows a window 136 that is generated by the program module 114 and displayed on monitor 134 for an administrator's entry of settings that determine the mode of operation of the management unit 108. The window 136 has radio-buttons 138 to 142 and check-boxes 144 and 146. Radio-button 138 serves for selection of the program module 116 that implements the one-dimensional size balancing procedure for distributing the data objects over the blades. Radio-button 140 serves for selection of the program module 118 that takes into account the load parameters of the objects for the distribution procedure. Radio-button 142 serves for selection of the program module 120 that takes into account both size and load. Only one of the radio-buttons 138 to 142 can be pressed down at a time as the corresponding selections are mutually exclusive.

Check-box 144 serves for selection of the minimisation option, i.e. the execution of program module 122 for the determination of a minimum number of blades that are required before one of the program modules 116 to 120 is executed for distribution of the data objects over the minimum number of blades as determined by the program module 122.

Check-box 146 serves to select the 'automatic' option, i.e. the automatic initiation of the re-distribution procedure.

Entry field 148 serves for entry of a time when the automatic re-distribution procedure is to be initiated.

Figure 3:
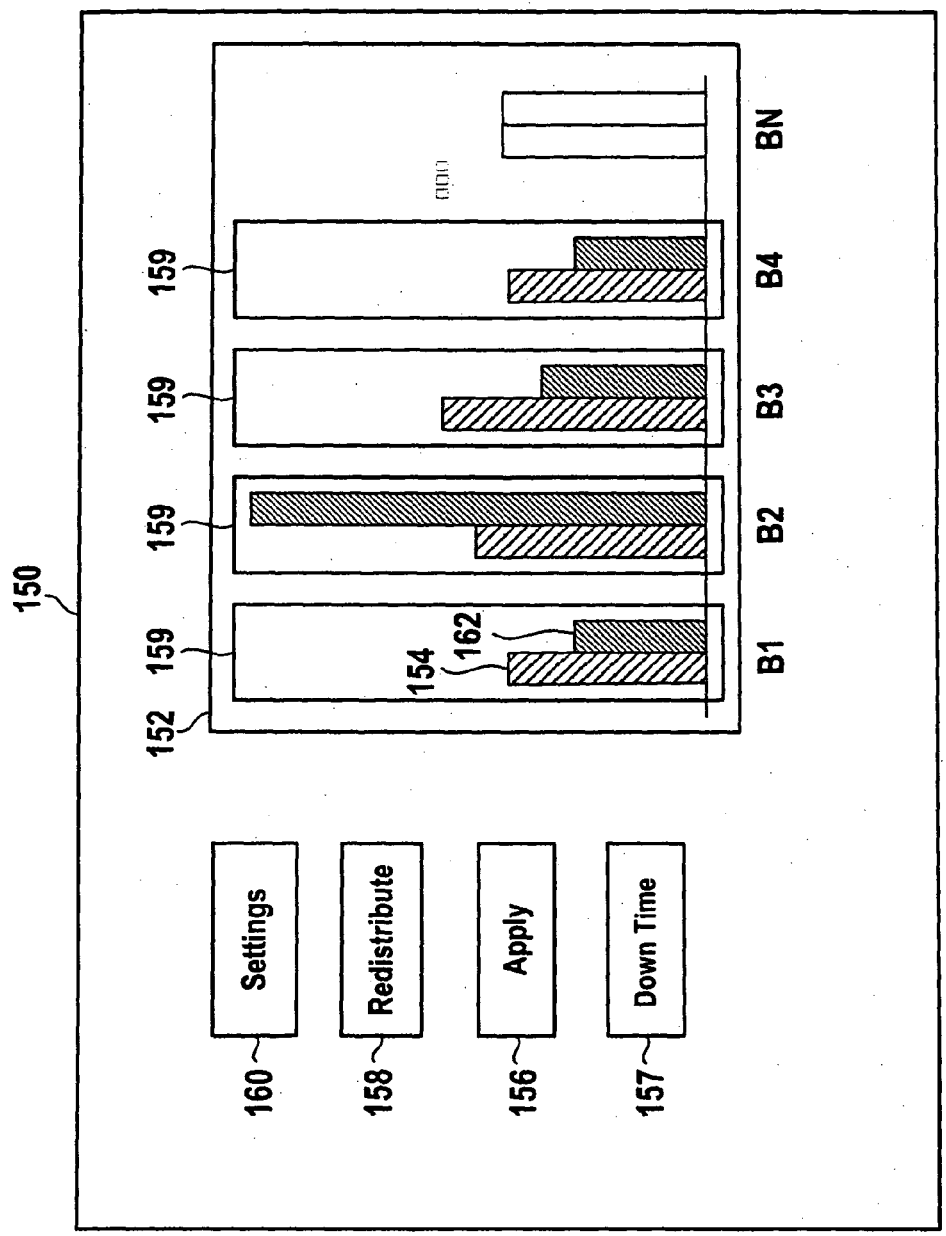
FIG. 3 illustrates a window for manually initiating the re-distribution.

FIG. 3 shows a window 150 that is generated by program module 114 in the manual mode. Window 150 shows a diagram 152 that visualises the current distribution of data objects over the blades by means of bars 154.

Window 150 contains virtual buttons 156, 158 and 160. When the administrator clicks on button 158 a re-distribution procedure is initiated in accordance with the settings stored in the table 130 (cf. FIG. 1). The result of the redistribution procedure is also visualised in the diagram 152 by means of bars-162. If the administrator approves the suggested re-distribution he or she presses the button 156 in order to apply the re-distribution to the blades.

If the administrator is of the opinion that the suggested re-distribution as visualised within a diagram 152 is not good enough, he or she can press on button 160 which opens window 136 as shown in FIG. 2. After having changed the settings the administrator can go back to the window 150 and enter a request for another suggestion for a re-distribution by pressing button 158.

The expected duration required for performing the redistribution is shown as "down time" in the display field 157 of window 150. The expected down time facilitates an informed decision when to initiate the re-distribution procedure.

Preferably, the diagram 152 identifies those blades that are affected by the suggested re-distribution. In the example considered here the blades B1, B2, B3, B4 are affected whereas the blade BN is unaffected by the re-distribution as the objects assigned to the blade BN remain the same in the current distribution and the suggested re-distribution. Those blades that are affected by the re-distribution are highlighted by the symbols 159 shown on window 150.

Depending on the employed blade server technology a reassignment of data objects to a blade may require that the process running on that blade is shut down and restarted. As a consequence the affected blades become temporarily unavailable during the re-distribution procedure. The information regarding which ones of the blades would become temporarily unavailable during the re-distribution procedure can be another valuable decision criteria for the administrator's decision when to initiate the re-distribution.

Figure 4:
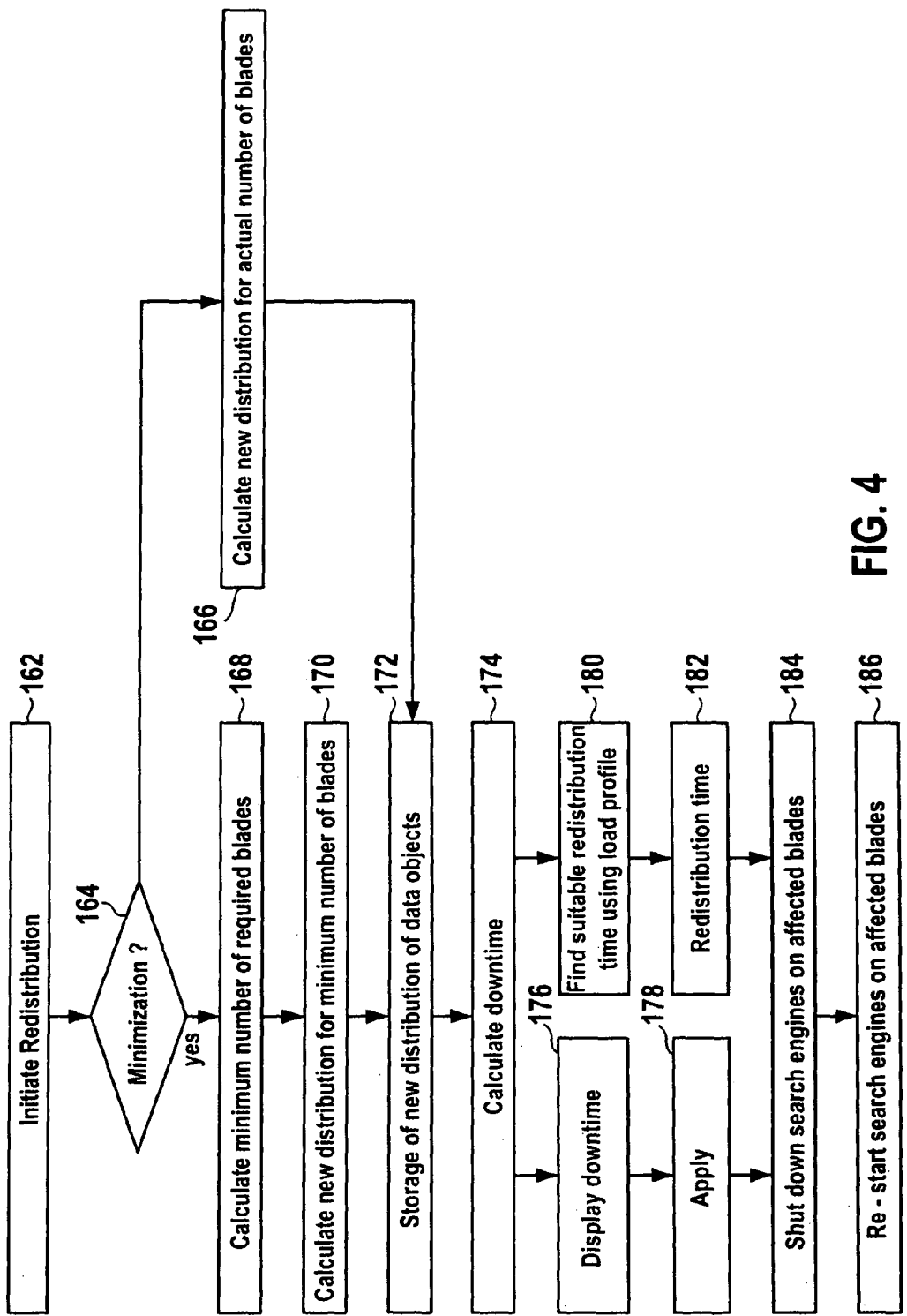
FIG. 4 illustrates a preferred embodiment of a method of the invention.

FIG. 4 shows a corresponding flow chart. In step 162 a request for initiation of a re-distribution procedure is received. This can be due to a manual input of the request by the administrator or due to an automatic request that is made by the program 112 when the system time provided by the clock 132 equals the "time" setting as stored in the table 130 (cf. FIG. 1).

In step 164 it is checked whether the "minimization" setting is stored in the table 130. If this is not the case one of the program modules 116, 118 or 120 is executed in accordance with the settings in order to calculate a new distribution of the given number of objects over all of the available blades of the cluster 100 (step 166).

If the minimization parameter is stored in the settings, the control goes from step 164 to step 168 in order to calculate the minimum number of blades that are required to accommodate the given set of data objects. This calculation is performed by means of the program module 122. In step 170 the new distribution of the data objects over the blades is calculated for the minimum number of blades as determined in step 168. The remaining blades that are not required to accommodate the set of data objects can be used to assign another set of data objects or for other special data processing tasks. In step 172 the re-distribution of the data objects of the blades as determined in step 170 or in step 166 is stored in the table 129 (cf. FIG. 1).

In step 174 the expected down time is calculated. In a manual mode of operation the down time is displayed on the user interface (step 176); when the user clicks on the button 156 (cf. FIG. 3) the re-distribution procedure is initiated (step 178).

In an automatic mode of operation a suitable start time for starting the re-distribution procedure is searched (step 180) using the load profile and the expected down time. This is done by searching for a time span in the load profile that has a minimum load and a sufficient length for the down time. When the start time for the re-distribution procedure as determined in step 180 is reached, the re-distribution is initiated (step 182).

In step 184 the program module 113 requests program module 112 to shut down the search processes that are running on the blades that are affected by the re-distribution. This frees the respective memories 104 on the affected blades.

In step 186 the search processes are re-started on the affected blades by the program module 112. This encompasses loading of the data objects in accordance with the re-distribution onto the affected blades. As a consequence the re-distribution of the data objects is implemented. Those blades that are unaffected by the redistribution procedure can continue to operate and respond to data processing recalls during the re-distribution.

Figure 5:
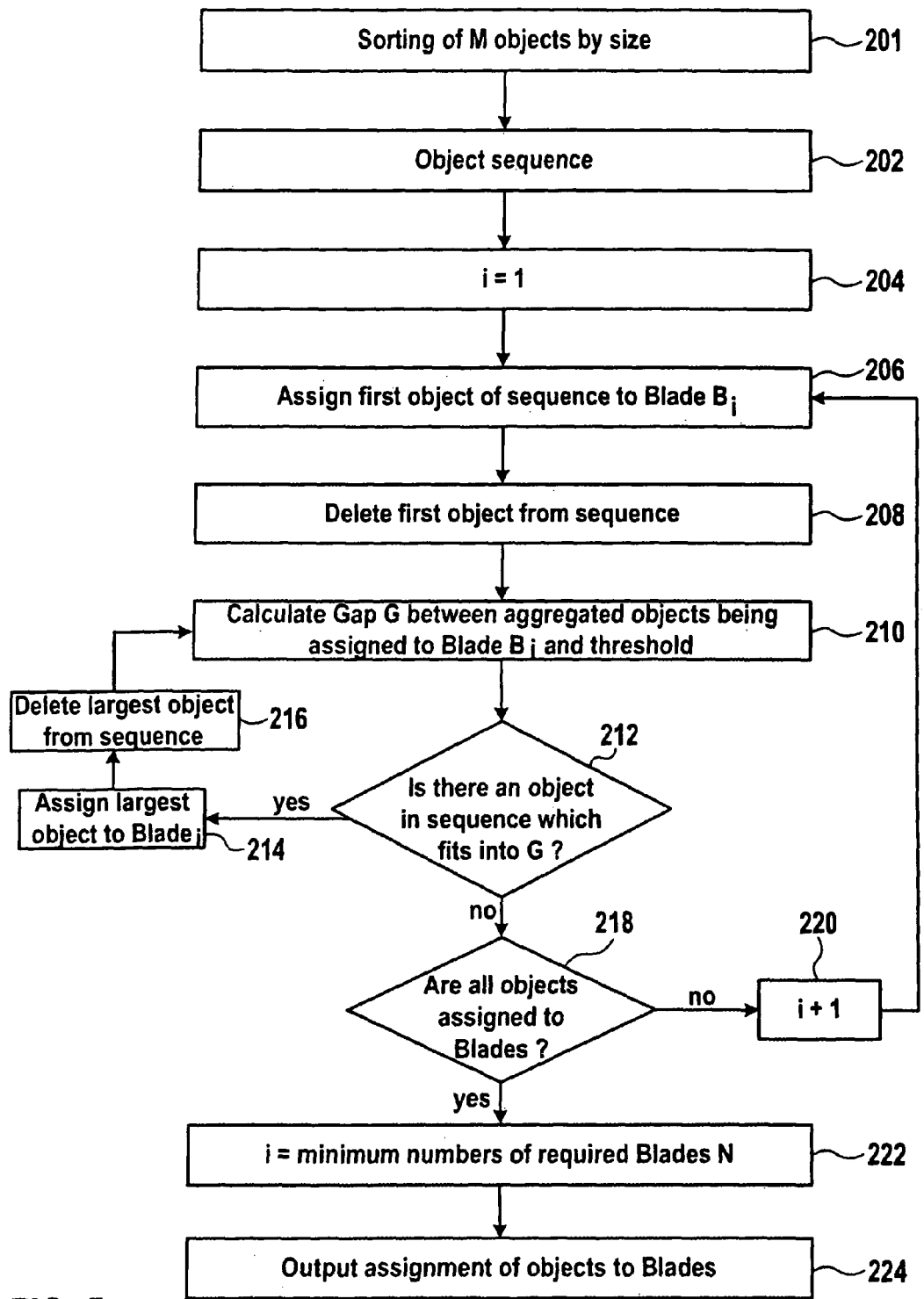
FIG. 5 is a flow diagram for assigning of objects to blades.

FIG. 5 shows a one-dimensional procedure for determining the minimum number N of blades that are required to accommodate a given set of data objects. This procedure can be implemented by the program module 122.

In step 201 a sorting operation is performed in order to sort the M objects by size. The corresponding object sequence is provided in step 202. In step 204 the index i for the blades is initialized to one.

In step 206 processing of the object sequence starts in the order starting with the largest object of the sequence. The first object of the sequence, which by definition is the largest object of the sequence, is assigned to blade B1 in step 206. In step 208 the first object which has been assigned to blade B1 is deleted from the sequence.

In step 210 the size of the objects, which have been already assigned, to blade B1 is added up and a gap G between the aggregated object size and a threshold is calculated. When the assignment procedure of FIG. 5 is carried out for the first time, the threshold is the storage capacity of one of the blades.

In step 212 it is determined whether there remains an object in the sequence, which fits into the gap G. If this is the case, the largest of these objects is assigned to the blade B1 in step 214 and deleted from the sequence before the control goes back to step 210.

If there is no such object which fits into the gap G, step 218 is carried out. In step 218 it is determined whether all objects have already been assigned to blades. In other words, in step 218 it is checked whether the sequence is empty. If this is not the case the index i is incremented in step 220 and the control goes back to step 206 to assign remaining objects of the sequence of the next blade B2.

If the contrary is the case, the index i equals the minimum number N of blades which are required to handle the M objects. This number is outputted in step 222. The minimum number N of blades can be a basis for an investment decision for purchasing of a corresponding number of blades if the current number of available blades is insufficient. Further, the assignment of objects to blades is outputted in step 224 in order to visualize the quality of the object size balancing.

Figure 6:
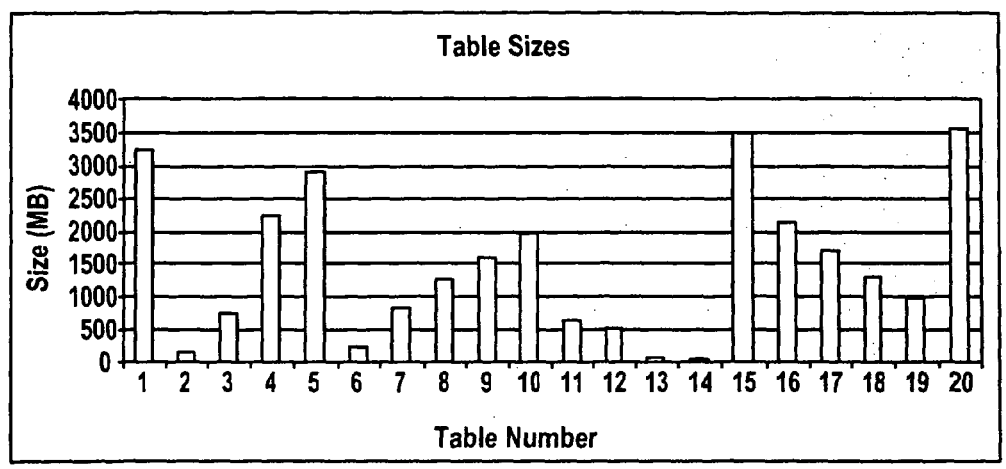
FIG. 6 is an example for tables that need to be assigned to blades.

FIG. 6 shows an example for a set of data objects to be distributed. In the example considered here the objects are a number of twenty different tables having various sizes between 50 MB and 3566 MB as indicated in FIG. 6. For example, table 1 has a size of 3250 MB, table 2 has 250 MB, table 3 has 750 MB, etc. The table sizes can be actual table sizes or average table sizes which have been obtained by monitoring a real life data processing system. Alternatively the table sizes are estimates for the purpose of planning cluster 100.

Figure 7:
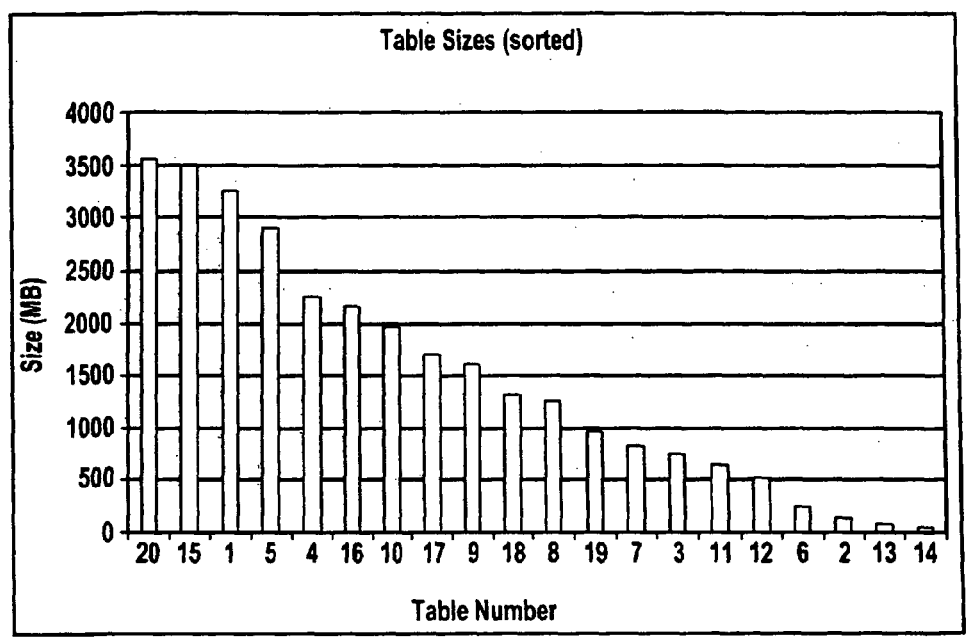
FIG. 7 shows the result of a sorting operation.

FIG. 7 shows the result of the sorting operation performed on the tables 1 to 20 of FIG. 6 (cf. step 202 of FIG. 5).

Figure 8:
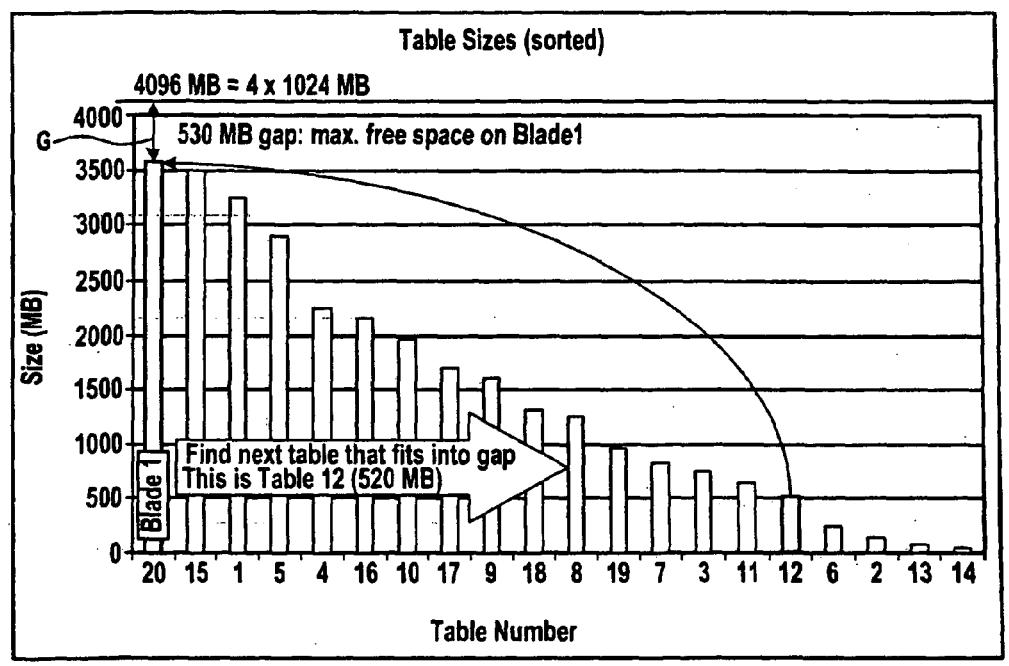
FIG. 8 shows a first step of assigning a table to a first one of the blades.
Figure 9:
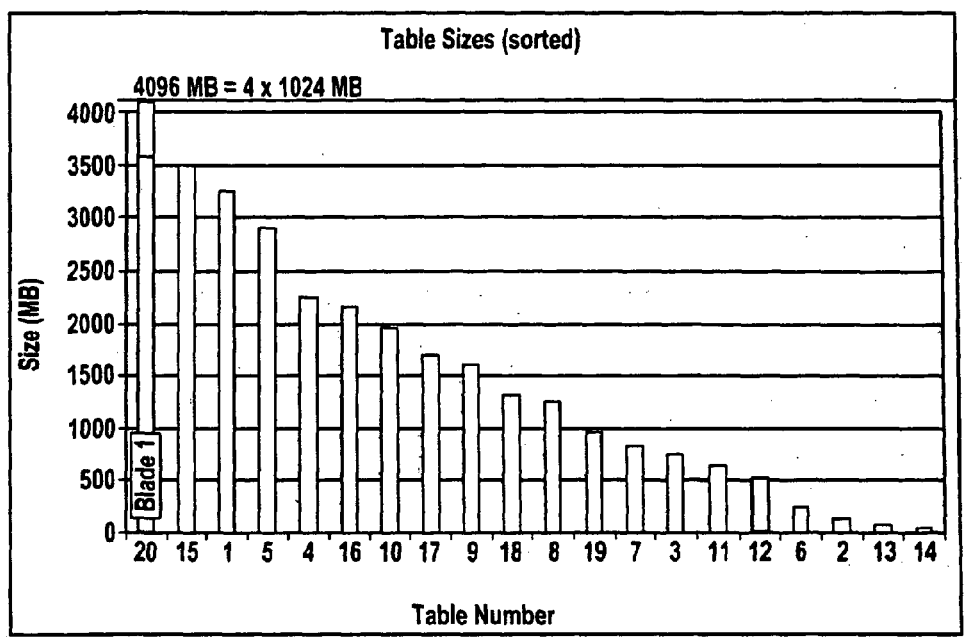
FIG. 9 shows a second step for assigning a table to the first blade.

FIG. 8 illustrates the assignment of the first object of the sequence, i.e. the largest table 20 to blade B1. In the example considered here, each blade has a storage capacity of 4 GB=4096 MB of main memory. Table 20 has a size of 2566 MB, which leaves a gap G of 530 MB of remaining storage capacity (cf. step 210 of FIG. 5).

Next it is determined whether there is a next object in the sequence which fits into the gap G. Table 12, which has a size of 520 MB is the largest table which fits into the gap G. This table 12 is thus also assigned to blade 1. The aggregated size of the objects assigned to blade 1, i.e. table 20 and table 12, is 4068 MB, which leaves a gap G of 10 MB. This gap G of 10 MB is too small to accommodate even the smallest remaining object of the sequence of tables.

As there remain tables in the sequence which have not yet been assigned to a blade the index i is incremented and the assignment procedure goes to the next blade B2 (cf. steps 218 and 220 of FIG. 5). With respect to blade B2 the above-explained procedure is carried out again on the basis of the unassigned tables, which remain in the sequence.

Figure 10:
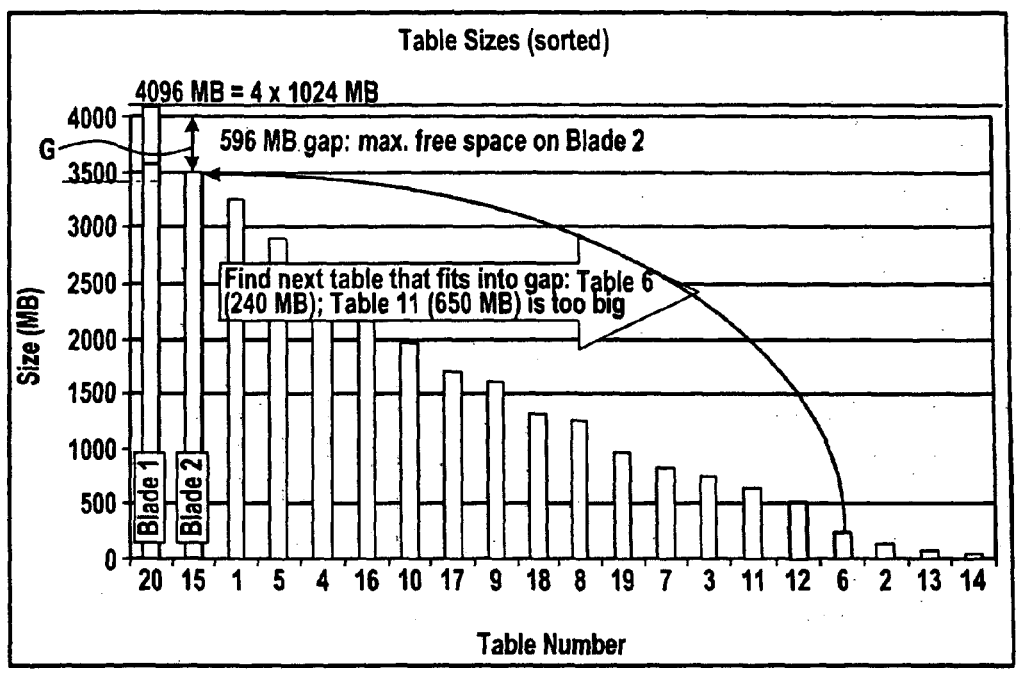
FIG. 10 shows a first assignment of a blade to a second blade.
Figure 11:
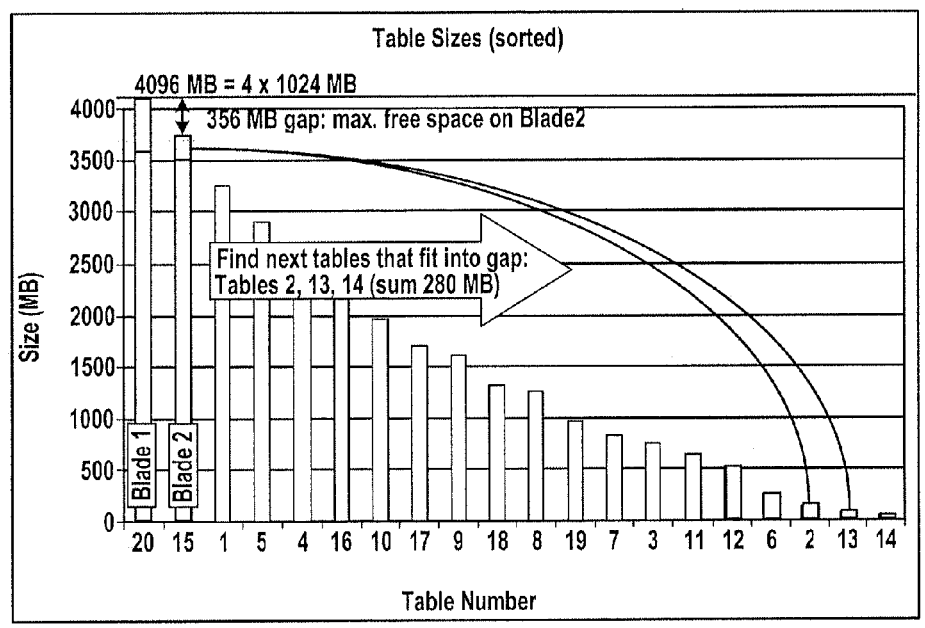
FIG. 11 shows a second assignment of a table to the second blade.
Figure 12:
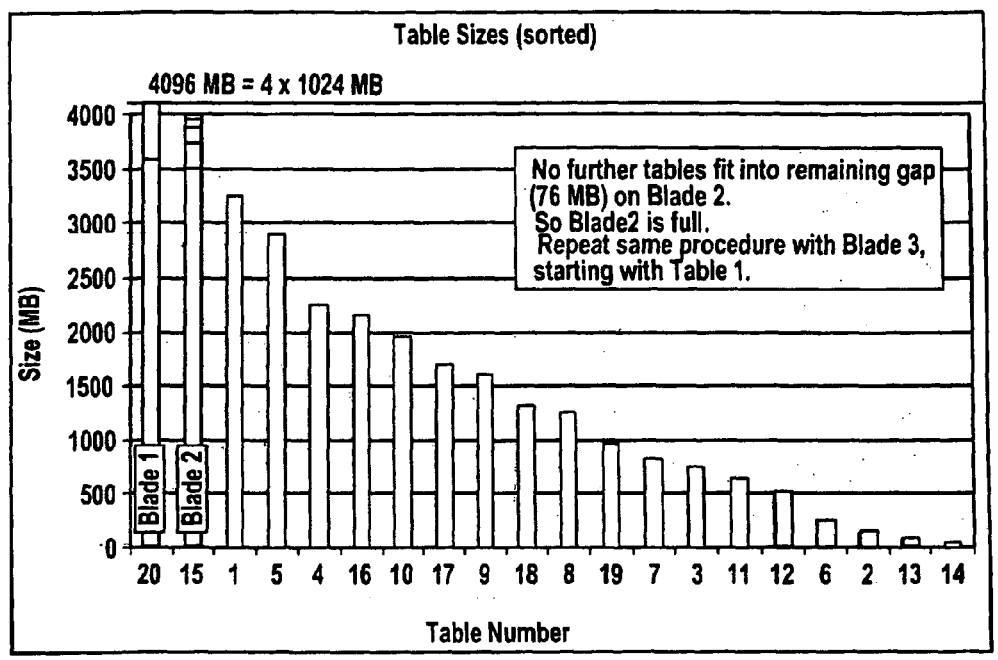
FIG. 12 shows an assignment of three further tables to the second blade.

This way the largest remaining table of the sequence, i.e. table 15, is assigned to blade B2 which leaves a gap G of 596 MB. The gap G is filled with tables 6, 2, 13 and 14 as illustrated in FIGS. 10 and 11. The resulting assignment of tables to blade B2 is shown in FIG. 12.

Figure 13:
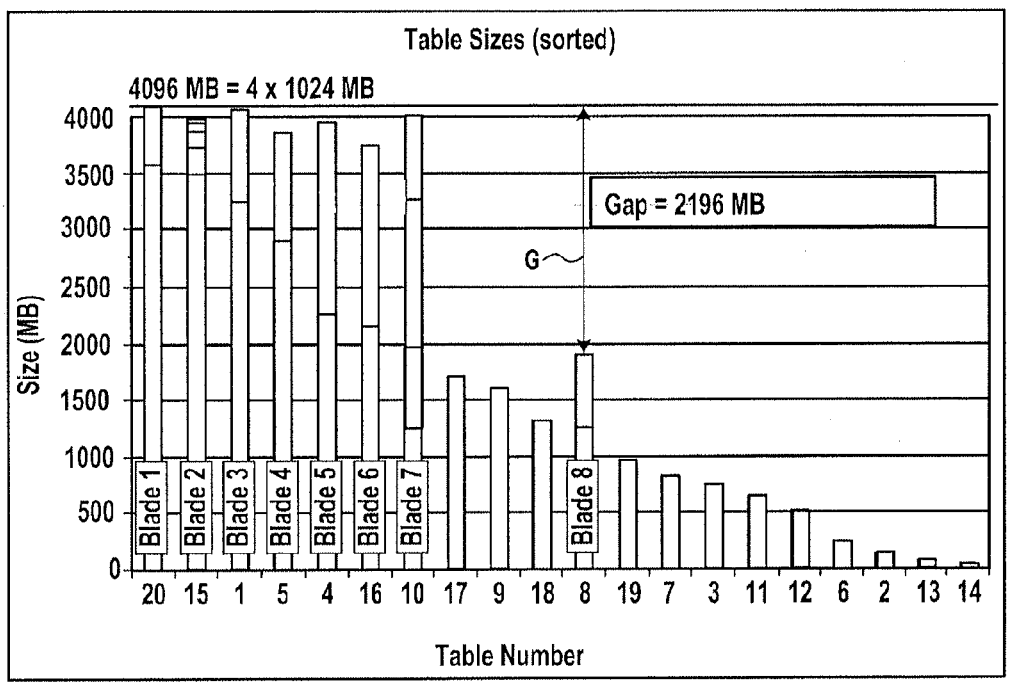
FIG. 13 shows the resulting assignment of tables to blades as a result of the assignment procedure.

The aggregated size of the tables, which have been assigned to blade B2, i.e. tables 15, 6, 2, 13 and 14, leave a gap G of 76 MB which is not enough to accommodate the smallest unassigned table, i.e. table 11, of the sequence. Thus, the index i is incremented and the assignment procedure is continued for the next blade B3. This process goes on until all tables of the sequence have been assigned to one blade B1. The result of the assignments of tables to blades is illustrated in FIG. 13.

Figure 14:
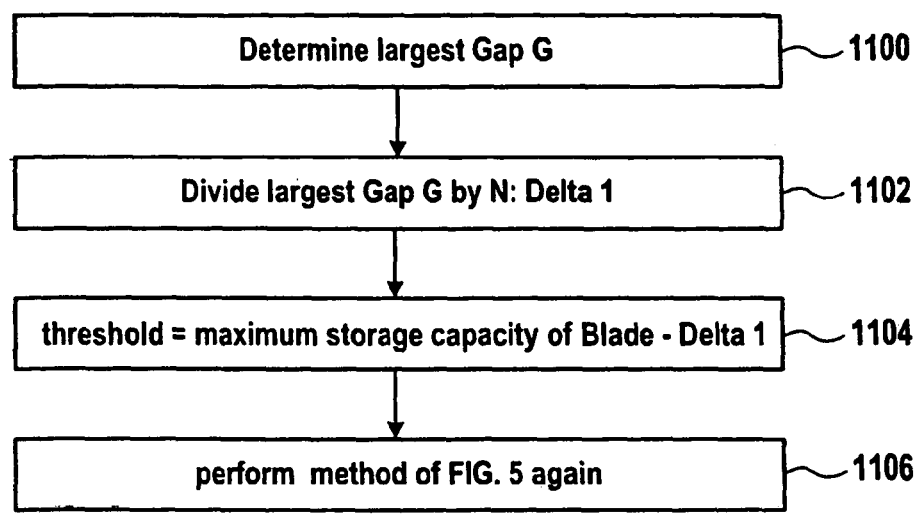
FIG. 14 is illustrative of a one-dimensional procedure for refinement of the result obtained by performing the method of FIG. 5, where the procedure of FIG. 5 is performed again with a lower threshold.

In addition to the assignment of tables to blades this way the minimum number N of blades, which are required for handling of the given number of tables (cf. FIG. 6), is obtained. In the example considered here, the resulting assignment of tables to the N=8 blades leaves a gap G of 2196 MB on blade 8. In order to further improve the object size balancing the method of FIG. 14 is carried out.

In step 1100 the largest gap G is determined. In the example shown in FIG. 13, this is the gap G of blade B8. The other blades B1 to B7 have smaller gaps between the aggregated size of the tables assigned to the corresponding blade and the storage capacity of 4 GB.

In step 1102 the gap G determined in step 1100 is divided by the number N of blades. In the example of FIG. 13, this means that G=2196 MB is divided by N=8 in order to obtain the value of Delta 1=275 MB. In step 1104 a threshold is calculated by subtracting Delta 1 from the storage capacity, i.e. threshold=4096 MB−275 MB=3821 MB.

With the threshold calculated in step 1104 the method of FIG. 5 is performed again in step 1106. The resulting assignment of the objects to the blades is more evenly distributed due to the lowering of the threshold. This is illustrated in FIGS. 15 and 16 for the example of FIG. 13.

Figure 15:
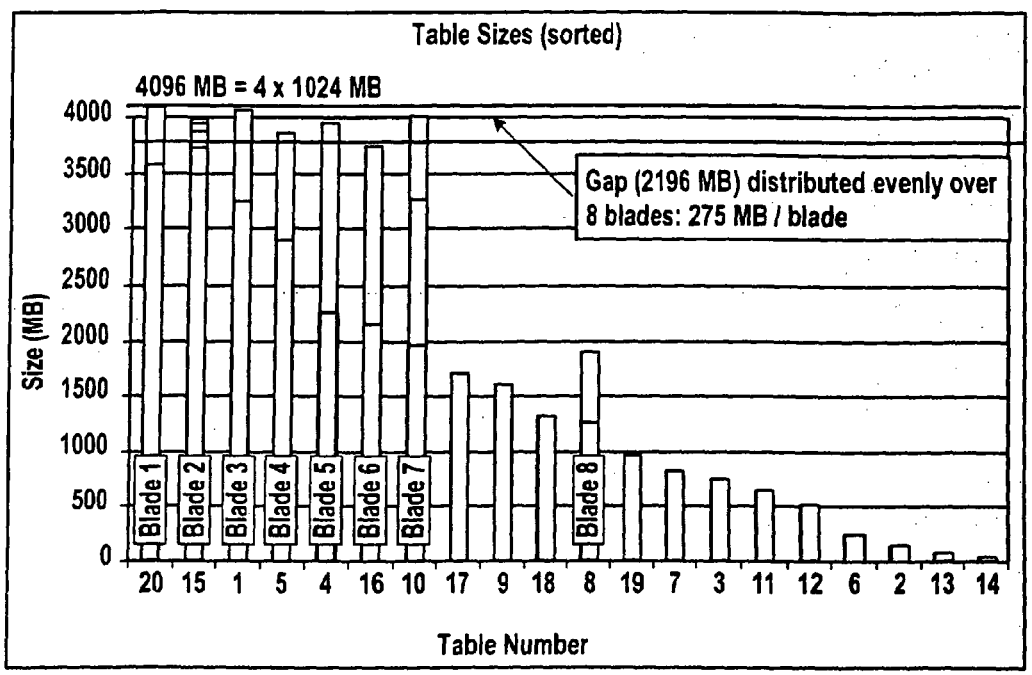
FIG. 15 is illustrative of the lower threshold.

FIG. 15 shows the threshold T, which has been calculated in step 1104. With the lowered threshold T the assignment procedure of FIG. 5 is restarted from the beginning whereby steps 201 and 202 do not need to be performed again, if the sorted object sequence has been stored when the procedure of FIG. 5 was carried out the first time.

Figure 16:
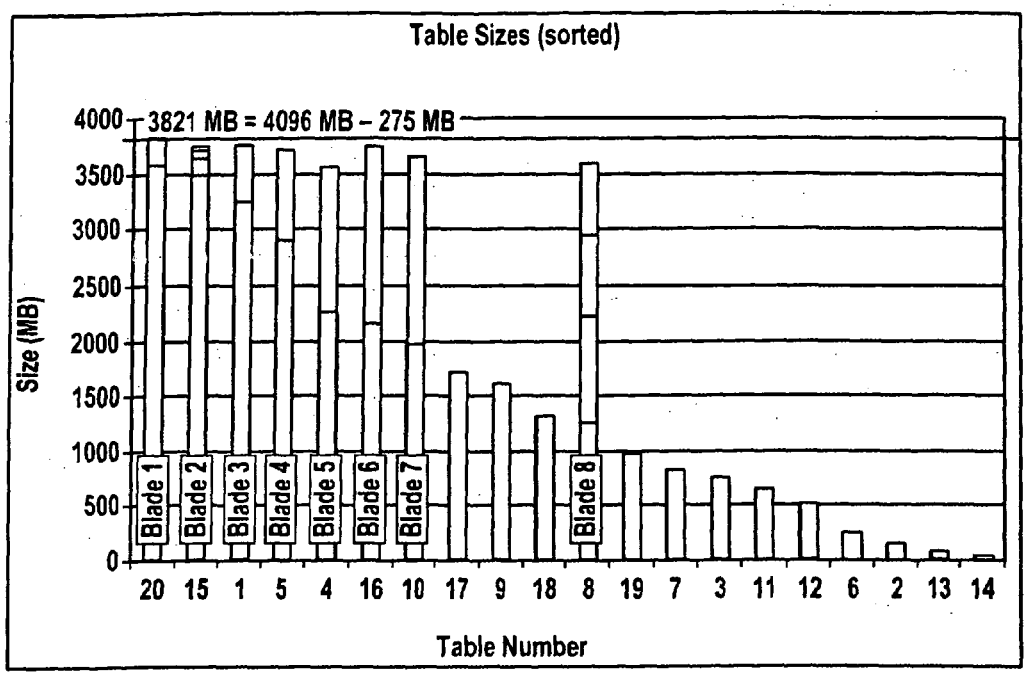
FIG. 16 is illustrative of the result of the renewed performance of the procedure of FIG. 5 with the lower threshold.

The resulting assignment of database tables to blades after the renewed performance of the procedure of FIG. 5 with the lowered threshold T is shown in FIG. 16. As apparent from the comparison of FIGS. 13 and 16 the load is more evenly balanced between the blades after the renewed assignment procedure.

Figure 17:
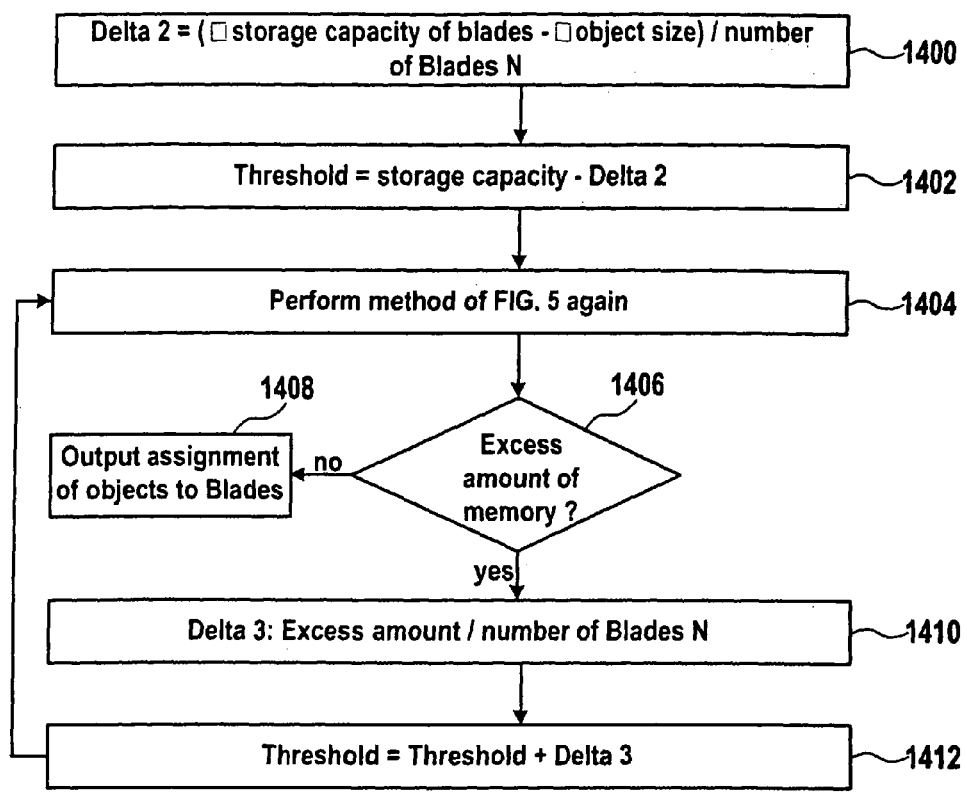
FIG. 17 is illustrative of another embodiment of a one-dimensional procedure for refinement of the distribution whereby the threshold is varied iteratively.

FIG. 17 shows an alternative approach for refining the object size balancing. In step 1400 Delta 2 is calculated by calculating the difference of the sum of the storage capacity of the blades and the sum of the object sizes of the objects to be assigned to the blades and by dividing the difference by the number of blades. In step 1402 the threshold is calculated by subtracting Delta 2 from the storage capacity. This threshold is the theoretical limit for the minimum storage capacities required on the individual blades in order to accommodate the objects if it where possible to distribute the objects with finest granularity.

In step 1404 the method of FIG. 5 is performed again with the threshold as determined in step 1402 whereby the number N is fixed, i.e. for the last blade BN which is processed the storage capacity will not be sufficient in most cases. In the resulting assignment of objects to blades, it is checked whether for the last blade, which has been processed, there is in fact an excess amount of memory requirement, which exceeds the storage capacity.

If this is not the case, the assignment of objects to blades is outputted in step 1408. If the opposite is the case, the excess amount of memory is divided by the number of blades N which provides-Delta 3. In step 1412 the threshold is incremented by Delta 3 and the control goes back to step 1404.

Steps 1404, 1406, 1410 and 1412 are carried out repeatedly until there is no longer an excess amount of memory.

Figure 18:
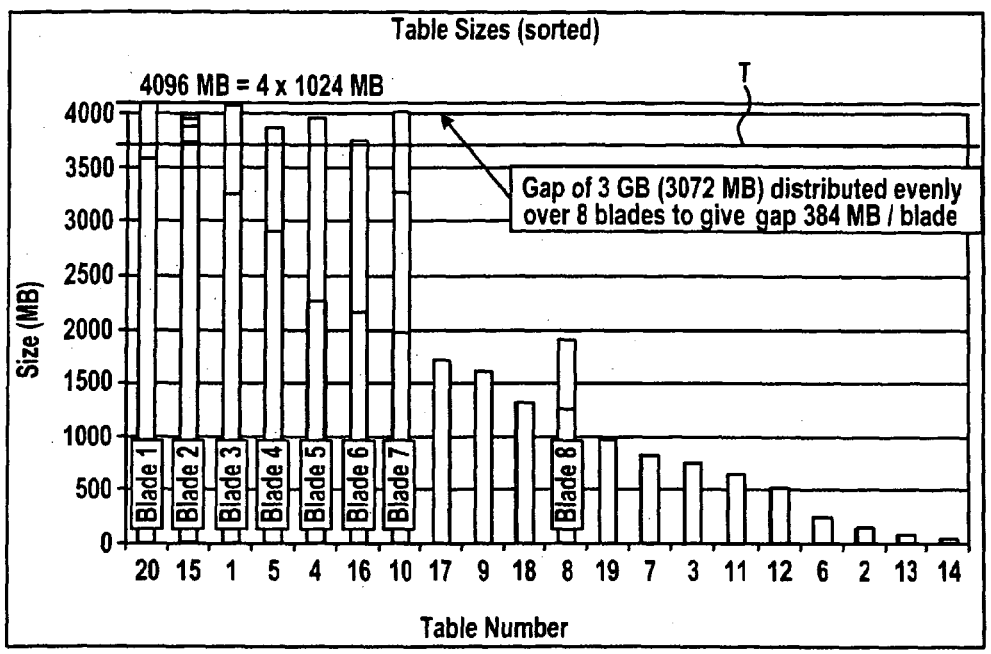
FIG. 18 is illustrative of the starting point of the first iteration for performing the method of FIG. 17.

FIG. 18 is based on the example of FIG. 13 and shows the threshold T as calculated in accordance with step 1402 of FIG. 17. In the example considered here, the difference between the sum of the storage capacities of the blades and the sum of the table sizes is 3 GB. The 3 GB are evenly distributed over the 8 blades, which provides the threshold T.

If there is no excess amount of memory as a result of one iteration but a gap between the aggregated size of objects, which have been assigned to the last blade. N, the procedure is continued in order to reduce the gap. This can be done by dividing the gap by the number of blades N and distributing the result over the blades by increasing the threshold correspondingly. The gap is calculated as follows: threshold T—sum of the sizes of the objects assigned to blade N.

In this instance the process is stopped if (i) there is no significant change from one iteration to the next (ii) the iterations toggle between different results, (iii) the standard deviation of the distribution of the objects does not improve or (iv) a maximum number of iterations has been reached.

Figure 19:
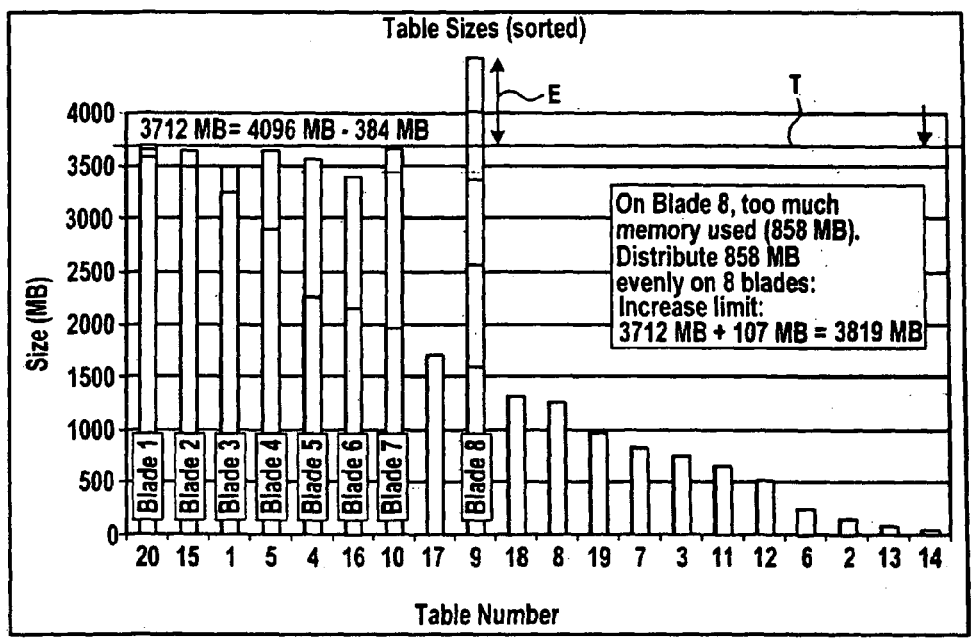
FIG. 19 shows the result of the first iteration.
Figure 20:
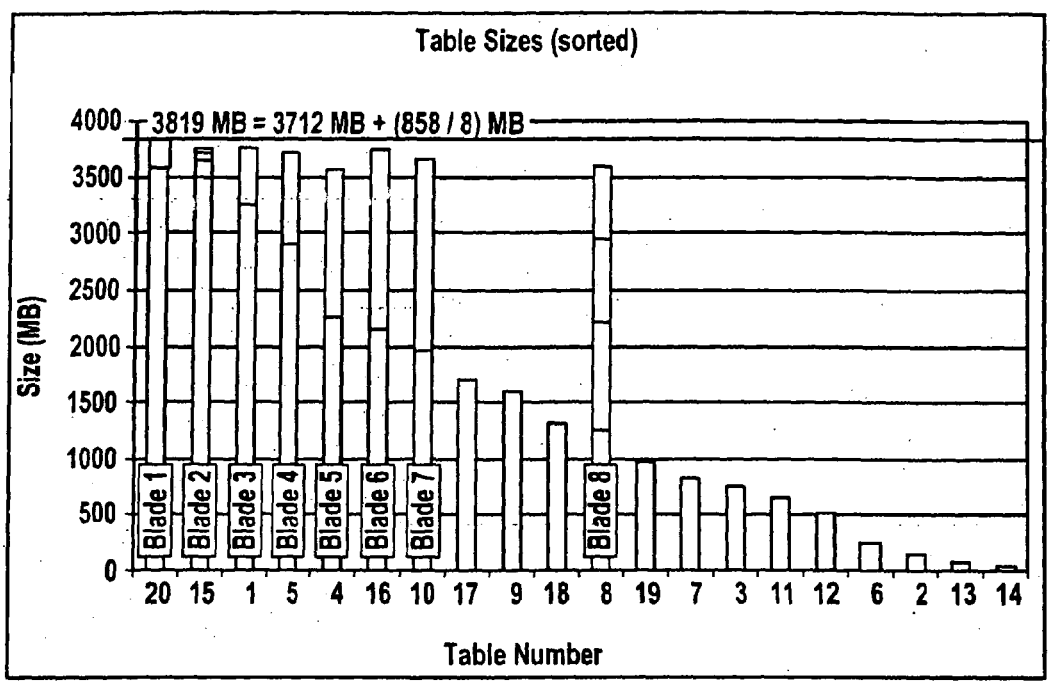
FIG. 20 shows the resulting assignment of objects to the minimum number of blades after completion of the procedure of FIG. 17.

FIG. 19 shows the result of the assignment procedure of FIG. 5, which has been performed with the threshold T as determined in step 1402. As a result of the assignment procedure there is an excess amount of memory E for blade B8. In the example considered here the excess memory amount E is 858 MB. In accordance with step 1410 the excess amount E is divided by the number of blades N=8. In accordance with step 1412 the resulting amount of memory Delta 3=107 MB is added to the threshold. Next the assignment method of FIG. 5 is carried out again with the increased threshold, which provides the result as shown in FIG. 20.

Figure 21:
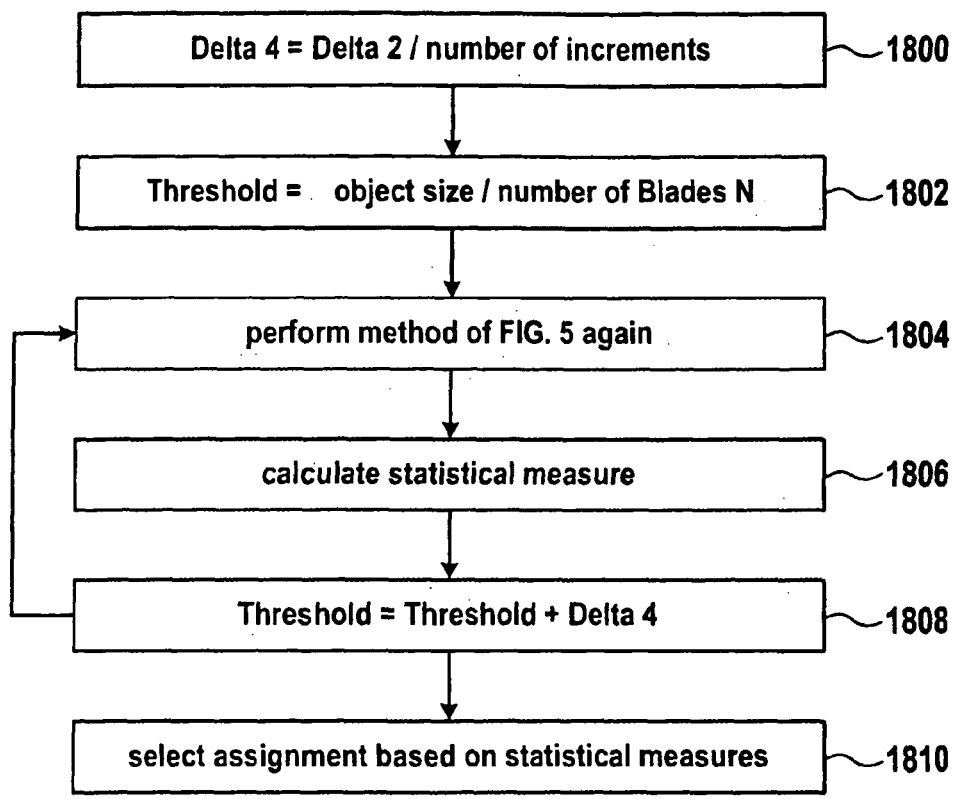
FIG. 21 is illustrative of a further preferred embodiment of a one-dimensional procedure for refinement of the distribution.

FIG. 21 shows a further alternative for refinement of the object size balancing. First the step 1400 of the method of FIG. 17 is carried out in order to calculate Delta 2. Delta 2 is equivalent to the gap between the theoretical limit, i.e. the threshold as calculated in step 1402 of the method of FIG. 17, and the storage capacity of a blade.

This gap is scanned by a stepwise variation of the threshold in order to identify an assignment of objects to blades which is balanced. The number of steps, i.e. the number of increments of the threshold, can be predefined or is user-selectable.

In step 1800 Delta 2 is divided by the number of increments, which provides Delta 4. In step 1802 the threshold is calculated by dividing the sum of the object sizes by the number of blades N. With this threshold the assignment method of FIG. 5 is performed again in step 1804.

In step 1806 a statistical measure is calculated as a quality measure for the assignment of objects to blades obtained as a result of step 1804. For example, the standard deviation of the aggregated sizes of objects assigned to each one of the blades is calculated.

In other words, for each blade the total of the sizes of the objects, which have been assigned to the blade, is calculated. This provides one total size per blade. Next the standard deviation is calculated for the total sizes.

In step 1808 the threshold is incremented by Delta 4 and the control goes back to step 1804. This procedure is continued until the threshold has reached the storage capacity, i.e. the upper limit.

In step 1810 one of the assignments obtained as a result of step 1804 is selected on the basis of the overall statistical measure. For example, the assignment having the lowest standard deviation is selected.

Figure 22:
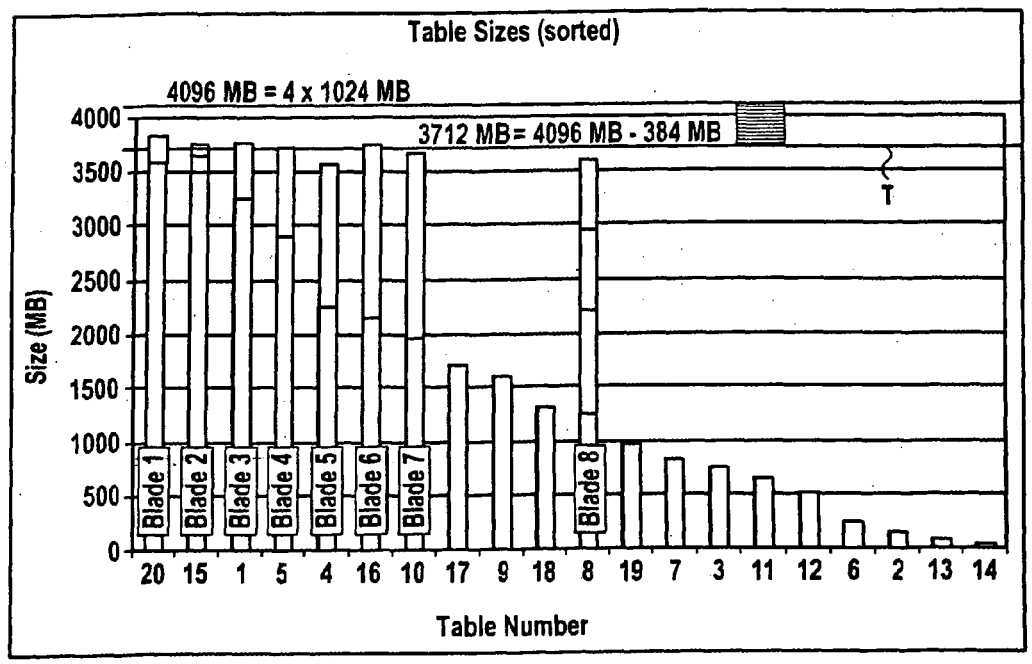
FIG. 22 is illustrative of the discrete continuum in which the threshold is varied and the result of the assignment procedure obtained by means of the one-dimensional procedure of FIG. 21.

FIG. 22 illustrates this method with respect to the example shown in FIG. 13. The threshold T of 3712 MB is obtained by the calculation of step 1802. From there the threshold is stepwise increased in increments of Delta 4, which is Delta 2=384 MB divided my the number of increments. For example, the number of increments is 100. For each assignment procedure the standard deviation of the table sizes assigned to blades is calculated for selection of one of the assignments. Preferably the standard deviations are calculated only for those assignments which fit onto the minimum number of blades.

Figure 23:
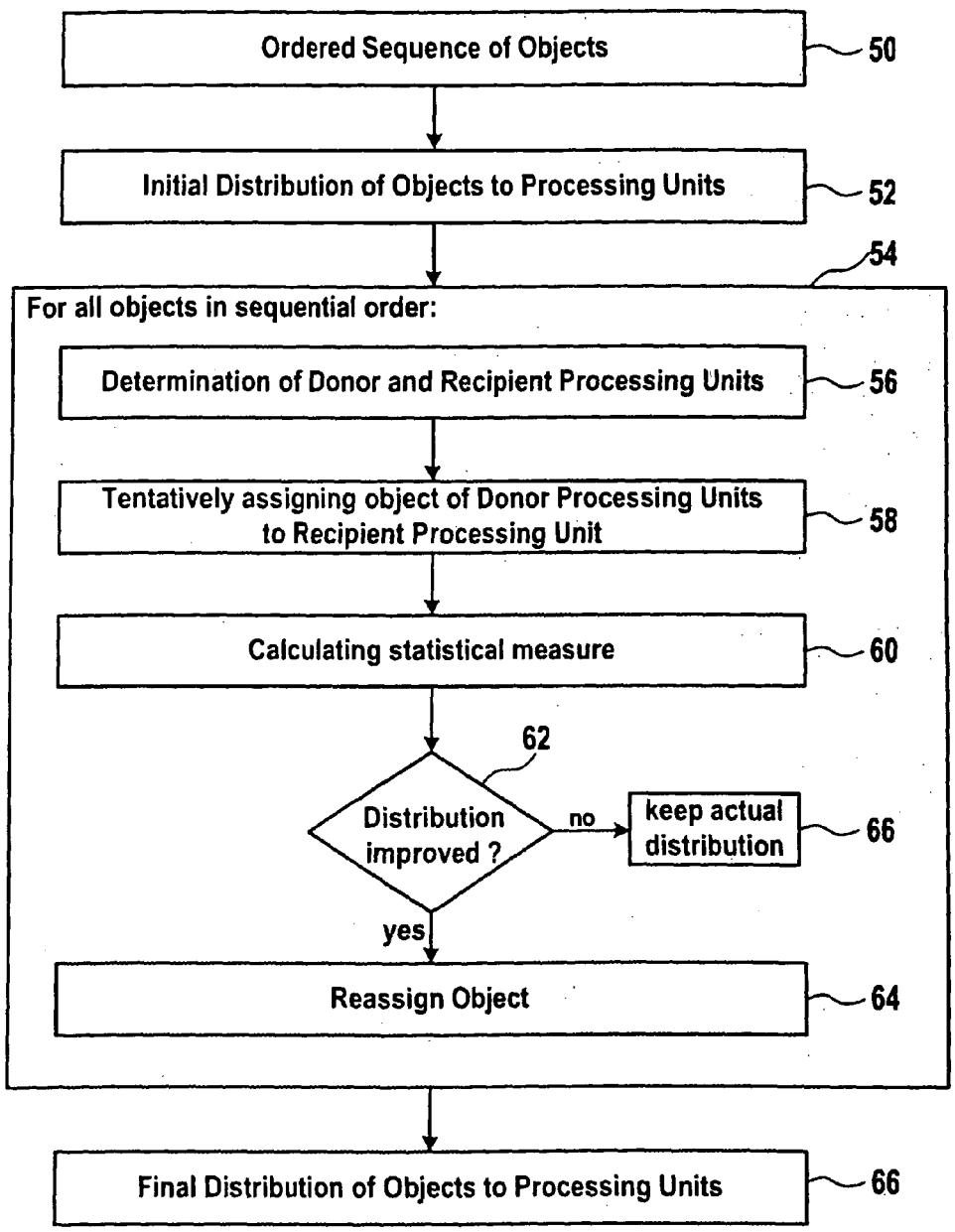
FIG. 23 shows a flowchart of a further preferred embodiment of a one-dimensional re-distribution procedure.
Figure 24:
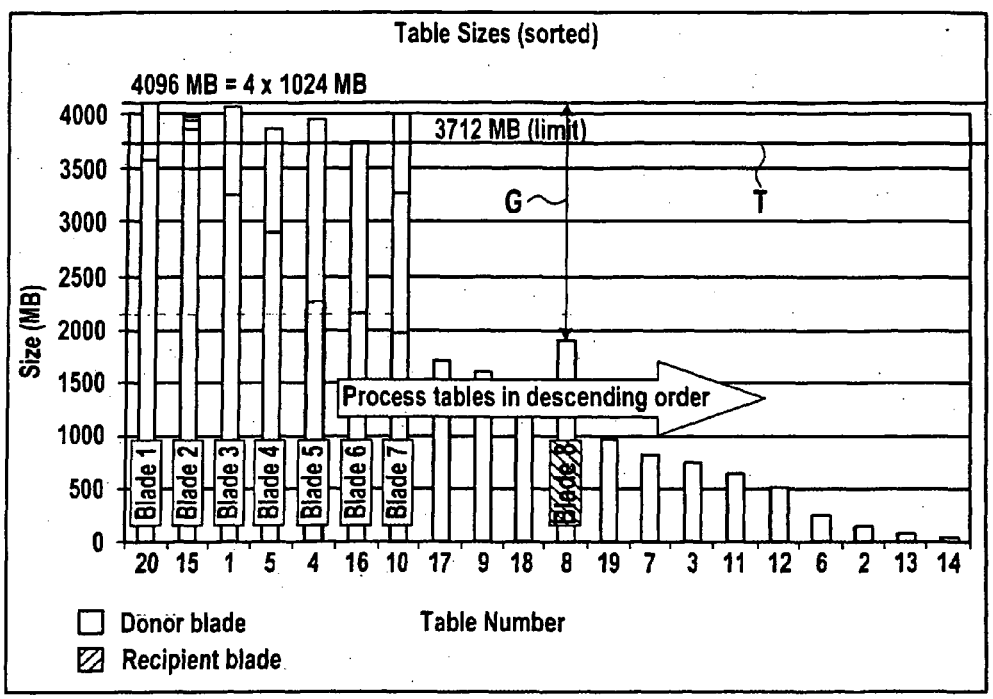
FIG. 24 is illustrative of the differentiation between a donor and recipient blade in the initial distribution on which the re-distribution procedure of FIG. 23 is carried out.

FIG. 23 shows a method for improving the smoothness of an initial distribution of objects over the processing units. In step 50 an ordered sequence of objects is provided. In the example considered here the first element of the ordered sequence requires the largest storage space. The ordered sequence is sorted in descending order of the object sizes.

In step 52 an initial distribution of objects to processing units is provided.

In the following step a loop 54 is performed for all objects of the sequence in the order of the sequence. In step 56 of loop 54 a determination of donor and recipient processing units is made on the basis of the actual distribution of objects to processing units. In the first iteration when the first object in the ordered sequence is considered the actual distribution is the initial distribution provided in step 52.

A donor processing unit is a processing unit which belongs to the first set of processing units, i.e. which has an aggregated size of assigned objects above a threshold level. Those processing units which are not donor processing units are by definition recipient processing units, i.e. processing units belonging to the second set having aggregated object sizes below the threshold. The threshold which is used for differentiating between donor and recipient processing units is the theoretical storage capacity minimum per processing unit that is obtained by calculating the total of the sizes of all objects to be assigned to processing units divided by the number of processing units.

In step 58 of loop 54 an object of a donor processing unit is tentatively assigned to a recipient processing unit that has sufficient remaining storage capacity for the considered object. In step 60 the statistical measure is calculated for the resulting tentative distribution of objects to processing units. The statistical measure is defined such that it indicates a degree of smoothness of the distribution.

In step 62 it is determined whether the tentative distribution has a higher degree of smoothness in comparison to the actual distribution, i.e. the initial distribution for the first iteration of loop 54. If this is the case the tentative reassignment is asserted and the object is reassigned to the recipient processing unit in step 64 which provides a new actual distribution. The new actual distribution forms the basis for the consecutive iteration of loop 54 with respect to the next object in the ordered sequence.

If the smoothness of the tentative distribution is not improved in comparison to the actual distribution the actual distribution is kept the same for the purpose of the consecutive iteration.

After all objects of the ordered sequence have been processed in loop 54 or in case there are no donor or no recipient processing units loop 54 stops.

As a result the final distribution of objects to processing units having an improved smoothness in comparison to the initial distribution is output in step 66. Preferably the procedure shown in FIG. 23 is implemented in the program modules 116 and 118 (cf. FIG. 1).

FIG. 24 to FIG. 36 show an example of the application of the procedure of FIG. 23 on the distribution as shown in FIG. 13. This distribution is entered as the initial distribution into the method of FIG. 23 (cf. step 52 of FIG. 23). Further the ordered sequence of the tables as shown in FIG. 7 is entered in step 50 of the method of FIG. 23. On this basis the method of FIG. 23 is performed in order to improve the smoothness of the initial distribution of FIG. 13. The corresponding iterations of the redistribution procedure are illustrated in FIGS. 24 to 36:

First a threshold is calculated that serves to differentiate donor and recipient blades. In the preferred embodiment considered here the threshold is the theoretical storage capacity minimum per blade that would be required for a perfectly even distribution of the aggregated object sizes per blade. The further processing is aimed to approximate this ideal situation despite the fact that the object size, e.g. the tables sizes, are finite and vary.

In the preferred embodiment considered here the sum of all table sizes of tables 1 to 20 is 29696 MB. Thus the threshold is 29696 MB divided by 8, i.e. the number of blades, which yields threshold T=3712 MB. Blades having aggregated table sizes above threshold T are by definition donor blades whereas blades having aggregated table sizes of below threshold T are by definition recipient blades. Taking the initial distribution of tables to blades provided by the method of FIG. 5 as a starting point blades 1 to 7 are donor blades whereas blade 8 is a recipient blade.

After the donor and recipient blades have been identified the processing of the tables starts in the order of the sorted sequence, starting with the largest table in the ordered sequence. In other words the processing starts with the left most table in the sequence, i.e. table 20, from where it proceeds to the smallest table in the sequence, i.e. table 14 (cf. the ordered sequence as shown in FIG. 5).

Recipient blade 8 has the storage capacity of 4096 MB. Tables 8 and 11 are assigned to blade 8 which have a total size of 1900 MB. Thus there is a gap G of remaining storage capacity of recipient blade 8 which can be used for reassigning of a table from one of the donor blades.

Figure 25:
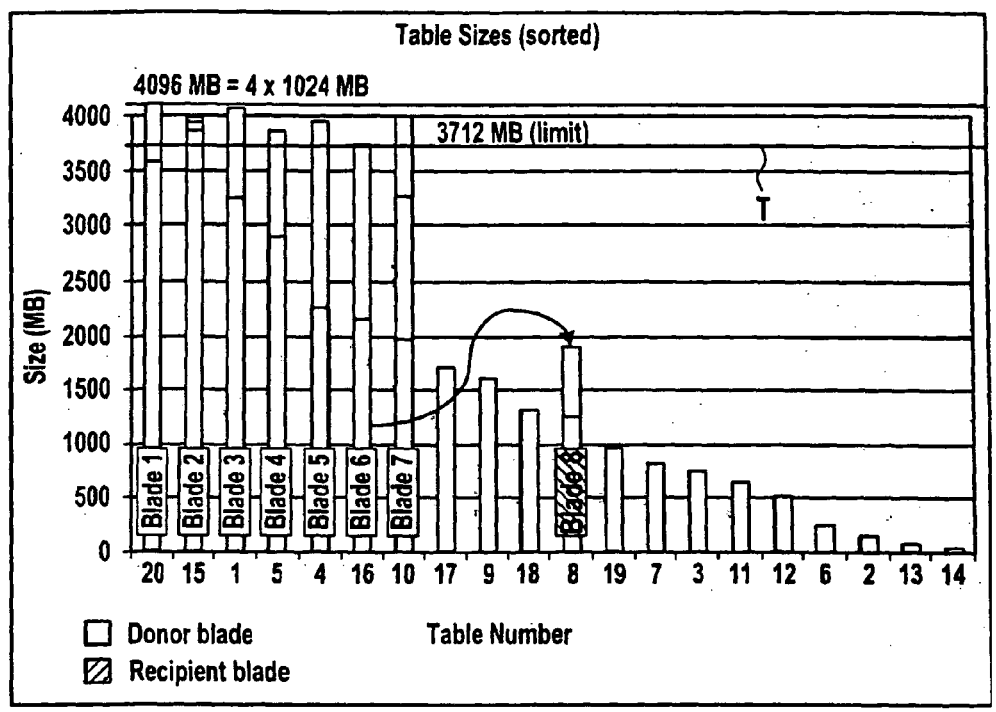
FIG. 25 is illustrative of a tentative assignment of table 16 to blade 8.

By processing the tables in the order of the sequence it is determined that tables 20, 15, 1, 5 and 4 do not fit into gap G of recipient blade 8 and can thus not be reassigned. However table 16 on donor blade 6 has a size of 2150 which fits into gap G=4096 MB−1900 MB=2196 MB. Table 16 is thus tentatively moved from the donor blade 16 to recipient blade 8 as illustrated in FIG. 25. In order to assess the quality of the resulting tentative distribution statistical measures are used.

In the preferred embodiment considered here the statistical measure is the standard deviation of the aggregated table sizes per blade. The standard deviation S of the initial distribution as shown in FIGS. 11 and 12 is 741,06 MB. The standard deviation of the tentative distribution of tables to blades that is obtained when table 16 is moved to recipient blade 8 is S=856,42 MB. Hence moving table 16 to recipient blade 8 increases the standard variance S. This indicates that the smoothness of the distribution of tables to blades deteriorates in the tentative distribution. Therefore this tentative distribution is dropped and no reassignment is made.

Figure 26:
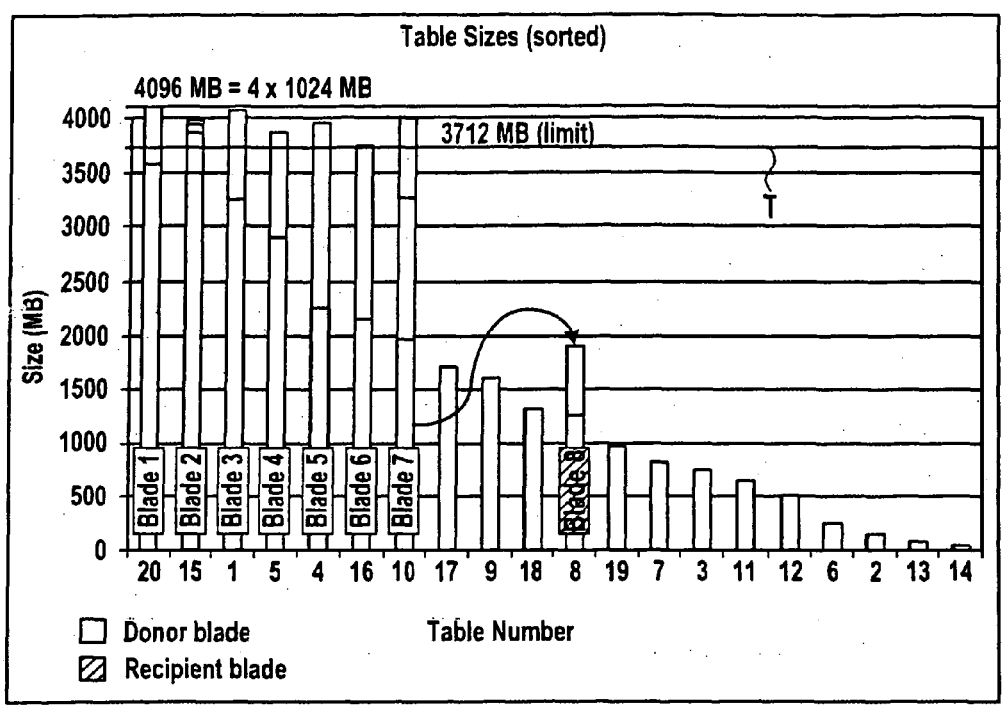
FIG. 26 is illustrative of the tentative re-assignment of table 10 from blade 7 to blade 8.

From here the control proceeds to processing of the next table in the sequence, i.e. table 10 on donor blade 7. Table 10 fits into gap G and is thus tentatively moved from donor blade 7 to recipient blade 8 as illustrated in FIG. 26. The standard deviation of the tentative distribution of tables to blades that is thus obtained is S=673.41 MB which is below the standard deviation of the initial distribution.

As a consequence the tentative distribution of FIG. 26 is accepted and table 10 is in fact moved from donor blade 7 to recipient blade 8. This move makes blade 8 a donor blade as the total size of the tables that are assigned to blade 8 surpasses threshold T. Likewise the move of table 10 makes blade 7 a recipient blade as the total size of the tables that remain assigned to blade 7 drops below threshold T.

Figure 27:
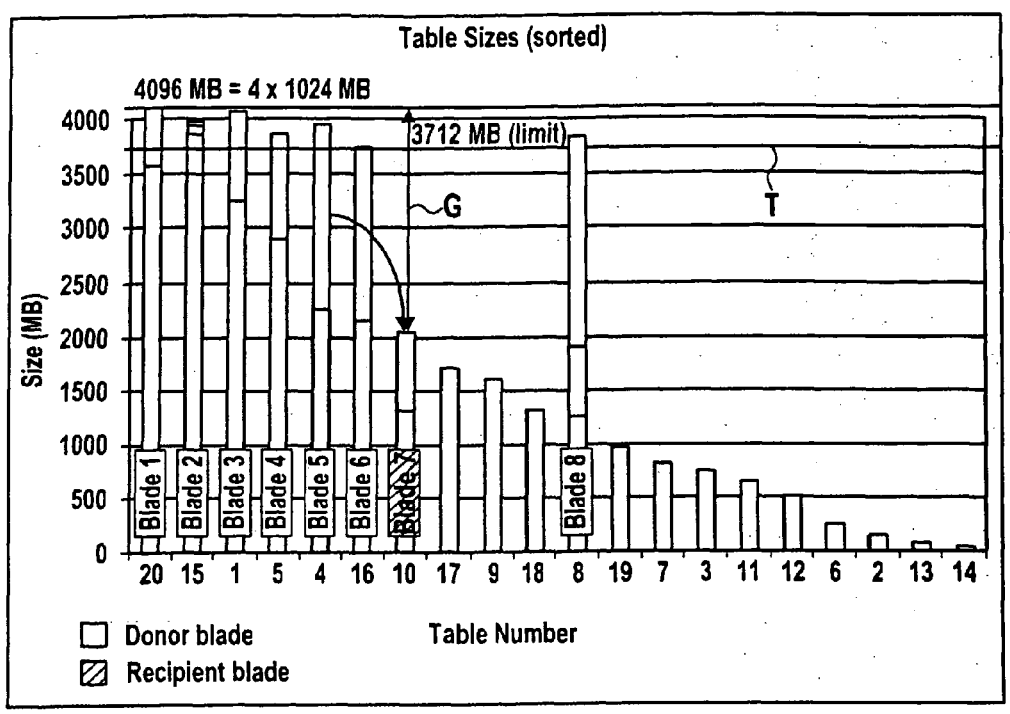
FIG. 27 is illustrative of the tentative re-assignment of blade 17 from blade 5 to blade 7.

The processing of the tables continues in accordance with the ordered sequence. The next table in the ordered sequence is table 17 that had been assigned to donor blade 5. As table 17 fits into gap G of recipient blade 7 it is tentatively moved there. The standard deviation of the resulting tentative distribution is S=605,02 MB which is below the standard deviation of the actual distribution obtained from the previous move of table 10 to blade 8. Thus the tentative distribution is accepted and table 17 is moved to recipient blade 7 as shown in FIG. 27.

Figure 28:
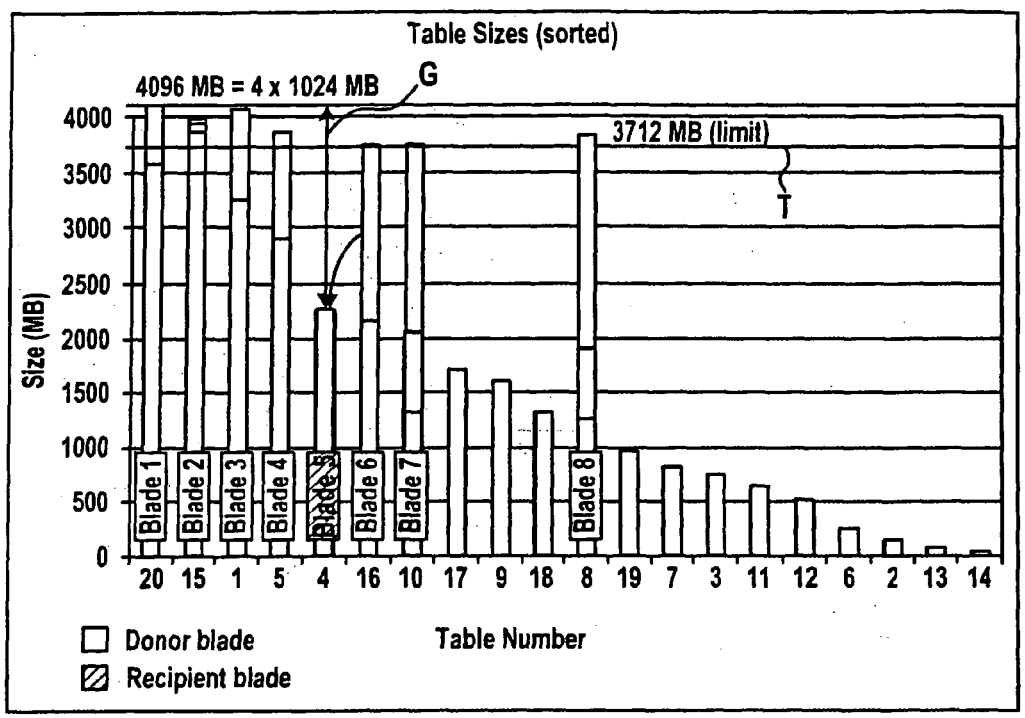
FIG. 28 is illustrative of a situation where there is no sufficient remaining storage capacity of a recipient blade.

The next table in the sequence is table 9 which had been assigned to blade 6. In the actual distribution of tables to blades which is obtained from the previous iteration blade 5 is a recipient blade whereas all the other blades are donor blades. Table 9 fits into gap G of recipient blade 5 as illustrated in FIG. 28. Table 9 but thus tentatively moved to blade 5 but this results in an increase of the standard deviation from 605,02 MB to 673,61 MB. Hence the distribution is not changed in this iteration and the processing continues with the next smallest table in the sequence, i.e. table 18.

Figure 29:
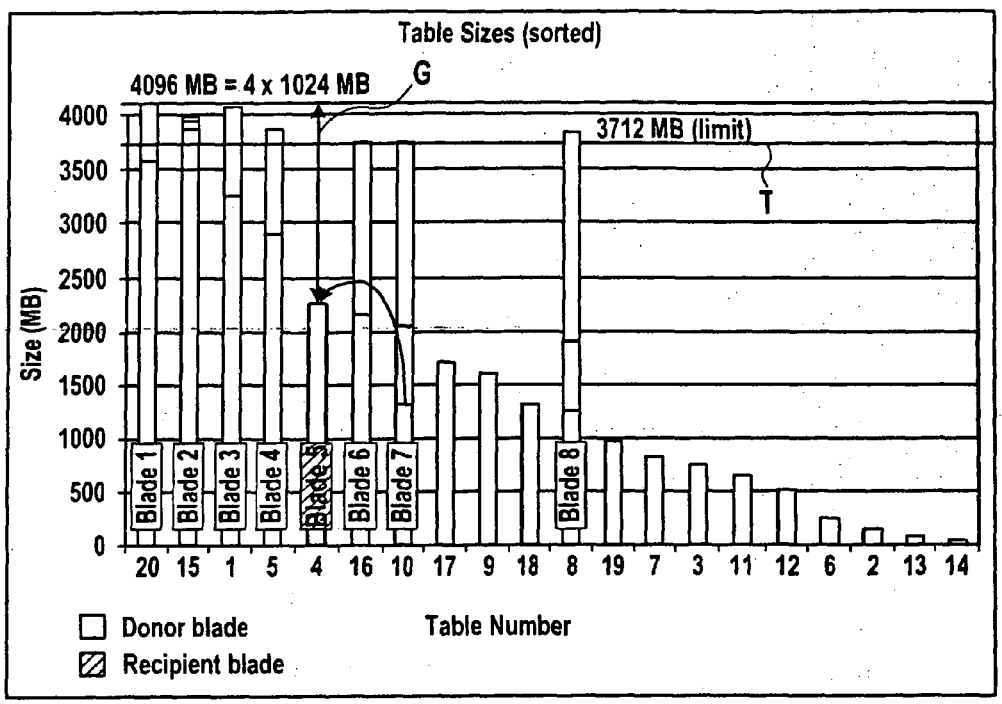
FIG. 29 is illustrative of a tentative re-assignment of table 18 from blade 7 to blade 5.

Table 18 does in fact fit into gap G and is thus tentatively moved from donor blade 7 to recipient blade 5. The resulting standard deviation S is 539,09 MB which is below the actual standard deviation of 605,02 MB obtained from the previous iteration. Thus the tentative distribution of FIG. 29 is accepted and table 18 is reassigned to blade 5.

Figure 30:
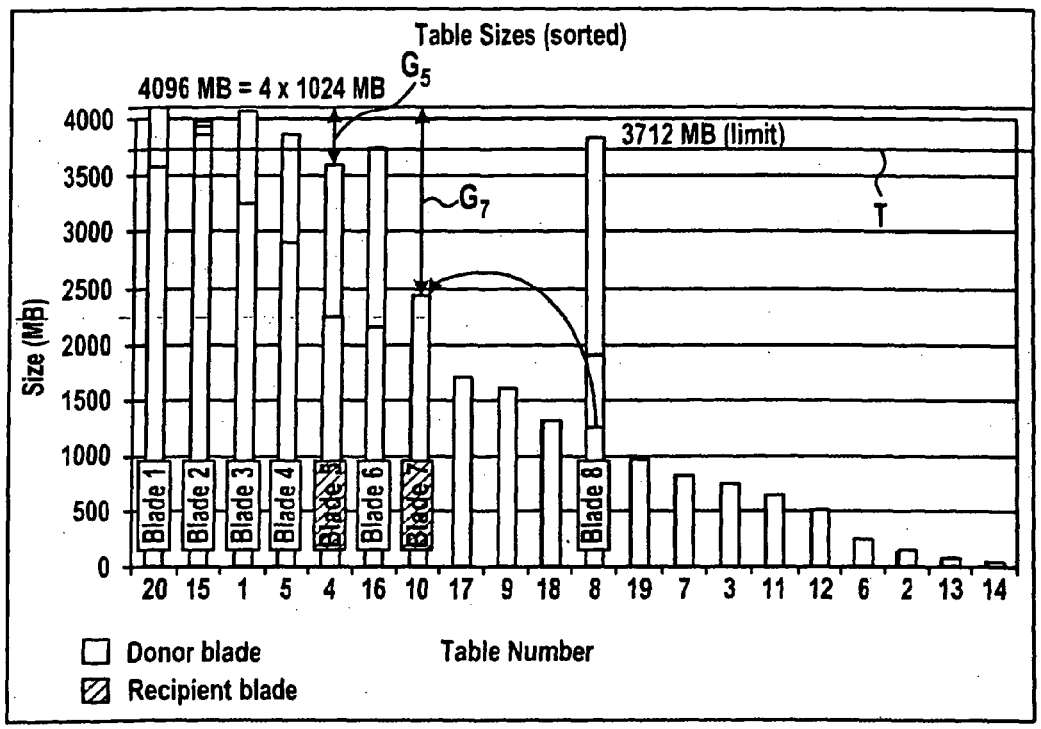
FIG. 30 is illustrative of a tentative re-assignment of table 8 from blade 8 to blade 7.

The next table in the sequence is table 8 that had been assigned to blade 8. In the actual distribution obtained from the previous iteration blades 5 and 7 are recipient blades whereas all other blades are donor blades. Table 8 is on donor blade 8 and does not fit into gap G5 of recipient blade 5. However table 8 does fit into gap G7 of recipient blade 7 and is thus tentatively moved to recipient blade 7. In the resulting tentative distribution the new standard deviation is 479,49 MB which is below the actual standard deviation of S=539,09 MB. The tentative distribution of FIG. 30 is thus accepted and table 18 is in fact moved from donor blade to recipient blade 7.

Figure 31:
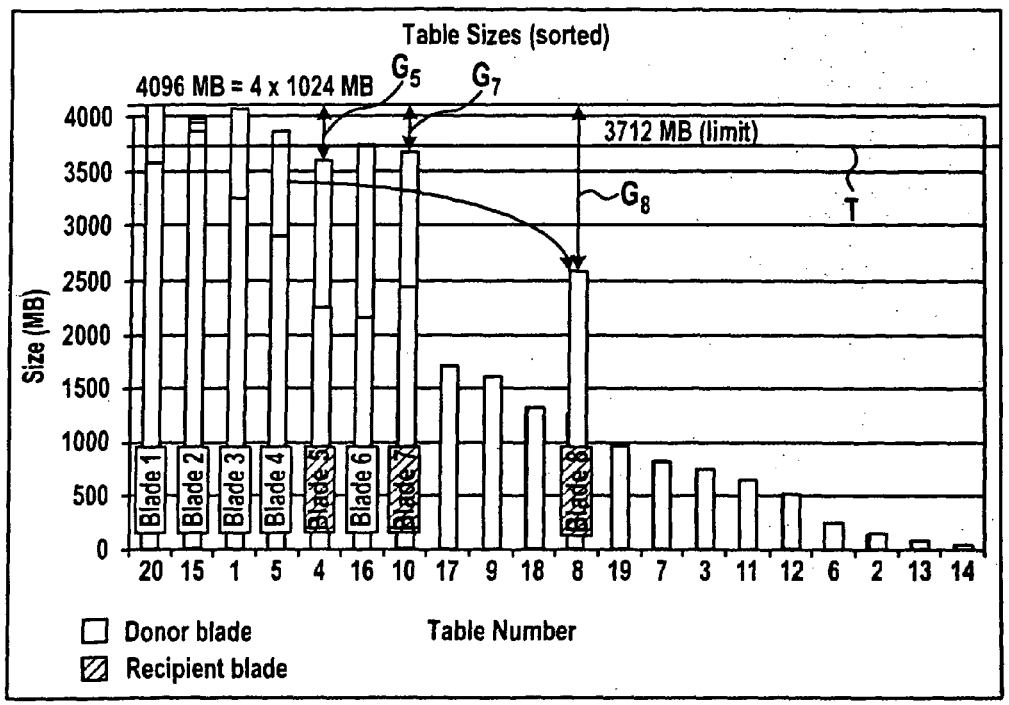
FIG. 31 is illustrative of a tentative re-assignment of table 19 from blade 4 to blade 8.
Figure 32:
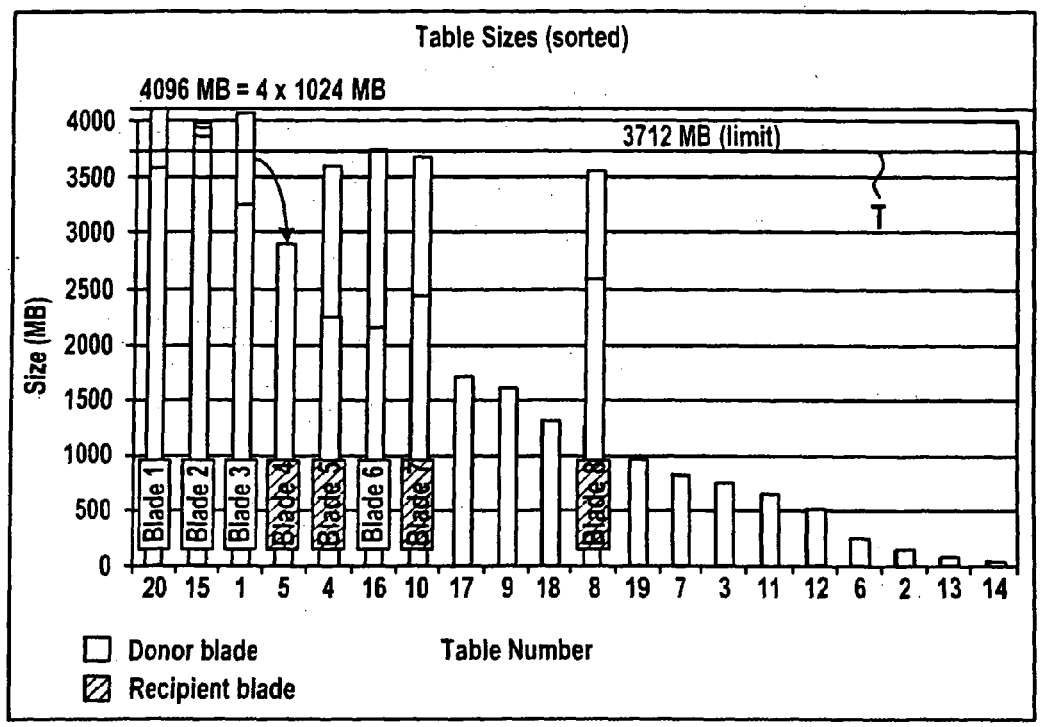
FIG. 32 is illustrative of a tentative re-assignment of table 7 from blade 3 to blade 4.

The next table in the sequence is table 19. In the actual distribution obtained from the previous iteration blades 5, 7 and 8 are recipient blades while all other blades are donor blades. Table 19 is on a donor blade. Gaps G5 and G7 of recipient blades 5 and 7 are too small to accommodate table 19. Table 19 is thus moved to recipient blade 8 which has a sufficiently large gap G8 to accommodate table 19. The standard deviation for the resulting tentative distribution is 390,36 MB which is below the actual standard deviation obtained from the previous iteration. The tentative distribution of FIG. 31 is thus accepted and table 19 is in fact moved from donor blade 4 to recipient blade 8 (FIG. 32).

The next table in the ordered sequence is table 7 on blade 3. Blades 4, 5, 7 and 8 are recipient blades in the actual distribution. Table 7 is tentatively moved from donor blade 3 to recipient blade 4 as table 7 is too large to fit on the other recipient blades. The resulting standard deviation of the new tentative distribution is 263,26 MB which is below the actual standard deviation obtained from the previous iteration. Table 7 is therefore reassigned from donor blade to recipient blade 4.

Figure 33:
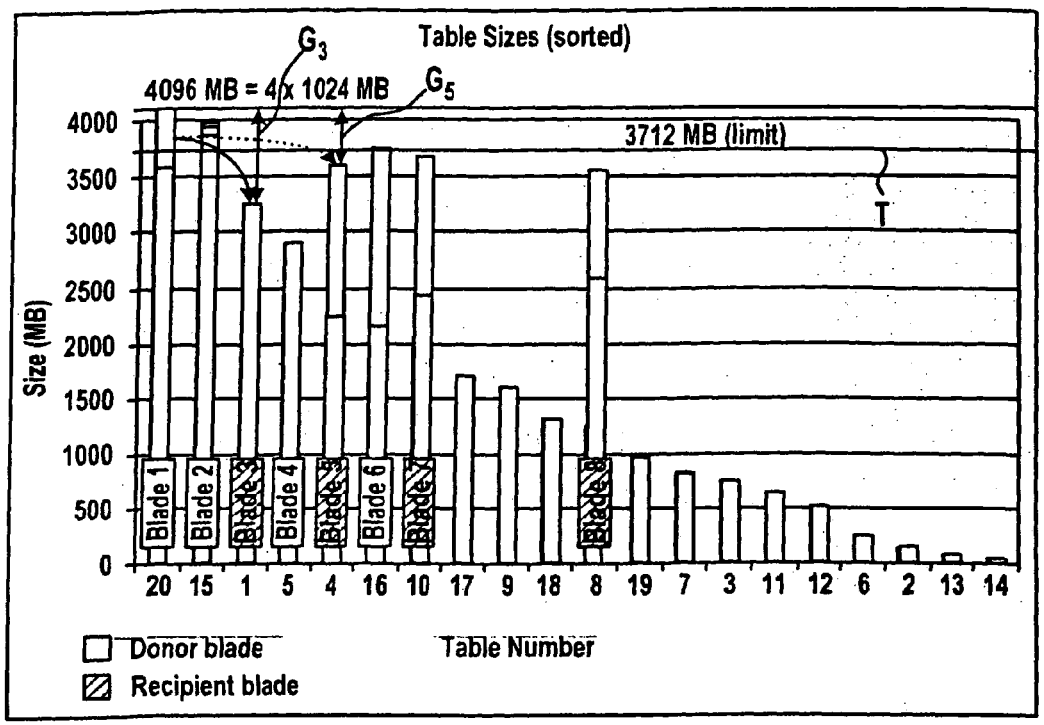
FIG. 33 is illustrative of a tentative re-assignment of table 12 to recipient blades 3 and 5.

The resulting actual distribution is shown in FIG. 33. In this distribution blades 3, 5, 7 and 8 are recipient blades. The next table in the sequence is table 3 which is assigned to recipient blade 7. Table 3 is skipped therefore. The same applies for table 11 because it is assigned to recipient blade 8 and can thus not be moved to a donor blade by definition.

Figure 34:
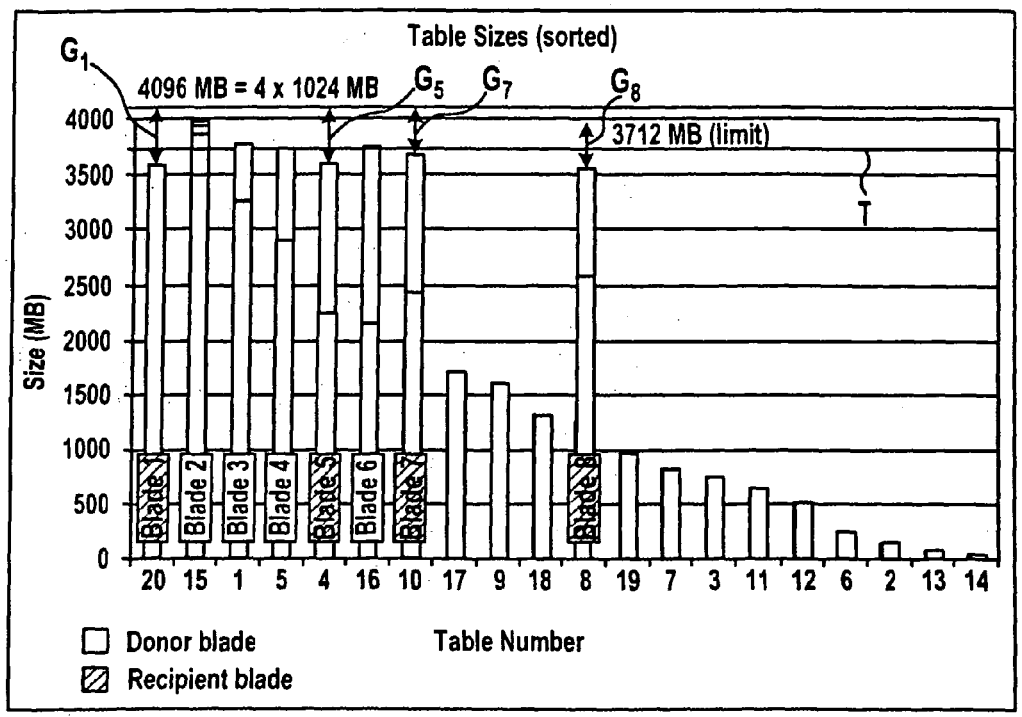
FIG. 34 is illustrative of multiple tentative re-assignments of table 6 to blades 1, 5, 7, and 8.

The next table in the ordered sequence that is assigned to a donor blade is table 12 on blade 1. Table 12 fits into gaps G3 and G5 of recipient blades 3 and 5, respectively and is thus tentatively moved both to recipient blade 3 and recipient blade 5. This results in two competing tentative distributions. When table 12 is tentatively moved to table 3 the resulting new standard deviation of the corresponding tentative distribution is 149,53 MB. In contrast, when table 12 is moved to recipient blade 5 the resulting new standard deviation of the corresponding tentative distribution is 264,39 MB. Thus the tentative distribution which is obtained when table 12 is moved to blade 3 is smoother than the alternative tentative distribution obtained by tentatively moving table 12 to blade 5. Hence the tentative distribution obtained by moving table 12 to recipient blade 3 is accepted. The resulting new distribution is shown in FIG. 34.

In the new distribution blades 1, 5, 7 and 8 are recipient blades. The next table in the ordered sequence is table 6 which is assigned to donor blade 2. Table 6 is small enough to fit into gaps G1, G5, G7, and G8 of the respective recipient blades 1, 5, 7 and 8. This results in four competing tentative distributions (FIG. 35):

| Tentative Distribution | New Standard Deviation |
|---|---|
| Table 6 to blade 1 | 87.66 MB |
| Table 6 to blade 5 | 89.21 MB |
| Table 6 to blade 7 | 129.89 MB |

| Tentative Distribution | New Standard Deviation |
| --- | --- |
| Table 6 to blade 8 | 96.59 MB |

Hence the tentative distribution obtained by moving table 6 to recipient blade 1 yields the smallest new standard deviation and is thus accepted.

Figure 35:
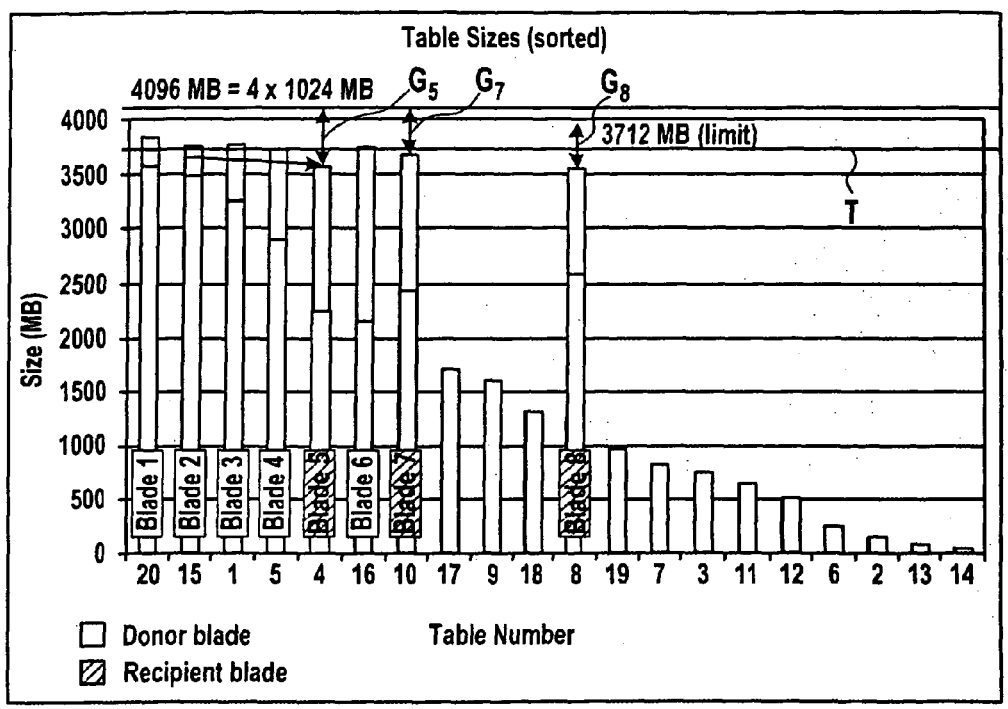
FIG. 35 is illustrative of multiple tentative re-assignments of table 2 to blades 5, 7, and 8.

FIG. 35 illustrates the resulting distribution. In this distribution blades 5, 7 and 8 are recipient blades. The next table in the ordered sequence is table 2 on donor blade 2. The competing tentative distributions obtained from the actual distribution of FIG. 36 are evaluated as follows:

| Tentative Distribution | New Standard Deviation |
| --- | --- |
| Table 2 to blade 5 | 71.50 MB |
| Table 2 to blade 7 | 103.36 MB |
| Table 2 to blade 8 | 77.26 MB |

The largest reduction of the standard deviation is thus obtained by moving table 2 to recipient blade 5. The corresponding tentative distribution is thus accepted; the resulting actual distribution is shown in FIG. 36.

Figure 36:
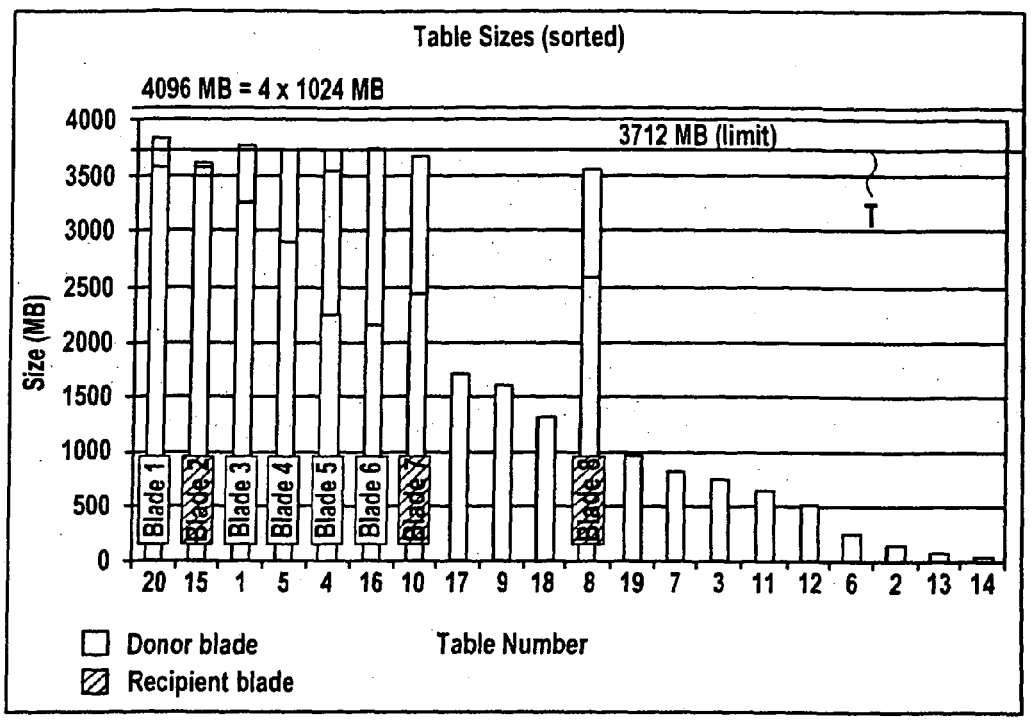
FIG. 36 shows the final re-distribution of tables to blades that is obtained by means of the method of FIG. 23.

In the distribution of FIG. 36 5 blades 2, 7 and 8 are recipient blades. The remaining tables in the ordered sequence, i.e. tables 13 and 14, are assigned to recipient blade 2 and can thus by definition not be reassigned. Hence the distribution as shown in FIG. 36 is the final distribution obtained from the initial distribution of FIG. 13. It is to be noted that the smoothness of the final distribution is improved drastically as it is also indicated by the drop of the standard deviation from 741,06 MB to 71,50 MB.

Figure 37A:
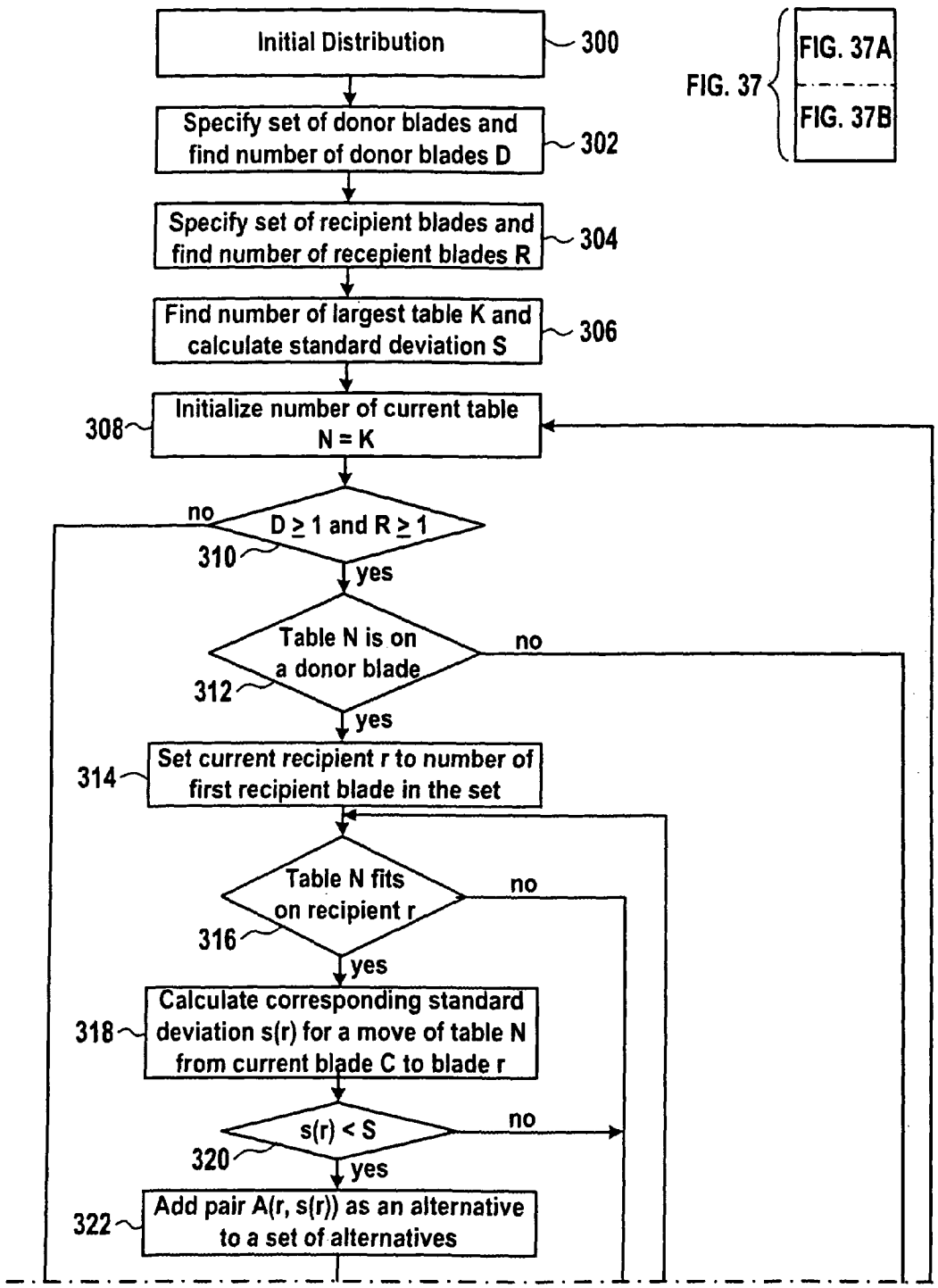
FIG. 37 is illustrative of a flow diagram of a more detailed embodiment of the one-dimensional re-distribution procedure.
Figure 37B:
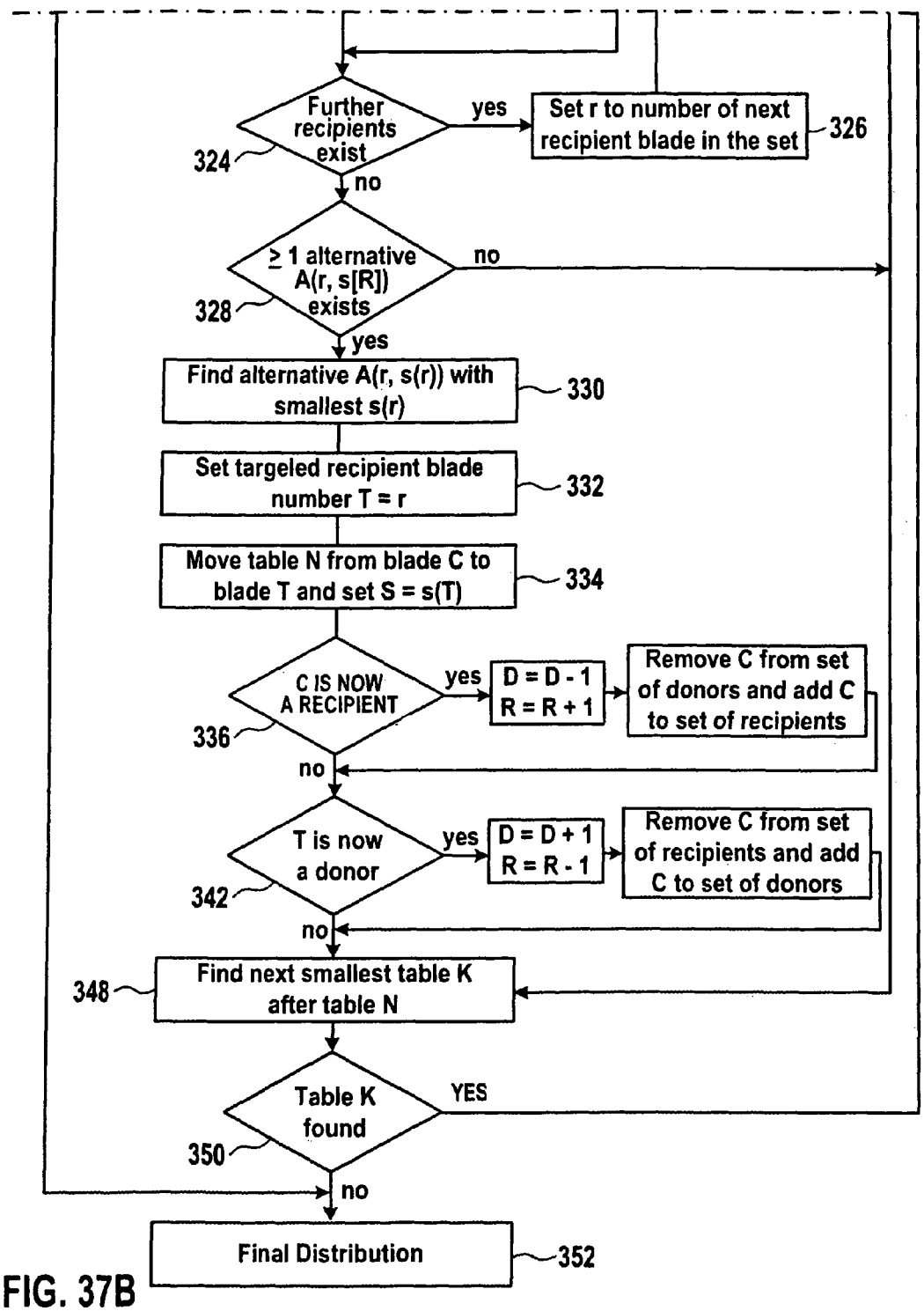

FIG. 37 shows a more detailed embodiment of the corresponding redistribution method.

In step 300 an initial distribution of tables to blades is provided. For example this can be done by means of the method of FIG. 5. Alternatively any other distribution can be used as a starting point, e.g. a real life distribution of an existing blade computing system. It is to be noted that it is not essential for the present invention that the initial distribution has the minimum number of blades (as it can be provided by the method of FIG. 5).

In step 302 the set of donor blades in the initial distribution is determined. Preferably this is done by means of a threshold level. For example the threshold level is obtained by calculating the total of all table sizes and dividing the total of all table sizes by the total number of blades. Those blades that have tables having an aggregated size surpassing the threshold are by definition donor blades. The number of donor blades in the initial distribution is denoted D.

Likewise the set of recipient blades in the initial distribution is determined. By definition a blade that is not a donor blade is a recipient blade. The number of recipient blades is denoted R.

In step 306 the largest table K in the initial distribution is identified. Further the standard deviation S of the aggregated table sizes in the initial distribution is calculated in step 306.

In step 308 the number N of the current table is initialized to K.

In step 310 a determination is made whether D>=1 and R>=1. If this is not the case there is either no recipient or no donor blade such that none of the tables can be reassigned. In this instance the initial distribution cannot be further improved.

If it is determined in step 310 that there is in fact at least one donor blade and at least one recipient blade the control goes to step 312. In step 312 a determination is made whether table N is on a donor blade. If this is not the case the control goes to step 348. In step 348 the next smallest table K after table N is searched. In step 350 it is decided if such a smaller table K has been found. If this is not the case the control stops in step 352. If the contrary is the case the control goes back to step 308.

If it has been determined in step 312 that table N is in fact on a donor blade the process goes on to step 314 where one of the recipient blades in the set of recipient blades is arbitrarily chosen as the current recipient r in order to investigate a corresponding tentative reassignment of table N.

In step 316 a determination is made whether table N fits on recipient r. If this is the case the standard deviation s(r) of the resulting tentative distribution obtained by moving table N from its current blade C to blade r is calculated. In step 320 it is determined whether the standard deviation s(r) is below the standard deviation S of the actual distribution.

If this is the case blade r becomes a candidate blade as a target for reassigning table N. Blade r and the corresponding standard deviation s(r) are stored in array A in step 322. It is to be noted that instead of array A another suitable data structure can be used for storage of tuples r, s(r), such as a linear pointer list, a file, or another data structure. From there the control goes to step 324 where a determination is made whether further recipient blades exist in the actual distribution that need to be processed. If this is the case the control goes to step 326 where r is set to the number of the next recipient blade in the set of recipient blades that has not been processed so far. From step 326 the control goes back to step 316.

If it turned out in step 316 that table N does not fit on recipient r or if it turned out in step 320 that s(r) is not below S the control goes directly from step 316 to step 320 to step 324.

After all recipients in the set of recipient blades have been processed the control goes to step 328. In case there is no pair r, s(r) in the array R the control goes directly from step 328 to step 348 in order to initiate the consecutive iteration, if any.

If there is at least one entry in array A the control goes from step 328 to step 330. In step 330 the entry of array A having the smallest s(r) is identified. In consecutive step 332 the target recipient blade T for moving of table N is set to r. In step 334 table N is moved from donor blade C to recipient blade T and S is set to s(T).

In step 336 a determination is made whether blade C has become a recipient blade due to the move. If this is the case the numbers D and R are adapted correspondingly in step 338. Blade C is removed from the set of donor blades and added to the set of recipient blades in step 340 from where the control goes to step 342. In case blade C has not become a recipient blade the control goes directly from step 336 to step 342.

In step 342 it is determined whether blade T has become a donor blade. If this is the case the numbers D and R are adapted correspondingly in step 344 and blade C is removed from the set of recipient blades and added to the set of donor blades in step 346. From there the control goes to step 348. In case it is determined in step 342 that blade T has not become a donor blade, the control goes directly from step 342 to step 348.

The loop consisting of steps 308 to step 350 is carried out until all tables have been processed in descending order. The final distribution which is thus obtained is output in step 352.

Figure 38:
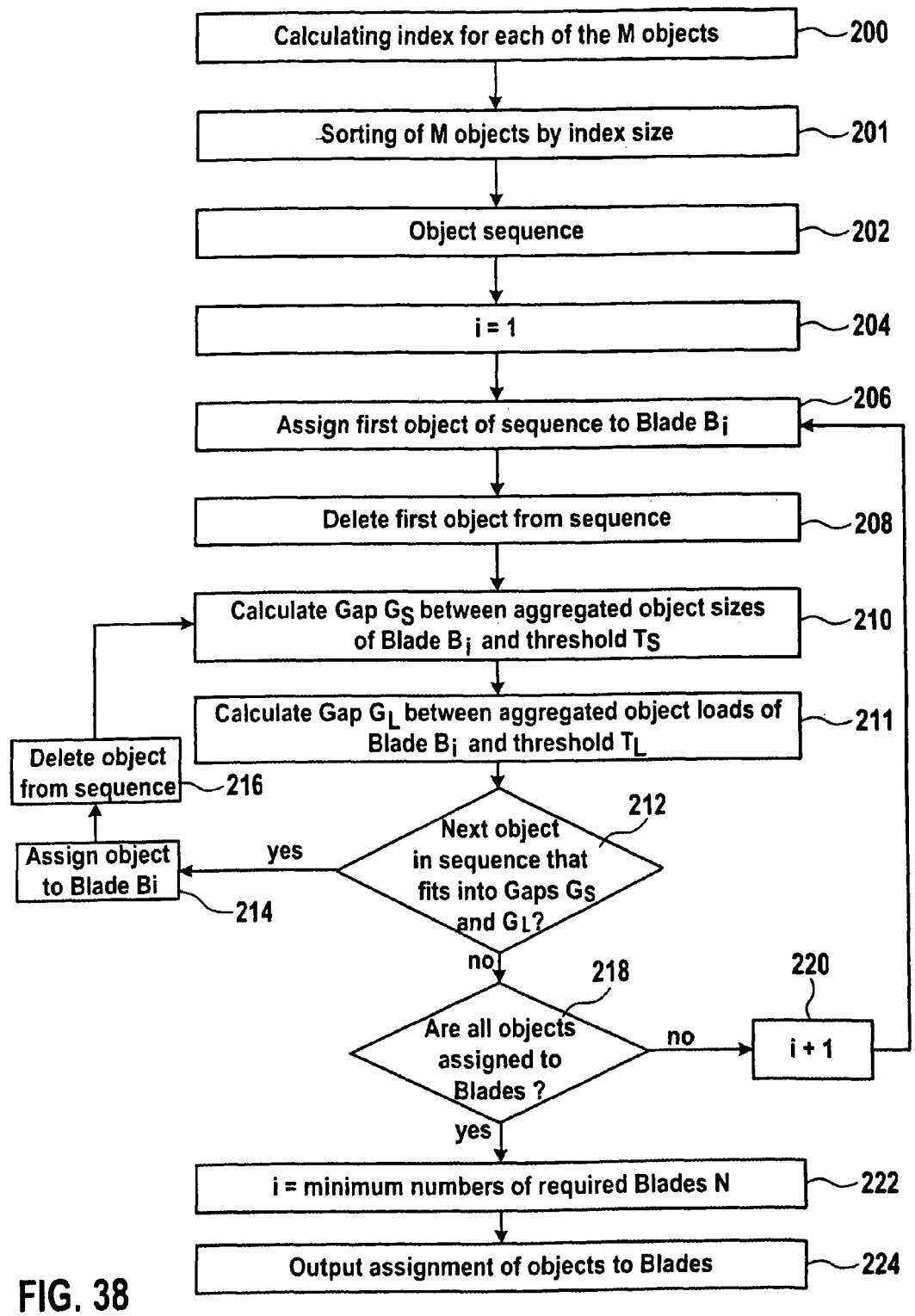
FIG. 38 is a flow diagram for a two-dimensional distribution procedure for determining the minimum number of the blades and for distributing of data objects to the minimum number of the blades.

FIG. 38 shows a two-dimensional procedure for assigning the objects to blades and to thereby determine the minimum value for N. This procedure can be implemented by the program module 122 (cf. FIG. 1). This procedure is analogous to the one-dimensional procedure of FIG. 5; like steps in the procedures of FIGS. 38 and 5 are designated by the same step numbers.

In step 200 an sorting index is calculated for each one of the M objects. An sorting index of an object is indicative of the amount of blade resources the object requires. The sorting index serves to sort the objects in decreasing order of blade resource requirements.

For example the sorting index is calculated on the basis of the sum of the normalised object load and normalized object size plus the absolute value of the difference of the normalised load and size or a linear combination thereof.

In step 201 a sorting operation is performed in order to sort the M objects by sorting index. The corresponding object sequence is provided in step 202. In step 204 the index i for the blades is initialized to 1.

In step 205 processing of the object sequence starts with the first object of the sequence, i.e. the object having the largest sorting index value. The first object of the sequence is assigned to a first one of the blades, i.e. blade B1, in step 206. In step 208 the first object that has been assigned to blade B1 is deleted from the sequence.

In step 210 the sizes of the objects that have already been assigned to blade B1 are summed up in order to provide an aggregated object size of blades B1. Next the size of a gap GS between the aggregated object size of blade B1 and a size threshold TS is calculated. When the assignment procedure of FIG. 38 is carried out the first time, the size threshold TS is the storage capacity of one of the blades.

In step 211 the loads of the objects that have already been assigned to blade B1 are summed up in order to provide an aggregated load of blade B1. Next a gap GL between the aggregated object loads of blade B1 and a load threshold TL is calculated. When the assignment procedure of FIG. 38 is carried out the first time, the load threshold TL is the load capacity of one of the blades.

In step 212 it is determined whether there is a next object in the ordered sequence that fits into both gaps GS and GL. In other words, a consecutive object following the first object in the object sequence that has an object size small enough to fit into gap GS and at the same time has an object load that is small enough to fit into GL is searched.

The next consecutive object in the sequence that fulfils this condition is assigned to blade B1 in step 214 and deleted from the sequence in step 216 before the control goes back to step 210.

If there is no such object that fulfils the condition of step 212, step 218 is carried out. In step 218 it is determined whether all objects have already been assigned to blades. In other words, in step 218 it is checked whether the sequence is empty. If this is not the case the index i is incremented in step 220 and the control goes back to step 206 in order to assign remaining objects of the sequence to the next blade B2.

If the contrary is the case the index i is the minimum number N of blades that are required to handle the M objects, i.e. i=N. This number is output in step 220. The minimum number N of blades that are required to handle the M objects can be a basis for an investment decision for purchasing of a corresponding number of blades. The assignment of objects to blades is output in step 224 in order to visualise the quality of the object size balancing.

Figure 39:
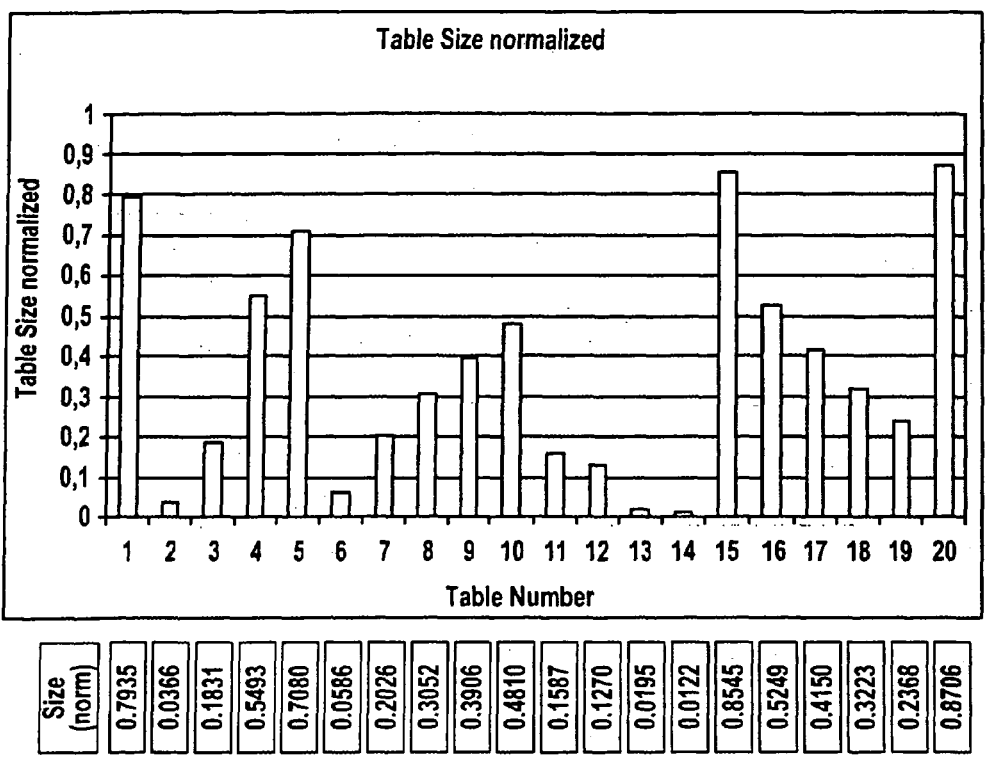
FIG. 39 shows the normalized size distribution of the tables of FIG. 6.

FIG. 39 shows the normalised table sizes of the tables of FIG. 6. The normalised size of a table is obtained by dividing the table size by the maximum storage capacity of one of the blades.

Figure 40:
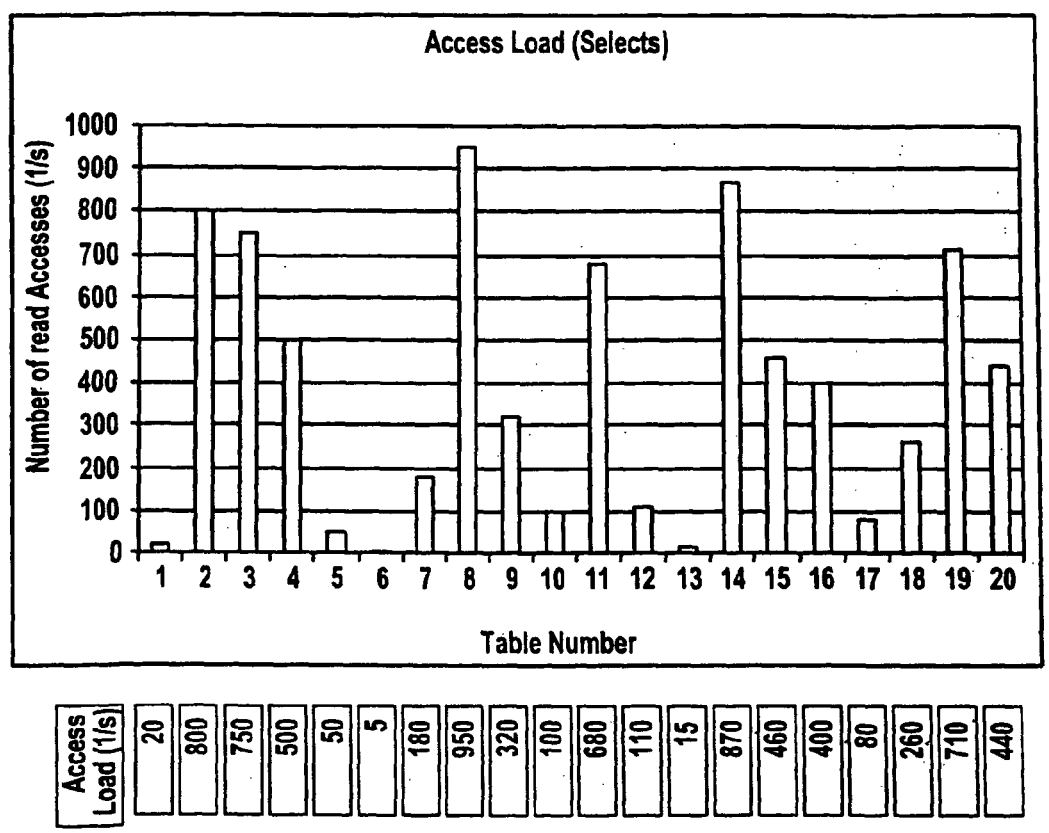
FIG. 40 shows the loads of the tables and terms of the mean number of read accesses per second.

FIG. 40 shows the loads of the tables. In the preferred embodiment considered here the mean number of access operations (selects) per second that are performed or expected to be performed with respect to a table is used as a load indicator. In the example considered here the load as expressed by the number of read accesses per second to a table varies between five read accesses per second (table 6) and 950 read accesses per second (table 8). The table loads given in FIG. 40 can be actual table loads or average table loads that have been obtained by monitoring a real-life data processing system. Alternatively the table loads are estimates or simulation results for the purpose of planning cluster 100.

Figure 41:
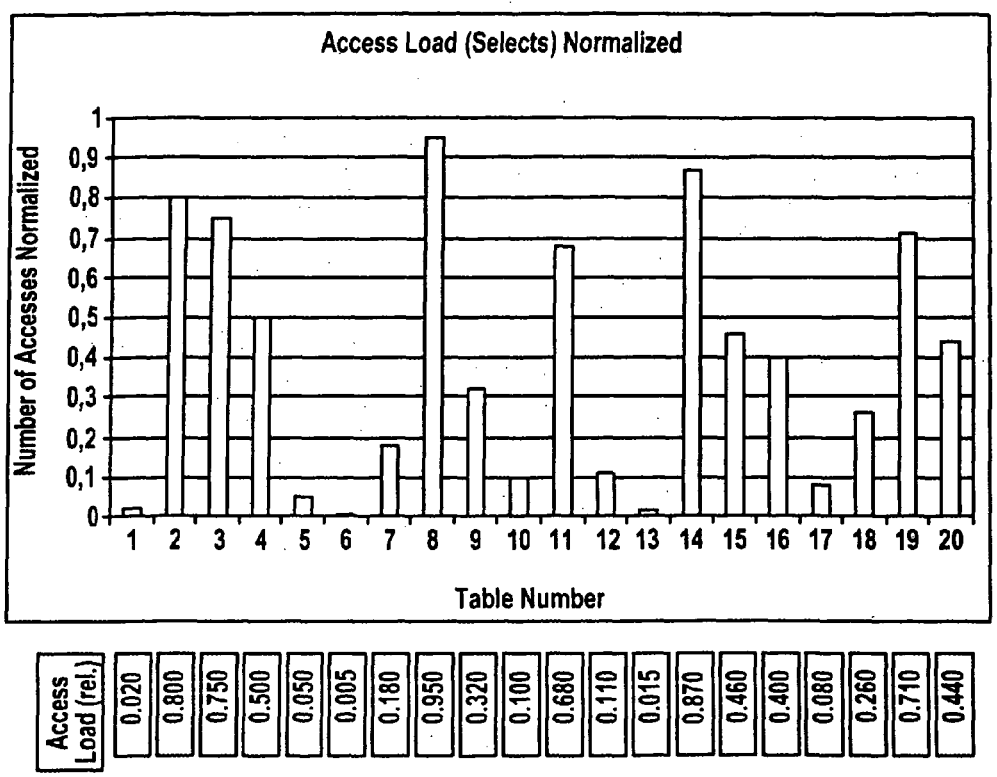
FIG. 41 shows the normalized loads.

FIG. 41 shows the normalised table loads. The normalised table load of a given table is obtained by dividing the number of read accesses per second of that table by the load capacity of one of the blades.

In the preferred embodiment considered here the storage capacity of a blade is 4,096 MB. Hence a normalised table size of one indicates that the table has the absolute maximum size that can be handled by a given blade hardware.

The load capacity of a blade is the maximum possible access load that can be handled by a core engine running on one of the blades in the example considered here. This maximum value can be determined by benchmarks, by experiment or simulation. The load capacity depends on various parameters such as hardware and software characteristics and network bandwidth if a network is used to perform the table accesses. In the preferred embodiment considered here, the load capacity of one of the blades is 1,000 read accesses per second. For the purpose of explanation only read accesses are considered here. However, other typical data processing tasks, such as accesses that involve changes to the data, can also be taken into consideration for determining load capacity and table loads.

Figure 42:
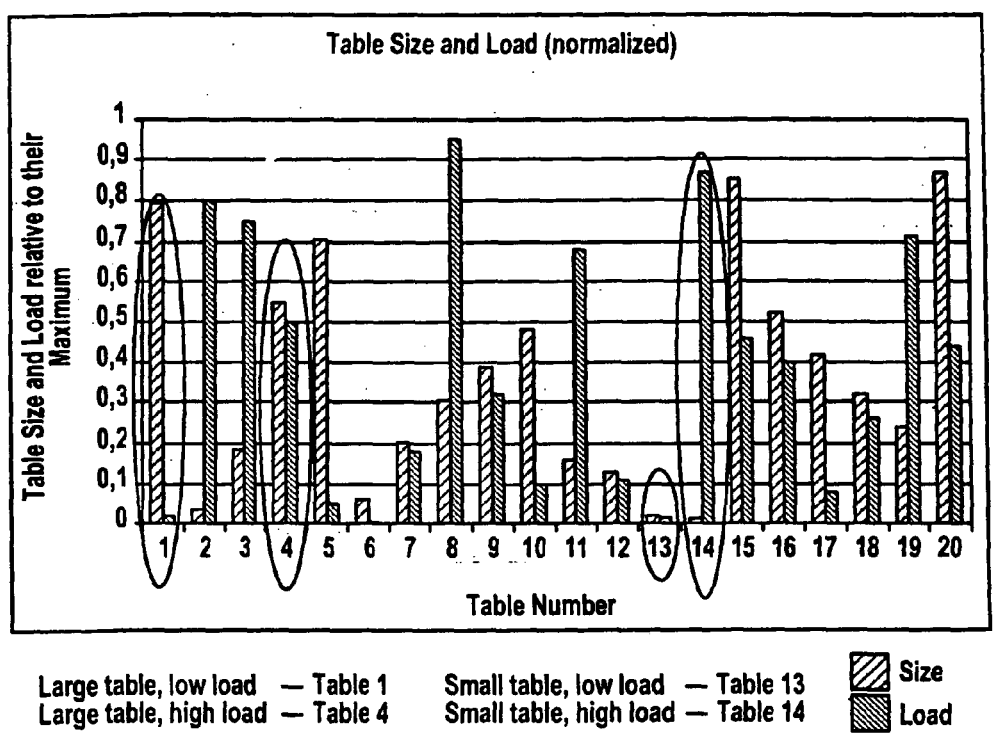
FIG. 42 shows the normalized sizes and loads per table.

FIG. 42 shows a diagram illustrating the various normalised table sizes and table loads. As apparent from FIG. 42 there are tables that require only a minimum amount of blade resources, especially table 13, that has a small table size and a low table load. On the other hand there are tables that require a large amount of blade resources as they have both large table size and high table load. The distribution of tables to blades aims to balance the usage of the respective blade resources with respect to both size and load. The two constraints, i.e. size and load, are combined into a common sorting index that provides an objective measure for the amount of blade resources a given table requires.

The following definition of the sorting index is used for the purposes of explanation only and without restriction of generality:

Sorting index=W1*(size+load)+W2*absolute value (size−load), where size is the table size, load is the table load W1 is a weighting factor for (size+load) and W2 is a weighting factor for the absolute value of the difference of size and load.

For the purposes of the following example the weighting factors W1 and W2 are set to one without restriction of generality.

In this case the above expression evaluates as follows:
If size>load: sorting index=2*size
If size=load: sorting index=2*size=2*load
If size<load: sorting index=2*load.

Figure 43:
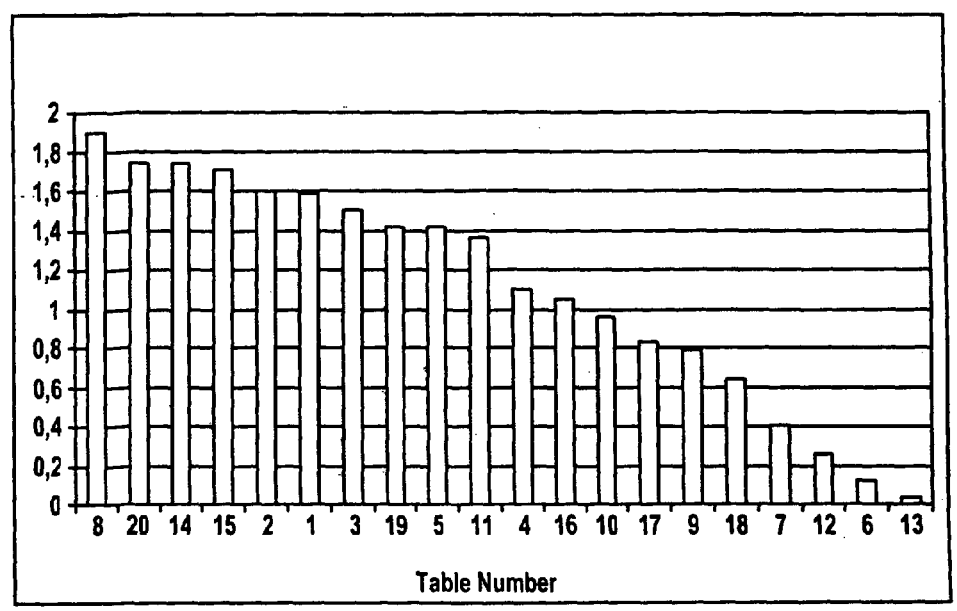
FIG. 43 shows a sorted sequence of the tables.

FIG. 43 shows a sorted sequence in descending order of the sorting indices of the tables. The table that has the largest sorting index value and thus requires the largest amount of blade resources is table 8, whereas the table having the smallest sorting index value and which does require the lowest amount of blade resources is table 13 as apparent from FIG. 43.

Figure 44:
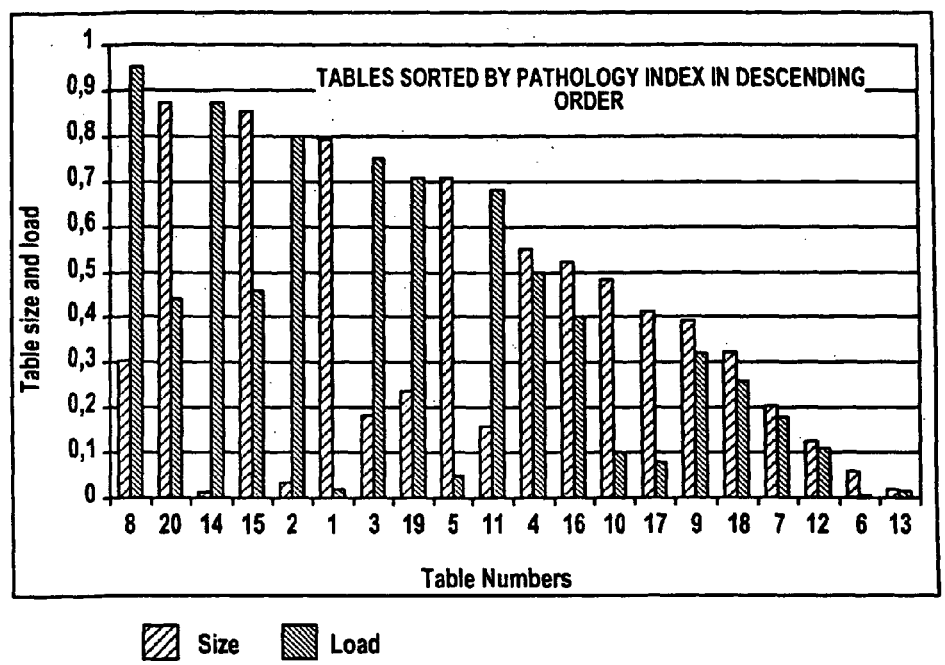
FIG. 44 shows the sorted sequence of the tables illustrating the normalised sizes and loads of each table.

FIG. 44 shows the sorted sequence of FIG. 43 illustrating the normalised table sizes and table loads of the individual tables.

Figure 45:
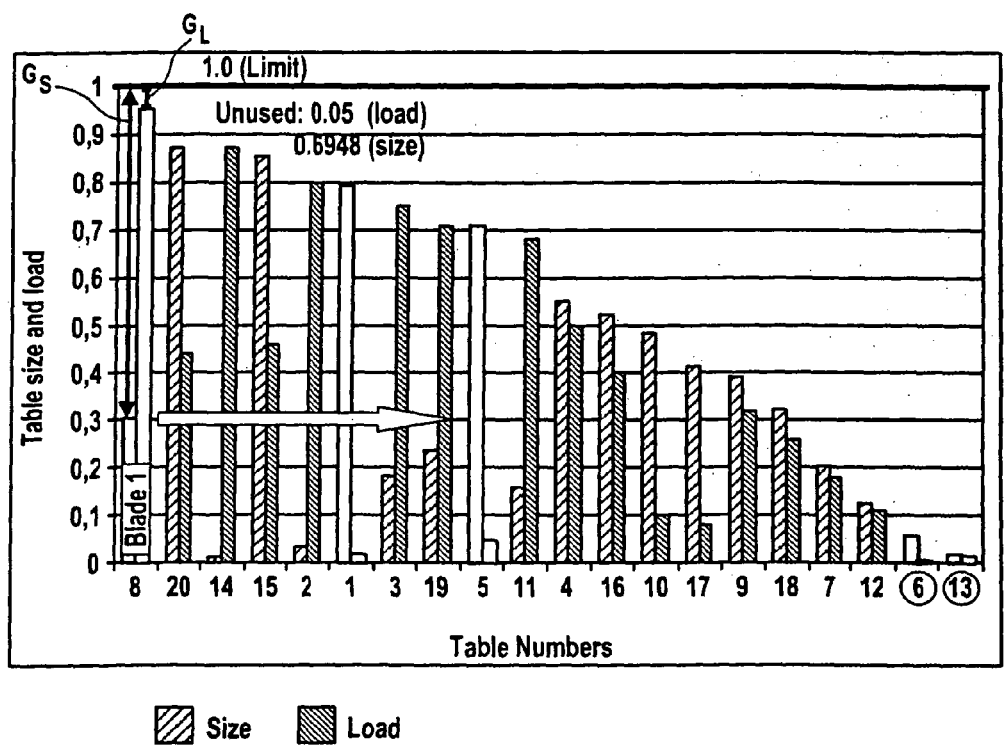
FIGS. 45 to 49 show the assignment of tables to blade 1 of the cluster or blades.

FIG. 45 illustrates the first iteration for assigning tables to blades based on the ordered sequence as shown in FIGS. 43 and 44. It is assumed that each one of the blades has a storage capacity that corresponds to a normalised size threshold TS=1 and a load capacity that corresponds to a normalised load threshold TL.

The assignment procedure starts with the first table of the sorted sequence, i.e. table 8. Table 8 is assigned to blade 1 as illustrated in FIG. 45. This results in a normalised gap GS of unused storage capacity GS=0,6948 and a gap GL of unused load capacity GL=0,05.

Figure 46:
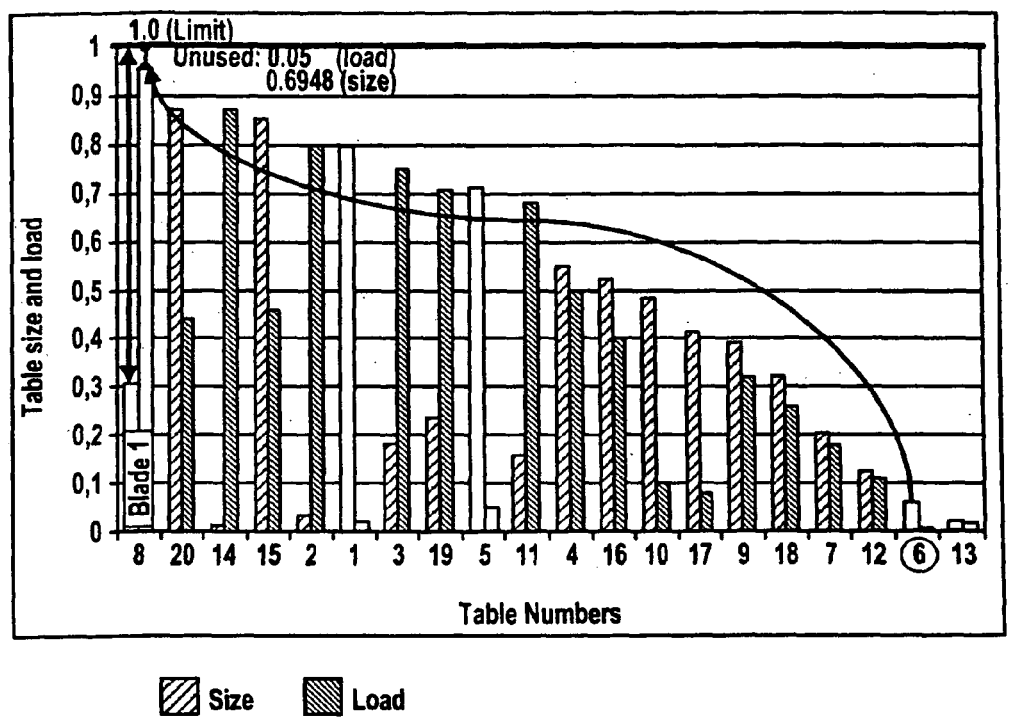

Next consecutive tables in the ordered sequence are searched that have table sizes and table loads that fit into the respective gaps GS and GL. These are tables 6 and 13. As table 6 precedes table 13 in the ordered sequence, it is assigned to blade 1 as illustrated in FIG. 46.

Figure 47:
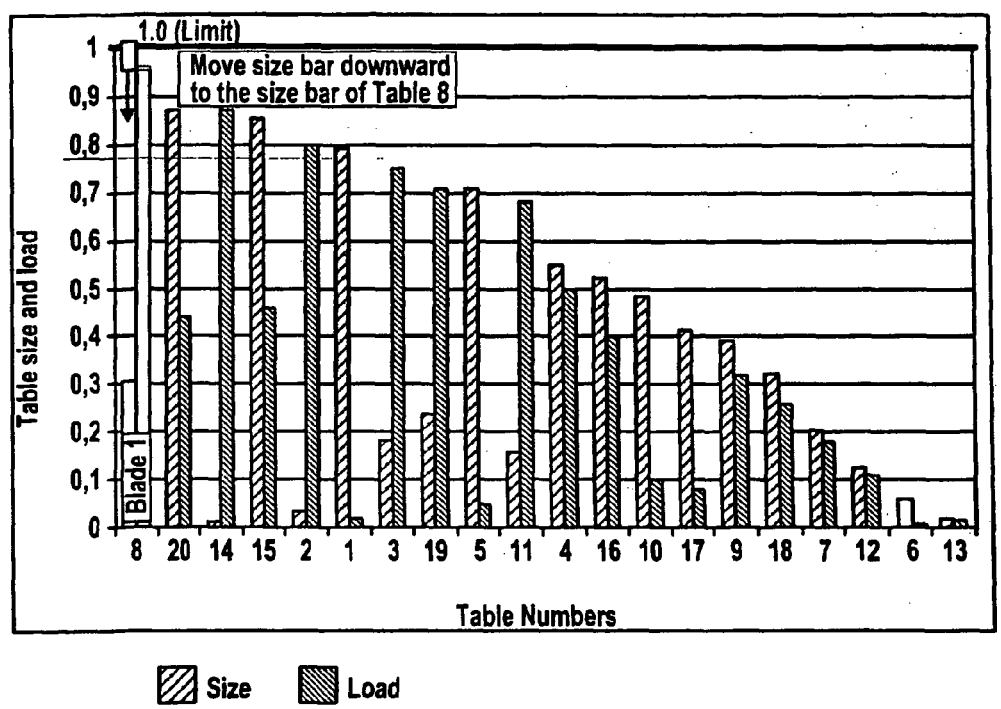
Figure 48:
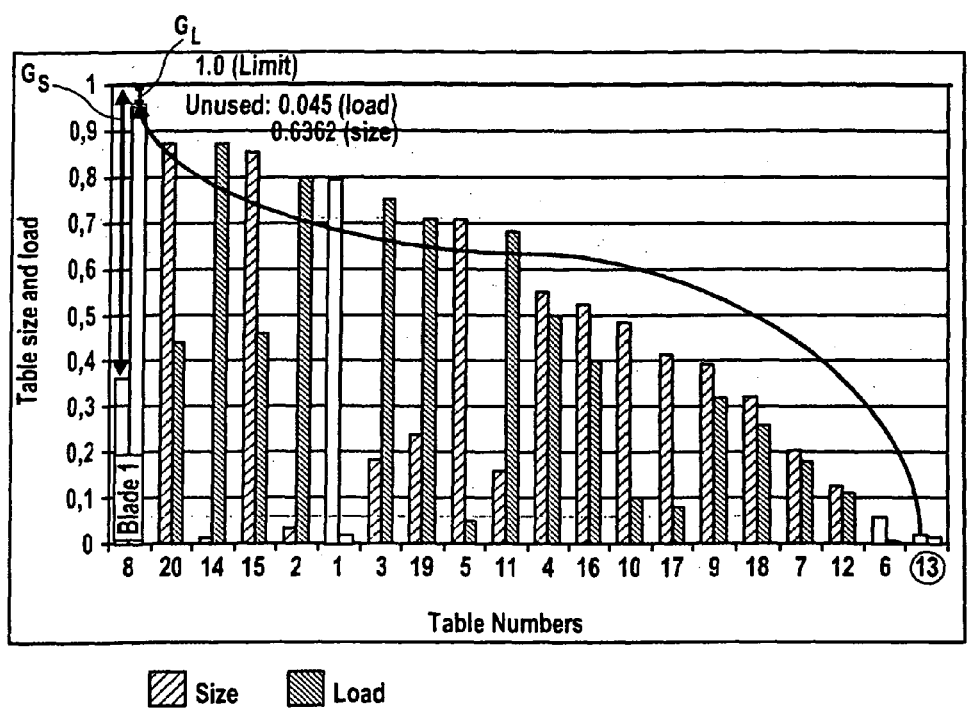

Next the aggregated table size and the aggregated table load of blade 1 is updated as illustrated in FIG. 47. This results in a updated normalised gap GS=0,6362 and an updated normalised gap GL=0,045 as illustrated in FIG. 48. Now tables of the ordered sequence that are consecutive to table 8 that fit into both gaps GS and GL are searched.

Figure 49:
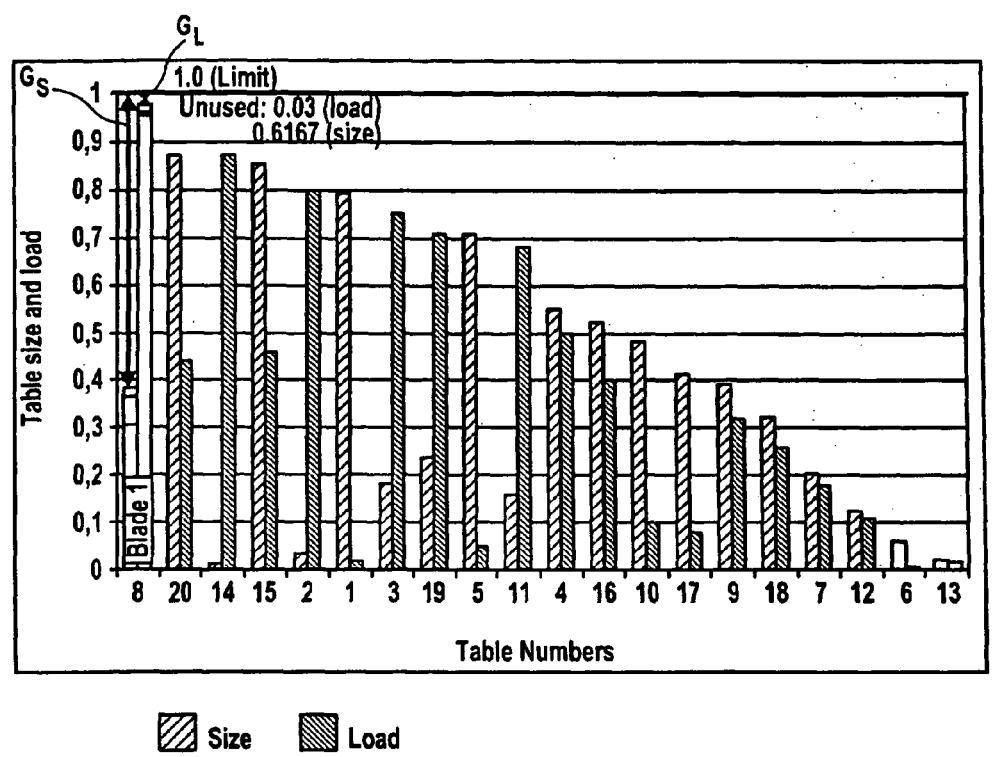

The only table that fulfils both conditions is table 13 which is thus assigned to blade 1 as illustrated in FIG. 48. The result is shown in FIG. 49. The updated normalised gap GS is 0,6167 and the updated normalised gap GL is 0,03. No table within the ordered sequence satisfies both constraints.

Figure 50:
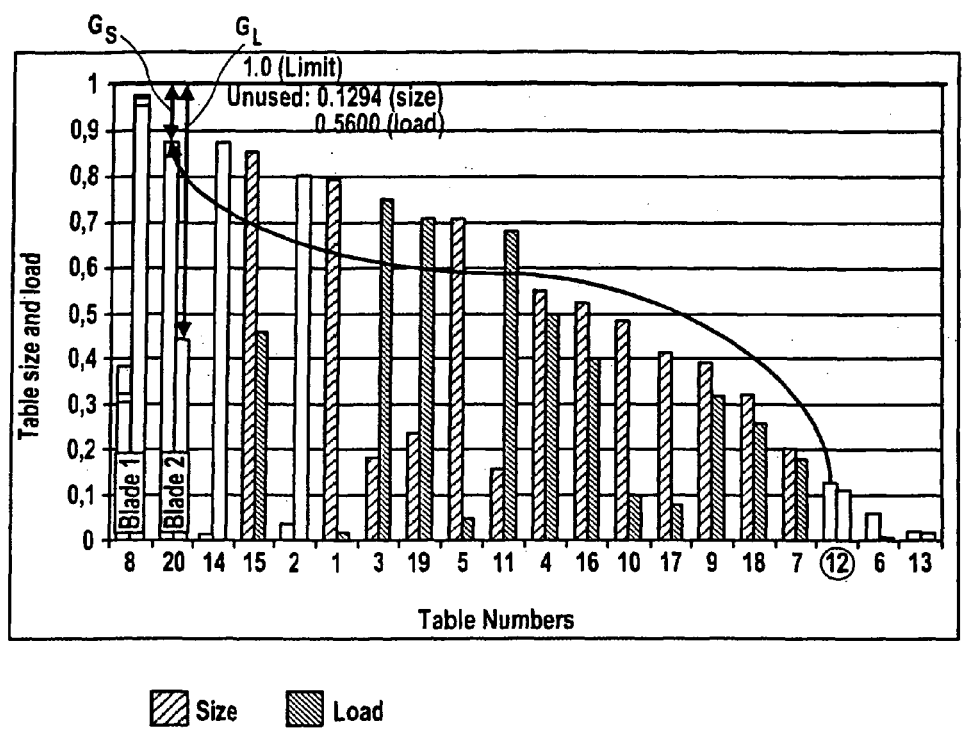
FIGS. 50 and 51 show the assignment of tables to blade 2.

As there remain unassigned tables in the sequence an additional blade 2 is required as illustrated in FIG. 50. By definition the first table of the remaining ordered sequence, i.e. table 20 is assigned to blade 2. This results in normalised gaps GS=0,1294 and GL=0,5600. The only table that satisfies both constraints is table 12 which is thus moved onto blade 2 as illustrated in FIG. 50.

Figure 51:
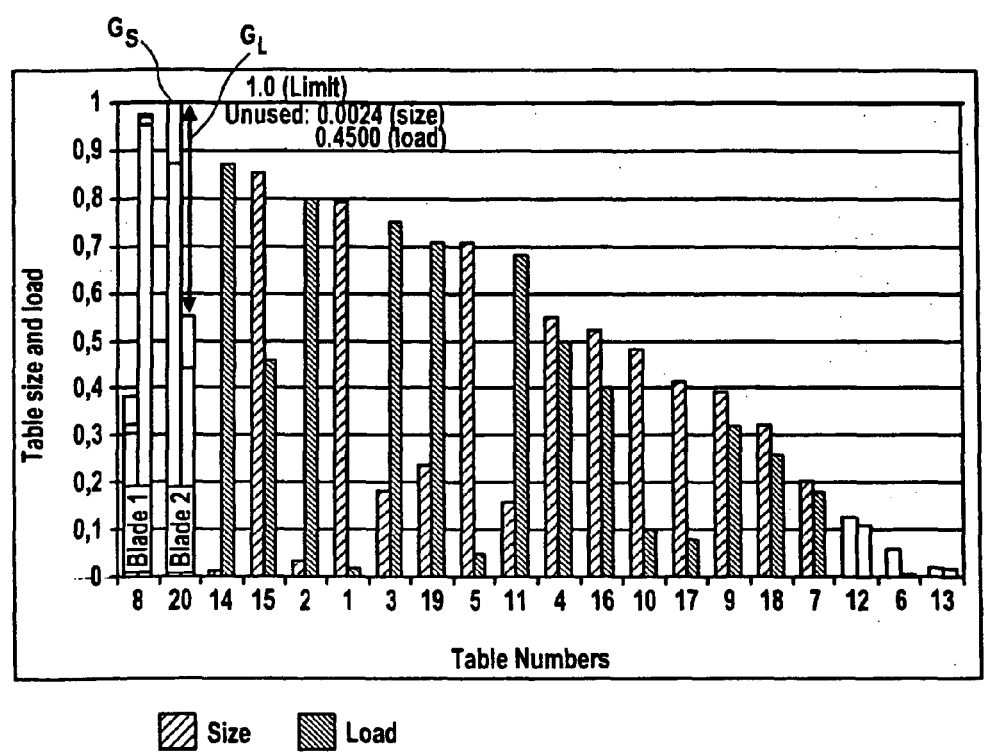
Figure 52:
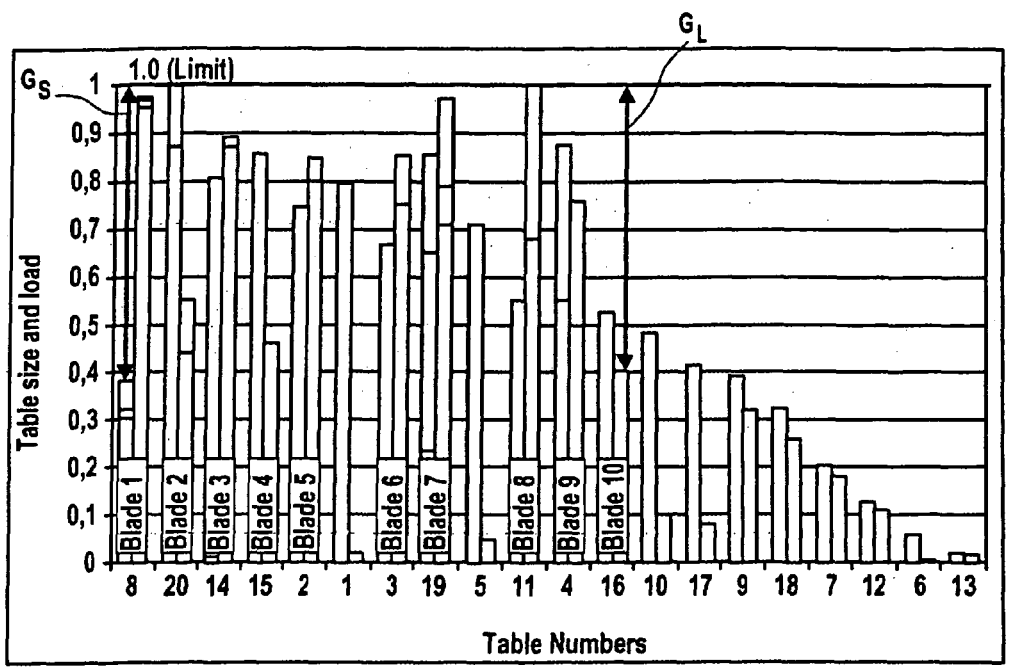
FIG. 52 shows the resulting assignment of tables to blades that is obtained on the basis of the method of FIG. 38.

FIG. 51 illustrates the result of this assignment. The updated normalised gap GS is 0,0024 and the updated normalised gap GL is 0,4500. None of the tables of the remaining ordered sequence satisfies these constraints such that an additional blade 3 is required etc. This procedure is carried out until the ordered sequence is empty, i.e. after all tables have been assigned to one blade. The resulting assignment of blades and the resulting minimum number of blades is illustrated in FIG. 52. In the example considered here the minimum number N of blades that is required for handling of all of the tables is N=10.

Figure 53:
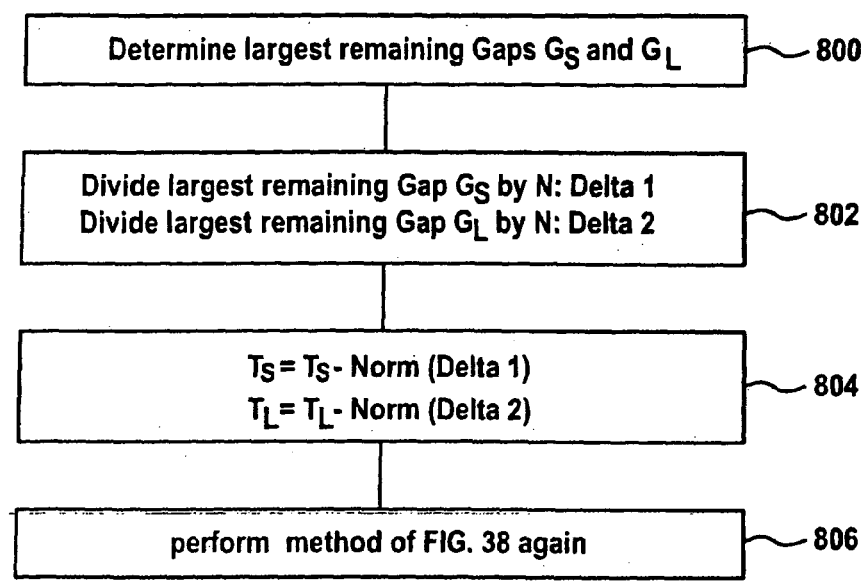
FIG. 53 is illustrative of a two-dimensional re-distribution method for refinement of the distribution obtained by performing the method of FIG. 38.

In order to further improve the quality of the balancing the method of FIG. 53 can be carried out on the basis of the result provided by the method of FIG. 38. In step 800 the largest remaining gaps, GS and GL are determined as illustrated in FIG. 52. In the example considered in FIG. 52 the largest remaining gap GS is on blade 1 and the largest remaining gap GL is on blade 10.

In step 802 the largest remaining gap GS is divided by N which yields delta 1 and the largest remaining gap GL is divided by N which yields delta 2.

In step 804 the size threshold TS is reduced by delta 1 and the load threshold TL is reduced by delta 2. In step 806 the method of FIG. 38 is performed again with the reduced thresholds as determined in step 804. In case the sorting indices and the original object sequence obtained from the method of FIG. 38 by performing steps 200 to 202 have been saved, these steps can be skipped in order to start processing of the method of FIG. 38 in step 204. The result is a further improved balancing.

Figure 54:
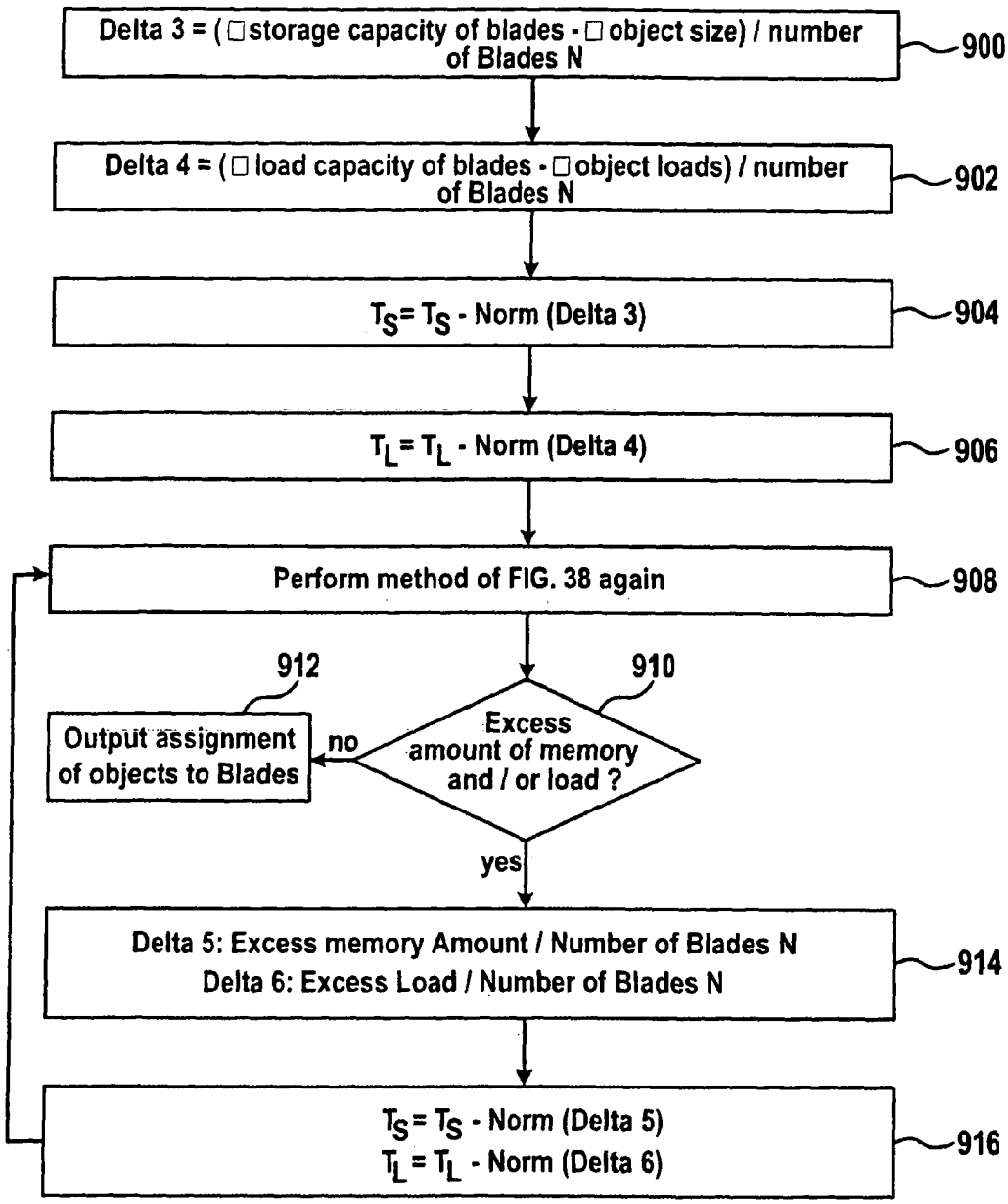
FIG. 54 is illustrative of a further preferred embodiment of a two-dimensional re-distribution method where the load and the size threshold are varied iteratively.

FIG. 54 shows an alternative approach for refining the balancing. In step 900 delta 3 is calculated by calculating the difference of the sum of the storage capacity of the blades and the sum of the object sizes of all objects to be assigned to the blades and by dividing the difference by the minimum number of blades N. In step 902 delta 4 is calculated by calculating the difference of the sum of the load capacities of the blades and the sum of the object loads of all objects to be assigned to the blades and by dividing the difference by the minimum number of blades N. In the example considered here no normalized values are used in steps 900 and 902.

In step 904 the size threshold TS is reduced by the normalised value of delta 3. The normalised value of delta 3 is obtained by dividing delta 3 by the storage capacity of one of the blades.

Likewise the load threshold TL is updated in step 906 by the normalised delta 4. Normalisation of delta 4 is performed by dividing delta 4 by the load capacity of one of the blades.

The reduced size threshold TS and the reduced load threshold TL correspond to the theoretical limit of blade resources that are required for handling of the given objects. As the object granularity is finite the theoretical threshold limits will be surpassed in most cases:

In order to refine the balancing the method of FIG. 38 is performed again (step 908) on the basis of the size threshold TS obtained from step 904 and the reduced load threshold TL obtained from step 906 with the modification that the number of blades for the renewed performance of the method of FIG. 38 is limited by the minimum number of blades N that has been determined previously. In other words, the assignment procedure of FIG. 38 stops when the minimum number N of blades has been used up; this may have the consequence that there will be an excess amount of memory and/or load requirement for the last blade of the minimum number N of blades considered for the assignment procedure that surpasses the respective thresholds TS and/or TL. Again steps 200 to 202 of the method of FIG. 38 can be skipped in case the sorting indices and the sorted sequence has been stored when the method of FIG. 38 was performed the first time. In step 910 it is determined whether there is such an excess amount of memory requirement and/or load requirement for the last blade N, i.e. blade 10. If this is not the case the resulting assignment of objects to blades is output in step 912.

If the contrary is the case step 914 is carried out in order to calculate the values of delta 5 and/or delta 6. Delta 5 is obtained by dividing the excess amount of memory, if any, by the number of blades N. Likewise delta 6 is obtained by dividing the excess load requirement, if any, by the number of blades N.

On this basis the size and/or load thresholds are incremented in step 916. From there the control goes back to step 908.

Steps 908 to 916 are carried out repeatedly until there is no longer an excess amount of memory and/or load requirement that cannot be provided by the given number N of blades.

Figure 55:
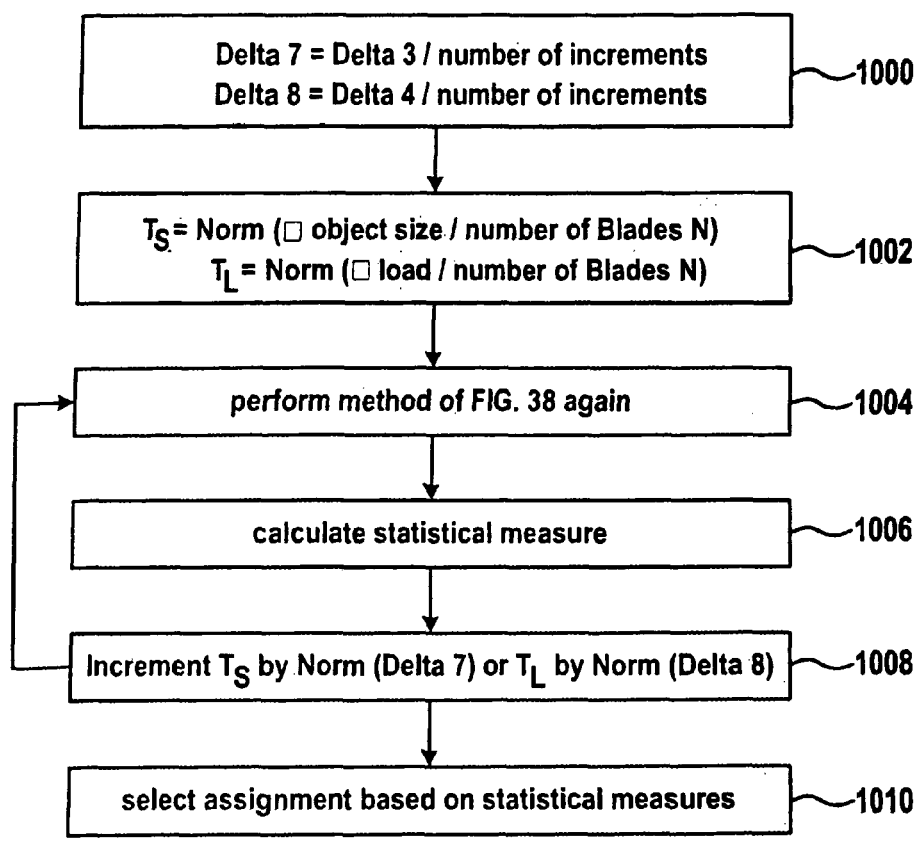
FIG. 55 is illustrative of a further preferred embodiment of the two-dimensional re-distribution procedure where the size and load thresholds are varied in pre-determined increments or decrements.

FIG. 55 shows a further alternative for refinement of the balancing. First steps 900 and 902 of the method of FIG. 54 are carried out in order to obtain delta 3 and delta 4. The gaps delta3 and delta4 are now scanned by stepwise variation of the respective size and load thresholds in order to identify a more balanced assignment of objects to blades. For this purpose delta 3 and delta 4 are divided into equidistant intervals having step sizes delta 7 and delta 8, respectively, as shown in step 1000. The number of increments for performing the respective scans can be predefined or is user selectable.

It is to be noted that the number of increments for scanning GS and for scanning GL does not need to be the same. Preferably the scans are performed independently from each other such that the total number of assignments that is considered is the number of increments for the GS scan multiplied by the number of increments for the GL scan.

In step 1002 the size and load thresholds are set to the respective theoretical minima that are required to provide sufficient blade resources for handling of the given number of objects. On this basis the method of FIG. 38 is performed again in step 1004. In step 1006 a statistical measure is calculated as a quality measure for the balancing of the assignment of objects to blades obtained as a result of step 1006, if any. For example, the standard deviation of the aggregated sorting index values of objects assigned to each one of the blades is calculated. In other words, for each blade the total of the sorting index values of the objects that have been assigned to the blade is calculated. This provides one total sorting index value per blade. Next the standard deviation is calculated for the total sorting index values.

In step 1008 at least one of the thresholds TS or TL is incremented by the normalised value of delta 7 or the normalised value of delta 8, respectively. Next-step 1004 is carried out again on the basis of the incremented size and load thresholds. Steps 1004 to 1008 are carried out repeatedly until the respective scans through GS and GL have been completed and the corresponding assignments of objects to blades have been obtained. In step 1010 one of the assignments is selected based on the statistical measures. For example, the assignment having the lowest standard deviation is selected.

It is to be noted that this procedure is limited by the minimum number of blades N. For assignments that do not fit on this given minimum number of blades N no statistical measure needs to be calculated as these assignments are not considered It is to be noted that the program modules 116 and 118 in the embodiment of FIG. 1 can be implemented by a single software routine that implements e.g. the procedure as shown in FIGS. 5, 14, 17, and/or FIG. 21 as this procedure can be used both for the purpose of size balancing and load balancing. In the load balancing case the data objects need to be sorted by load rather than by size but otherwise these procedures can be used in the same way.

The below table I shows an example of a current distribution of tables over blades as illustrated in FIG. 13. This table I corresponds to table 127 as shown in FIG. 1.

TABLE I

| Blade # | Table # |
|---|---|
| 1 | 12, 20 |
| 2 | 2, 6, 13, 14, 15 |
| 3 | 1, 7 |
| 4 | 5, 19 |
| 5 | 4, 17 |
| 6 | 9, 16 |
| 7 | 3, 10, 18 |
| 8 | 8, 11 |

The below table 11 shows a suggested re-distribution of the tables over blades as illustrated in FIG. 36. The table 11 corresponds to the table 129 of FIG. 1.

TABLE II

| Blade# | Table # |
|---|---|
| 1 | 6, 20 |
| 2 | 13, 14, 15 |
| 3 | 1, 12 |
| 4 | 5, 7 |
| 5 | 2, 4, 18 |
| 6 | 9, 16 |
| 7 | 3, 8, 17 |
| 8 | 10, 11, 19 |

The bold numbers in the table I identify those data tables that are assigned to different blades in the current distribution and the suggested redistribution as given in tables II. Those blades that have at least one table that changes its assignment are affected by the re-distribution. In the example considered here all of the blades are affected with the exception of blade number 6.

In order to perform the re-distribution procedure the search engines running on blades 1 to 5 and blades 7 and 8 are shut down and then re-started using the new distribution as given by table 11. During that process blade 6 can remain fully operational.

In order to calculate the expected down time of the affected blades the aggregated size of the objects that are assigned to the affected blades in the new distribution is calculated. In the example considered here this is done by adding the sizes of all tables except tables 9 and 16 that are assigned to the unaffected blade 6. The resulting size is multiplied by a parameter, such as time parameter 131 of FIG. 1, which provides an estimate of the down time. Alternatively a more sophisticated model can be utilized in order to calculate an estimate for the required down time. It is to be noted that the embodiment of FIG. 1 is based on the assumption that the time required for performing a re-distribution is at least roughly directly proportional to the aggregated size of the objects to be loaded onto the affected blades. Depending on the performance characteristics of the cluster 100 there can be other relations between the aggregated size of the objects and the required time, such as quadratic, exponential, logarithmic, or polynomial. Such a relationship may require more than one parameter that is stored in the storage system 123 (cf. FIG. 1). As a further alternative a more complex model can be used for increased precision of the predicted down time, such as a neural network.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data processing system for assigning a set of objects to processing units of a cluster of processing units, the data processing system comprising:
   first determining means that determines a re-distribution of the objects over the processing units, the re-distribution specifying which objects to assign to a set of required processors among the processing units, wherein the objects include database tables, wherein each processing unit includes a memory unit;
   calculating means that calculates an expected duration required for applying the re-distribution, wherein the calculation is based on at least a time parameter and the aggregated size of the objects to be redistributed, the time parameter providing an estimate of an amount of down time for the processing units;

a user interface that shows the expected duration to a user; and a processor for performing operations including:
prompting the user, by the user interface, to select whether to distribute the objects according to one of a first and second modes; wherein
in the first mode, the set of required processors includes all the processing units in the cluster; and
in the second mode, the set of required processors consists of a minimum number of processing units determined using a two-dimensional minimization procedure comprising calculating a sorting index for each of the objects based on the normalised object size and load of each of the objects;
creating an object sequence for re-distribution by sorting the objects by size;
iteratively redistributing the objects in the object sequence across the required processing units by, for each required processing unit:
determining a gap in the associated memory unit, wherein the gap represents free space on the memory unit;
identifying the largest remaining object in the object sequence that will fit into the gap;
adding the identified object to the memory unit; and
removing the identified object from the object sequence; and
after the object sequence has no more objects to redistribute, outputting the assignment of objects.

2. The data processing system of claim 1, wherein the calculating means that calculates the expected duration is further operable to:
determine a sub-set of the processing units affected by the re-distribution, and
determine a sub-set of the set of objects, the sub-set of the set of objects consisting of objects that are assigned to the sub-set of the processing units in the re-distribution.

3. The data processing system of claim 1, further comprising input means for a user's acceptance of a suggested re-distribution by a single input action.

4. The data processing system of claim 3, further comprising second determining means that determines a start time for applying the re-distribution using a load profile.

5. The data processing system of claim 1, further comprising storage means for storing a current distribution and the re-distribution.

6. The data processing system of claim 5, wherein the system comprises a blade server, and the blade server is one of the effected processing units.

7. The data processing system of claim 1, wherein the system provides a management process of a distributed search engine.

8. A method of assigning a set of objects to processing units of a cluster of processing units, the method comprising:
determining, via a processor, a re-distribution of the objects over the processing units, the re-distribution specifying which objects will be assigned to a set of required processors among the processing units, wherein the objects include database tables, wherein each processing unit includes a memory unit;
calculating, via the processor, an expected duration required for applying the re-distribution of the objects, wherein the calculating is based on at least a time parameter and the aggregated size of the objects to be redistributed, the time parameter providing an estimate of an amount of down time for the processing units;
showing, via a display device, the expected duration to a user;
prompting the user, on the display device, to select whether to distribute the objects according to one of a first and second modes; wherein
in the first mode, the set of required processors includes all the processing units in the cluster; and
in the second mode, the set of required processors consists of a minimum number of processing units determined using a two-dimensional minimization procedure comprising calculating a sorting index for each of the objects based on the normalised object size and load of each of the objects;
creating, via the processor, an object sequence for re-distribution by sorting the objects by size;
iteratively redistributing, via the processor, the objects in the object sequence across the required processing units by, for each processing unit:
determining a gap in the associated memory unit, wherein the gap represents free space on the memory unit;
identifying the largest remaining object in the object sequence that will fit into the gap;
adding the identified object to the memory unit; and
removing the identified object from the object sequence; and
after the object sequence has no more objects to redistribute, outputting, via the display device, the assignment of objects.

9. The method of claim 8, further comprising:
determining a sub-set of the processing units affected by the re-distribution; and
determining a sub-set of the set of objects, the sub-set of the set of objects consisting of objects that are assigned to processing units of the sub-set of the processing units.

10. The method of claim 9, further comprising entering a user's acceptance of the re-distribution by means of a single input action.

11. The method of claim 10, further comprising determining the start time for applying the re-distribution using a load profile.

12. A non-transitory computer-readable storage medium comprising computer executable instructions, which instructions when executed perform stages, comprising:
determining a re-distribution of objects over a cluster of processing units, the re-distribution specifying which objects to assign a set of required processors among the processing units;
calculating an expected duration required for applying the re-distribution of the objects, wherein the calculating is based on at least a time parameter and the aggregated size of the objects to be redistributed, the time parameter providing an estimate of an amount of down time for the processing units;
showing the expected duration to a user;
prompting the user to select whether to distribute the objects according to one of a first and second modes; wherein
in the first mode, the set of required processors includes all the processing units in the cluster; and
in the second mode, the set of required processors consists of a minimum number of processing units determined using a two-dimensional minimization procedure comprising calculating a sorting index for each of the objects based on the normalised object size and load of each of the objects;

creating an object sequence for re-distribution by sorting the objects by size;

iteratively redistributing the objects in the object sequence across the effected processing units by, for each processing unit:
- determining a gap in the associated memory unit, wherein the gap represents free space on the memory unit;
- identifying the largest remaining object in the object sequence that will fit into the gap;
- adding the identified object to the memory unit; and
- removing the identified object from the object sequence; and after the object sequence has no more objects to redistribute, outputting the assignment of objects

* * * * *